US011102859B2

(12) United States Patent
Shan

(10) Patent No.: US 11,102,859 B2
(45) Date of Patent: *Aug. 24, 2021

(54) LED LIGHTING SYSTEM

(71) Applicant: LED Smart Inc., Edmonton (CA)

(72) Inventor: Xinxin Shan, Surrey (CA)

(73) Assignee: LED Smart Inc., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,311

(22) Filed: Jul. 24, 2018

(65) Prior Publication Data

US 2019/0053343 A1 Feb. 14, 2019

Related U.S. Application Data

(63) Continuation of application No. 15/341,825, filed on Nov. 2, 2016, now Pat. No. 10,057,955, which is a
(Continued)

(30) Foreign Application Priority Data

Aug. 1, 2006 (CA) ..................... 2555065

(51) Int. Cl.
*H05B 45/37* (2020.01)
*H05B 45/10* (2020.01)
(Continued)

(52) U.S. Cl.
CPC .............. *H05B 45/10* (2020.01); *B60Q 1/26* (2013.01); *B60Q 1/2611* (2013.01); *B60Q 3/43* (2017.02);
(Continued)

(58) Field of Classification Search
CPC ............ H05B 33/0803; H05B 33/0845; H05B 33/0884; H05B 45/37; H05B 45/50; H05B 45/325; H05B 45/345; H05B 45/385
(Continued)

(56) References Cited

U.S. PATENT DOCUMENTS 5,607,227 A 3/1997 Yasumoto et al.
5,655,830 A 8/1997 Ruskouski
(Continued)

FOREIGN PATENT DOCUMENTS

DE 200 18 865 U1 2/2001
WO 2005/024291 A2 3/2005
(Continued)

OTHER PUBLICATIONS

Escobar, J., "Light Emitting Diodes: Gaining Visibility in the Aviation World," Aircraft Maintenance Technology, Apr. 13, 2005, <http://www.amtonline.com/publication/article.jsp?pubId=1&id=1585> [retrieved Jan. 28, 2006], 5 pages.
(Continued)

*Primary Examiner* — Tung X Le
(74) *Attorney, Agent, or Firm* — Christensen O'Connor Johnson Kindness, PLLC

(57) ABSTRACT

An LED lighting system is provided for connection to a variable power source providing input power, the LED lighting system having at least one power analyzing and processing circuitry connecting to the variable power source, and being configured to identify one or more characteristics of the input power, where the characteristics are selected from amplitude, frequency and pulse width of the input power, compare one or more of the characteristics of the input power to preset control criteria either in hardware or software or both to yield a comparison result, and then
(Continued)

US 11,102,859 B2

Page 2 control the current control circuitry according to the comparison result.

13 Claims, 45 Drawing Sheets

Related U.S. Application Data continuation of application No. 14/445,002, filed on Jul. 28, 2014, now Pat. No. 9,516,706, which is a continuation-in-part of application No. 14/113,208, filed as application No. PCT/CA2012/050251 on Apr. 19, 2012, now Pat. No. 9,179,513, and a continuation of application No. 13/316,499, filed on Dec. 10, 2011, now Pat. No. 8,791,650, and a continuation-in-part of application No. 12/278,393, filed as application No. PCT/CA2007/000207 on Feb. 9, 2007, now Pat. No. 8,115,411, which is a continuation-in-part of application No. 11/351,074, filed on Feb. 9, 2006, now Pat. No. 7,307,391, said application No. 14/445,002 is a continuation-in-part of application No. 13/316,499, filed on Dec. 10, 2011, now Pat. No. 8,791,650, and a continuation-in-part of application No. 12/278,393, filed as application No. PCT/CA2007/000207 on Feb. 9, 2007, now Pat. No. 8,115,411, which is a continuation-in-part of application No. 11/351,074, filed on Feb. 9, 2006, now Pat. No. 7,307,391.

(60) Provisional application No. 61/476,962, filed on Apr. 19, 2011.

(51) Int. Cl.
| | | |
|---|---|---|
| *F21K 9/27* | (2016.01) | |
| *F21S 4/28* | (2016.01) | |
| *B60Q 3/43* | (2017.01) | |
| *B60Q 1/26* | (2006.01) | |
| *H05B 45/00* | (2020.01) | |
| *H05B 45/50* | (2020.01) | |
| *H05B 47/10* | (2020.01) | |
| *H05B 47/19* | (2020.01) | |
| *G09F 13/00* | (2006.01) | |
| *G09F 21/04* | (2006.01) | |
| *F21Y 103/10* | (2016.01) | |
| *F21Y 115/10* | (2016.01) | |
| *F21Y 107/30* | (2016.01) | |
| *F21V 23/04* | (2006.01) | |
| *F21V 29/507* | (2015.01) | |
| *F21Y 113/13* | (2016.01) | |
| *F21V 29/89* | (2015.01) | |
| *F21K 9/272* | (2016.01) | |
| *F21K 9/275* | (2016.01) | |
| *F21K 9/278* | (2016.01) | |
| *F21V 3/02* | (2006.01) | |
| *F21V 15/015* | (2006.01) | |
| *F21V 17/10* | (2006.01) | |

(52) U.S. Cl.
CPC .................. *F21K 9/27* (2016.08); *F21S 4/28* (2016.01); *G09F 13/00* (2013.01); *G09F 21/04* (2013.01); *H05B 45/00* (2020.01); *H05B 45/37* (2020.01); *H05B 45/50* (2020.01); *H05B 47/10* (2020.01); *H05B 47/19* (2020.01); *B60Q 2400/20* (2013.01); *F21K 9/272* (2016.08); *F21K 9/275* (2016.08); *F21K 9/278* (2016.08); *F21V 3/02* (2013.01); *F21V 15/015* (2013.01); *F21V 17/104* (2013.01); *F21V 23/04* (2013.01); *F21V 29/507* (2015.01); *F21V 29/89* (2015.01); *F21Y 2103/10* (2016.08); *F21Y 2107/30* (2016.08); *F21Y 2113/13* (2016.08); *F21Y 2115/10* (2016.08); *Y02B 20/30* (2013.01); *Y10S 362/80* (2013.01)

(58) Field of Classification Search
USPC .............................. 315/291, 297, 307, 312
See application file for complete search history.

(56) References Cited

U.S. PATENT DOCUMENTS

| | | | |
|---|---|---|---|
| 5,785,227 A | 7/1998 | Akiba | |
| 5,785,418 A | 7/1998 | Hochstein | |
| 6,019,493 A | 2/2000 | Kuo et al. | |
| 6,158,882 A | 12/2000 | Bischoff, Jr. | |
| 6,203,180 B1 | 3/2001 | Fleischmann | |
| 6,238,075 B1 | 5/2001 | Dealey, Jr. et al. | |
| 6,283,612 B1 | 9/2001 | Hunter | |
| 6,340,868 B1 | 1/2002 | Lys et al. | |
| 6,388,393 B1 | 5/2002 | Illingworth | |
| 6,472,823 B2 | 10/2002 | Yen | |
| 6,583,550 B2 | 6/2003 | Iwasa et al. | |
| 6,590,343 B2 | 7/2003 | Pederson | |
| 6,616,291 B1* | 9/2003 | Love .................. F21S 8/00 315/185 R |
| 6,725,598 B2 | 4/2004 | Yoneda et al. | |
| 6,762,563 B2 | 7/2004 | St-Germain et al. | |
| 6,860,628 B2 | 3/2005 | Robertson et al. | |
| 6,871,981 B2 | 3/2005 | Alexanderson et al. | |
| 6,936,968 B2 | 8/2005 | Cross et al. | |
| 6,957,905 B1 | 10/2005 | Pritchard et al. | |
| 6,963,175 B2 | 11/2005 | Archenhold et al. | |
| 6,997,576 B1* | 2/2006 | Lodhie ................ H05B 45/00 362/240 |
| 7,014,336 B1 | 3/2006 | Ducharme et al. | |
| 7,014,337 B2 | 3/2006 | Chen | |
| 7,049,761 B2 | 5/2006 | Timmermans et al. | |
| 7,057,359 B2 | 6/2006 | Hung et al. | |
| 7,164,235 B2 | 1/2007 | Ito et al. | |
| 7,202,613 B2 | 4/2007 | Morgan et al. | |
| 7,204,615 B2 | 4/2007 | Arik et al. | |
| 7,220,018 B2 | 5/2007 | Crabb et al. | |
| 7,355,523 B2 | 4/2008 | Sid | |
| 7,510,299 B2 | 3/2009 | Timmermans et al. | |
| 7,815,338 B2 | 10/2010 | Siemiet et al. | |
| 8,297,791 B2 | 10/2012 | Kuang et al. | |
| 9,137,878 B2 | 9/2015 | Thompson | |
| 2003/0063463 A1* | 4/2003 | Sloan ................ F21V 29/74 362/238 |
| 2003/0112627 A1* | 6/2003 | Deese ................ G09F 13/0404 362/249.01 |
| 2003/0209997 A1* | 11/2003 | St-Germain .......... B61L 5/1881 315/291 |
| 2003/0214259 A9 | 11/2003 | Dowling et al. | |
| 2004/0012959 A1* | 1/2004 | Robertson .......... H05B 45/3578 362/247 |
| 2004/0070990 A1* | 4/2004 | Szypszak ................ G02B 25/02 362/555 |
| 2004/0105264 A1 | 6/2004 | Spero | |
| 2004/0160199 A1 | 8/2004 | Morgan et al. | |
| 2005/0068770 A1* | 3/2005 | Sloan ................ F21V 33/006 362/227 |
| 2005/0135104 A1 | 6/2005 | Crabb et al. | |
| 2005/0162093 A1* | 7/2005 | Timmermans .......... F21K 9/60 315/200 R |
| 2005/0162850 A1* | 7/2005 | Luk .................. F21S 4/26 362/227 |
| 2005/0168985 A1 | 8/2005 | Chen | |
| 2005/0190553 A1 | 9/2005 | Lynch et al. | |
| 2005/0242742 A1 | 11/2005 | Cheang et al. | |
| 2005/0265019 A1 | 12/2005 | Sommers et al. | |
| 2005/0281030 A1 | 12/2005 | Leong et al. | |
| 2006/0193131 A1 | 8/2006 | McGrath et al. | |

(56) References Cited

U.S. PATENT DOCUMENTS

| | | |
|---|---|---|
| 2006/0220571 A1 | 10/2006 | Howell et al. |
| 2006/0221638 A1* | 10/2006 | Chew ................ G02F 1/133524 362/613 |
| 2006/0256821 A1* | 11/2006 | Richards .............. H04N 9/3114 370/503 |
| 2006/0261757 A1 | 11/2006 | Huang |
| 2007/0070631 A1* | 3/2007 | Huang ................ H01R 33/942 362/222 |
| 2007/0115248 A1* | 5/2007 | Roberts ................ G09G 3/3406 345/102 |
| 2007/0228999 A1 | 10/2007 | Kit |
| 2009/0058317 A1 | 3/2009 | Tsai et al. |
| 2009/0079360 A1 | 3/2009 | Shteynberg et al. |
| 2009/0184662 A1 | 7/2009 | Given et al. |
| 2009/0322234 A1 | 12/2009 | Chen et al. |
| 2010/0060171 A1 | 3/2010 | Goitiandia et al. |
| 2010/0181925 A1 | 7/2010 | Ivey et al. |
| 2010/0283401 A1 | 11/2010 | Chung et al. |
| 2010/0320927 A1 | 12/2010 | Gray et al. |
| 2011/0109228 A1 | 5/2011 | Shimomura et al. |
| 2011/0260631 A1 | 10/2011 | Park et al. |
| 2012/0299480 A1 | 11/2012 | Peting et al. |
| 2015/0130359 A1 | 5/2015 | Bosua et al. |
| 2016/0095186 A1 | 3/2016 | Reed |
| 2017/0164439 A1 | 6/2017 | Reed |

FOREIGN PATENT DOCUMENTS

| | | |
|---|---|---|
| WO | 2005/031860 A2 | 4/2005 |
| WO | 2009/154321 A1 | 12/2009 |

OTHER PUBLICATIONS

Extended European Search Report dated Jul. 1, 2010, issued in European Patent Application No. EP 07 71 0621, filed Feb. 9, 2007, 10 pages.

International Search Report and Written Opinion dated Aug. 16, 2012, issued in International Application No. PCT/CA2012/050251, filed Apr. 19, 2012, 9 pages.

"LED Lighting," EMTEQ Lighting Online Product Information, <http://www.emteq.com/led_intro.html> [retrieved Jan. 28, 2006], 2 pages.

Service, R.F., "Organic LEDs Look Forward to a Bright, White Future," Science 310(5755):1762-1763, Dec. 2005.

"Why Drive White LEDS with Constant Current?," Maxim Integrated, <https://www.maximintegrated.com/en/app-notes/index.mvp/id/3256> [retrieved Jun. 20, 2016], 6 pages.

X10 (industry standard),"Wikipedia,The Free Encyclopedia, Dec. 19, 2019,"<http://en.wikipedia.org/w/index.php?title=X10_(industry_standard)&oldid=931600910>,10 pages.

* cited by examiner

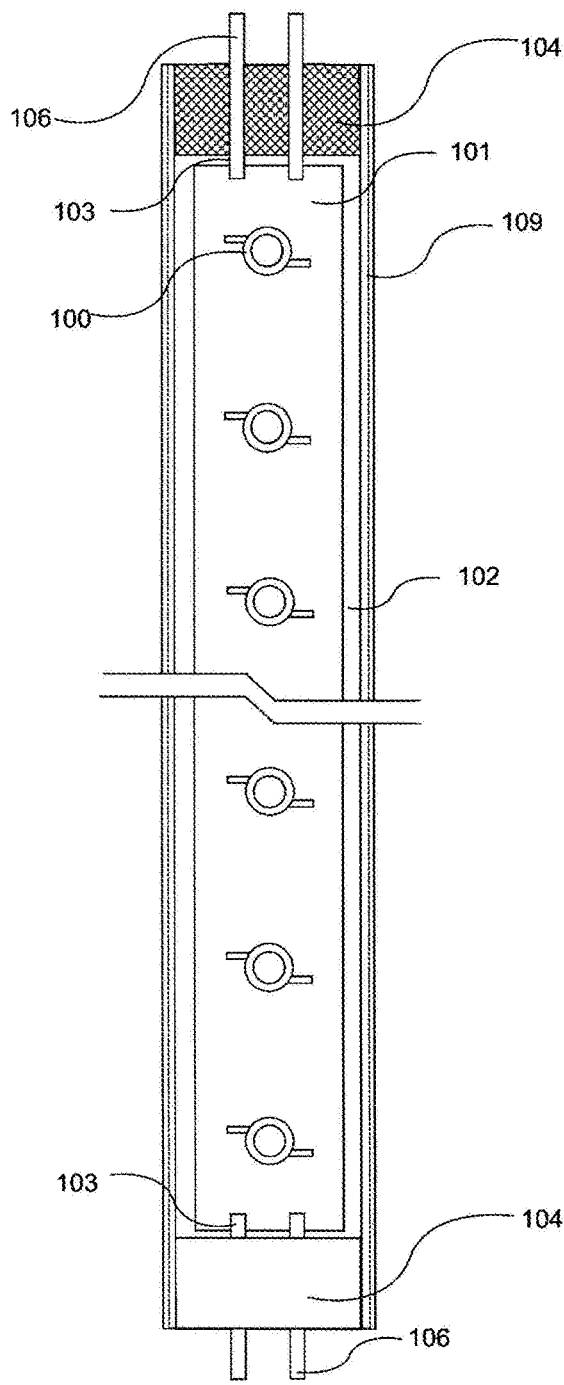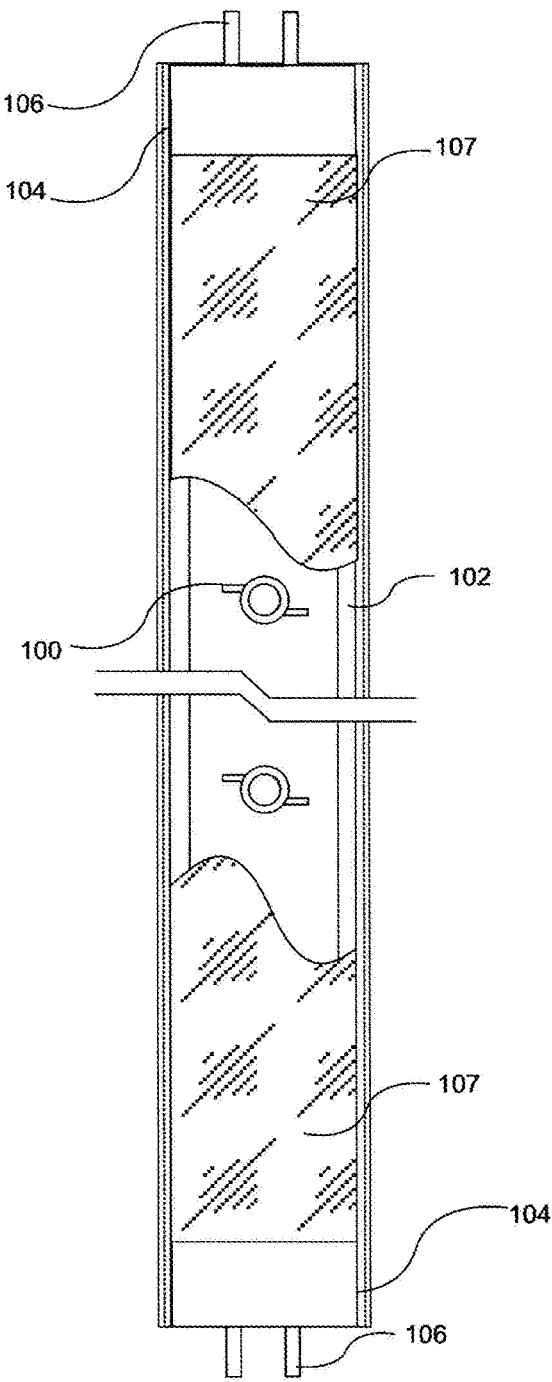
FIG. 11
FIG. 12

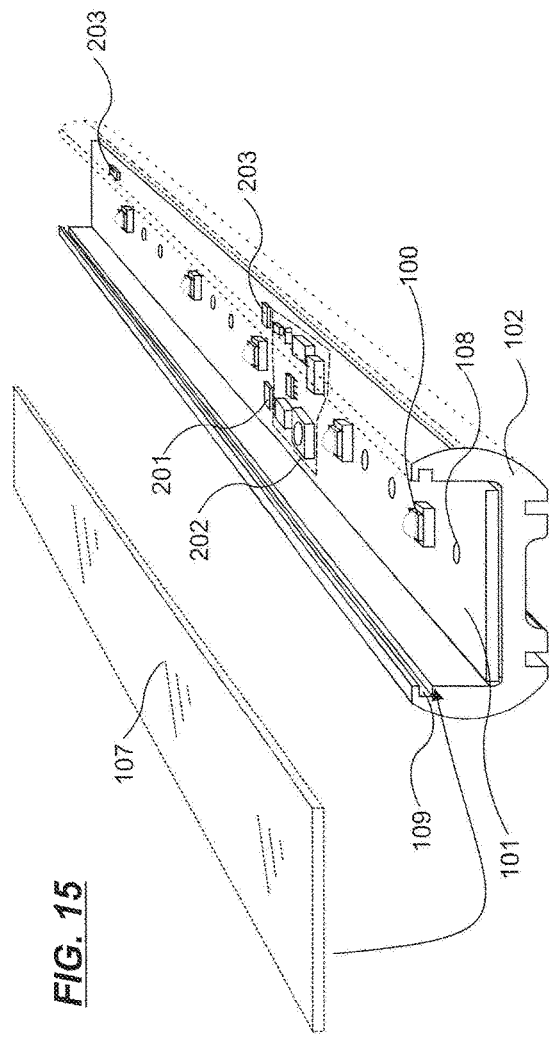

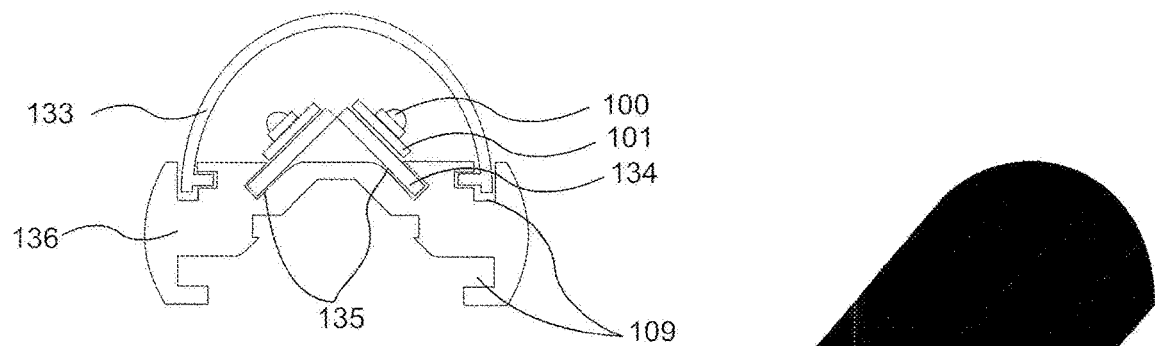
FIG. 38
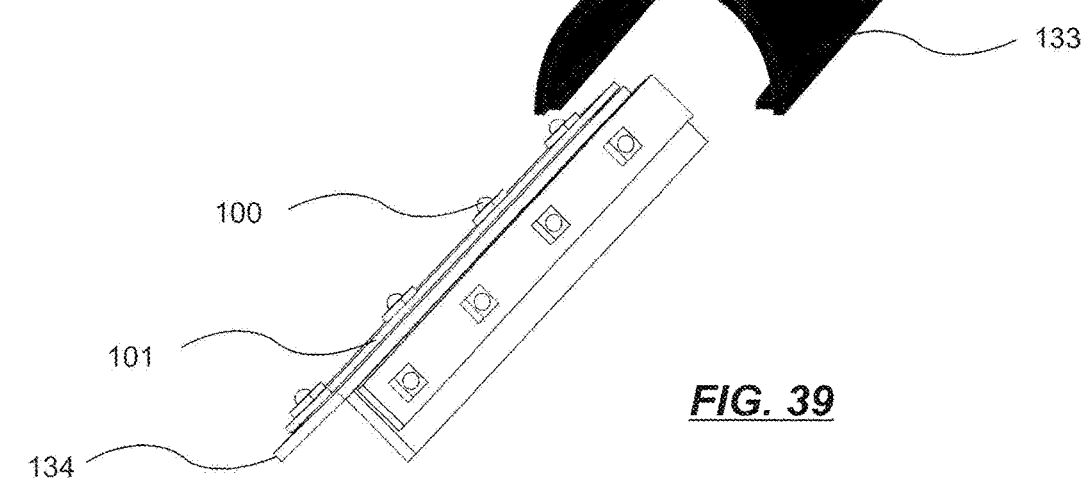
FIG. 39
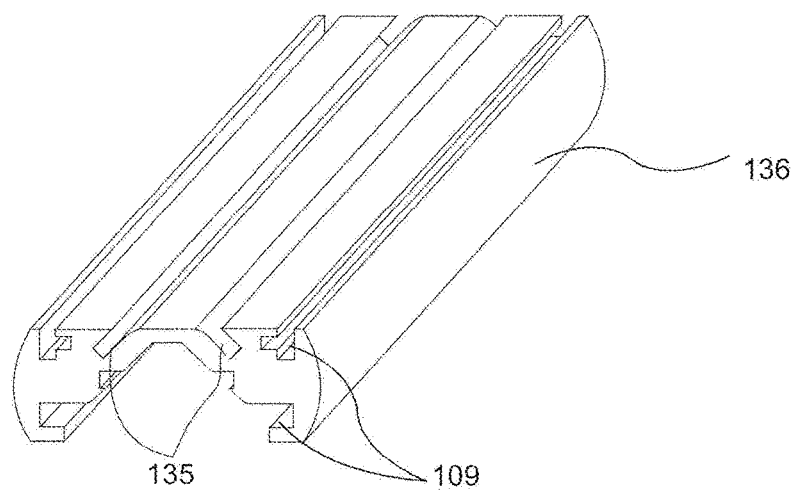

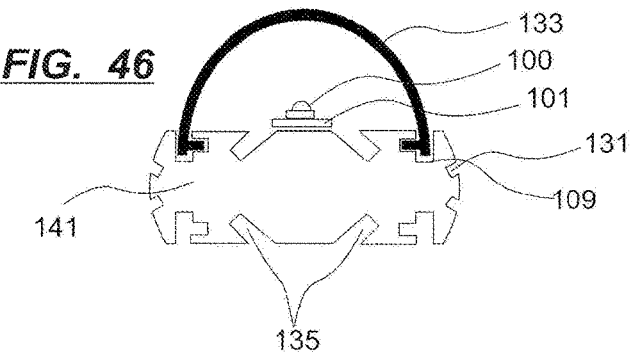
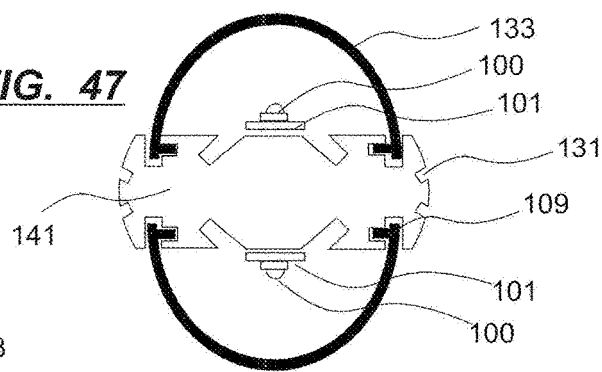
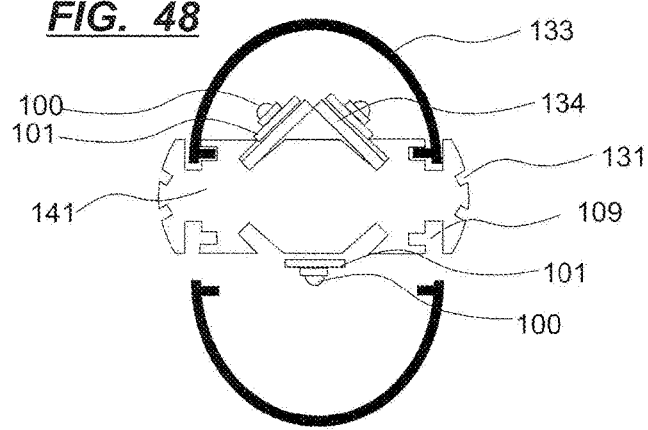
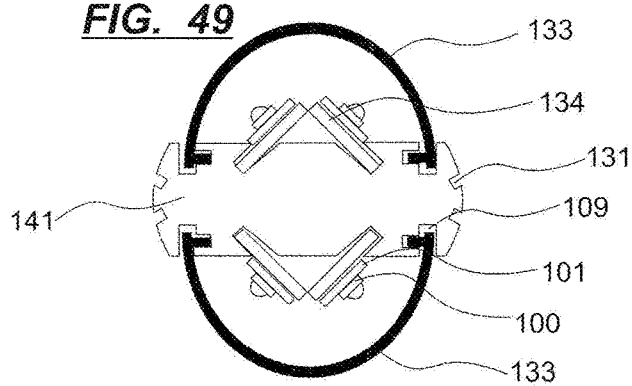

LED LIGHTING SYSTEM

CROSS-REFERENCE TO RELATED APPLICATIONS

This application is a continuation of application Ser. No. 15/341,825, filed Nov. 2, 2016, which is a continuation of application Ser. No. 14/445,002, filed Jul. 28, 2014, now U.S. Pat. No. 9,516,706, which is a continuation-in-part of application Ser. No. 14/113,208, filed Jan. 8, 2014, now U.S. Pat. No. 9,179,513, which is the National Stage of International Application No. PCT/CA2012/050251, filed Apr. 19, 2012, which claims the benefit of Provisional Application No. 61/476,962, filed Apr. 19, 2011, and is a continuation of application Ser. No. 13/316,499, filed Dec. 10, 2011, now U.S. Pat. No. 8,791,650, which also claims the benefit of Provisional Application No. 61/476,962, filed Apr. 19, 2011, and which is a continuation-in-part of application Ser. No. 12/278,393, filed Dec. 1, 2008, now U.S. Pat. No. 8,115,411, which is the National Stage of International Application No. PCT/CA2007/000207, filed Feb. 9, 2007, which is a continuation-in-part of application Ser. No. 11/351,074, filed Feb. 9, 2006, now U.S. Pat. No. 7,307,391. Application Ser. No. 14/445,002, filed Jul. 28, 2014, now U.S. Pat. No. 9,516,706, is also a continuation-in-part of application Ser. No. 13/316,499, filed Dec. 10, 2011, now U.S. Pat. No. 8,791,650, which claims the benefit of Provisional Application No. 61/476,962, filed Apr. 19, 2011, and is a continuation-in-part of application Ser. No. 12/278,393, filed Dec. 1, 2008, now U.S. Pat. No. 8,115,411, which is a national phase the National Stage of International Application No. PCT/CA2007/000207, filed Feb. 9, 2007, which is a continuation-in-part of application Ser. No. 11/351,074, filed Feb. 9, 2006, now U.S. Pat. No. 7,307,391.

TECHNICAL FIELD

LED lighting control.

BACKGROUND

Traditionally to control LED lights a control signal has to be provided to the lights either through a separated control pin or wire, or wireless technology, or technologies like signal carrier, or the LED lights operate in a master-slave mode. When the LED lights work in master-slave mode the LED arrays are controlled by the power source directly. For example the power source's voltage is applied to the LEDs directly, so the LEDs are lit up when the voltage goes up and dim down when the voltage goes down. An example LED Lighting System is shown in published international application WO200709092.

SUMMARY

An LED lighting system is provided for connection to a variable power source providing input power, the LED lighting system having at least one power analyzing and processing circuitry connecting to the variable power source, and being configured to identify one or more characteristics of the input power, where the characteristics are selected from amplitude, frequency and pulse width of the input power, compare one or more of the characteristics of the input power to preset control criteria either in hardware or software or both to yield a comparison result, and then control the current control circuitry according to the comparison result.

An LED lighting system for connection to a variable power source providing input power, comprising: a support structure spanning between a first end and a second end, the support structure made of rigid material, the support structure being sufficiently heat conductive to provide heat dissipation for the LEDs; an electrical connector for connection to the variable power source at least at the first end or between the first end and second end; at least one LED array extending along the support structure; power control circuitry for the at least one LED array, the power control circuitry being carried by the support structure and being in electrical communication with the electrical connector; a circuit board supporting the at least one LED array, the corresponding power control circuitry being provided on the circuit board or on a separate board; the at least one LED array being divided into sets of LEDs; the power control circuitry being formed of one or multiple current controllers, each of the one or multiple current controllers providing current control for a corresponding set of LEDs in the LED array; and at least one power analyzing and processing circuitry connecting to the variable power source, and being configured to identify one or more characteristics of the input power, where the characteristics are selected from amplitude, frequency and pulse width of the input power, compare one or more of the characteristics of the input power to preset control criteria either in hardware or software or both to yield a comparison result, and then control the current control circuitry according to the comparison result.

An LED lighting system for connection to a variable power source providing input power, comprising: a support structure; an electrical connector for connection to the variable power source; at least one LED array in the support structure; power control circuitry for the at least one LED array, the power control circuitry being carried by the support structure and being in electrical communication with the electrical connector; a circuit board supporting the at least one LED array, the corresponding power control circuitry being provided on the circuit board or on a separate board; the at least one LED array being divided into sets of LEDs of same or different colors; the power control circuitry being formed of one or multiple current controllers, each of the one or multiple current controllers providing current control for a corresponding set of LEDs in the LED array; and at least one power analyzing and processing circuitry connecting to the variable power source, and being configured to identify one or more characteristics of the input power, where the characteristics are selected from amplitude, frequency and pulse width of the input power, compare one or more of the characteristics of the input power to preset control criteria either in hardware or software or both to yield a comparison result, and then control the current control circuitry providing same or different current control for a corresponding set of LEDs in the LED array according to the comparison result.

An LED lighting system is provided for connection to a variable power source providing input power, the LED lighting system having power control circuitry that in operation connects to the variable power source, and the power control circuitry being configured to compare input power to one or more pre-set conditions to yield a comparison result and output a control signal according to the comparison result.

An LED lighting system for connection to a variable power source providing input power, comprising: a support structure spanning between a first end and a second end; at least one LED array extending along the support structure;

power control circuitry for the at least one LED array, the power control circuitry being carried by the support structure and being in electrical communication with at least an electrical connector for connection to the variable power source; and the power control circuitry being configured to compare input power to one or more pre-set conditions to yield a comparison result and output a control signal according to the comparison result.

A method of controlling an LED lighting system, comprising: comparing input power to one or more pre-set conditions using power control circuitry to yield a comparison result; and the power control circuitry outputting a control signal according to the comparison result.

Controllers connecting to an LED lighting system, the controllers being configured to: provide the output with controllable characteristics, the characteristics being selected from the group comprising voltage amplitude, power frequency and pulse width; and detect the characteristics change, such as a current change, to identify the working status of the system to synchronize the control status of the multiple controllers in the system.

An LED lighting system comprising: a support structure; at least one LED array in the support structure; power control circuitry for the at least one LED array; at least one power analyzing and processing circuitry connecting to the variable power source, and being configured to: identify one or more characteristics of the input power, where the characteristics are selected from amplitude, frequency, and pulse width of the input power, compare one or more of the characteristics of the input power to preset control criteria either in hardware or software or both to yield a comparison result, and control the current control circuitry providing same or different current control for a corresponding set of LEDs in the at least one LED array according to the comparison result.

An LED lighting system comprising: a support structure; at least one LED array in the support structure; power control circuitry for the at least one LED array; at least one power analyzing and processing circuitry connecting to a variable power source, and being configured to: identify one or more characteristics of the input power, where the characteristics are selected from amplitude, frequency, and pulse width of the input power, compare one or more of the characteristics of the input power to preset control criteria either in hardware or software or both to yield a comparison result, and control the current control circuitry providing same or different current control for a corresponding set of LEDs in the at least one LED array according to the comparison result.

In various embodiments, there may be included any one or more of the following features.

Each LED of the at least one LED array has a power rating of no less than 0.01 watts. The support structure is generally elongated in a first direction; the at least one LED array having a first illumination field directed perpendicularly to the first direction; and at least one other LED array carried by the support structure, the at least one other LED array having a second illumination field directed perpendicularly to the first direction, the second illumination field being oriented at a non-zero angle to the first illumination field. The first illumination field and the second illumination field are oriented at 180 degrees to each other. The support structure being generally elongated in a first direction; and plural other LED arrays carried by the support structure, the plural other LED arrays being oriented to provide an illumination field that extends 360 degrees around the support structure at a given distance outward from the support structure. The support structure has a front side on which the at least one LED array is carried and a rear side on which the power control circuitry is carried. An electrical connector at a second end of the support structure. The electrical connectors at each of the first end and the second end of the support structure are compatible with fluorescent light receptacle attachment pins. The onboard current control circuitry is configured to provide constant current to the LEDs of the LED array. The support structure is made of a unitary piece of material that is both heat conductive and rigid. An optically transparent or translucent cover secured to the support structure over the at least one LED array. The support structure is hollow. The at least one LED array is provided on a front side of the support structure and the support structure has a domed shaped rear side. The combination of support structure and optically transparent cover has an egg shaped cross-section. Multiple LED lighting systems installed in a vehicle. The vehicle is a watercraft, aircraft or land vehicle. Multiple LED lighting systems installed in a building or in signage.

The LED lighting system has one or more of a support structure spanning between a first end and a second end, the support structure made of rigid material, the support structure being sufficiently heat conductive to provide heat dissipation for the LEDs; an electrical connector for connection to the variable power source at least at the first end or between the first end and second end; at least one LED array extending along the support structure; power control circuitry for the at least one LED array, the power control circuitry being carried by the support structure and being in electrical communication with the electrical connector; and a circuit board supporting the at least one LED array, the corresponding power control circuitry being provided on the circuit board; the at least one LED array being divided into sets of LEDs; the power control circuitry being formed of one or multiple current controllers, each of the one or multiple current controllers providing current control for a corresponding set of LEDs in the LED array. In some embodiments, sets of LEDs may be of the same or different colors, and the current control circuitry may provide same or different current control for a corresponding set of LEDs in the LED array according to the comparison result.

There may for example be a support structure forming a channel and being heat conductive and rigid, with one or both ends of the support structure having electrical connectors for connection to a power source. An LED array in some embodiments extends along the support structure for example within the channel, and in some embodiments supported in slots, each LED in the LED array may have in some embodiments a power rating of greater than 0.1 watt. The power supply circuitry in some embodiments is provided by current control circuitry, for example onboard circuitry, carried by the support structure, in some embodiments within the channel, and may provide current control for individual sets of LEDs. The current control allows careful control of the forward current passing through the LED array so that it controls the brightness and heat production by the LEDs. Devices with full 360 degree illumination are disclosed, along with devices with LEDs having differently angled illumination fields. Various electrical power supplies, structural support configurations and shapes, lens configurations, and overall structural configurations are also disclosed.

The output signal may be applied to a control circuit to control power provided to the at least one LED array according to the comparison result. The pre-set conditions may be selected from amplitude, frequency and pulse width of the input power. In a further embodiment, there is provided a method of controlling an LED lighting system, comprising comparing input power to one or more pre-set conditions using power control circuitry to yield a comparison result; and the power control circuitry outputting a control signal according to the comparison result. The output signal may be applied to a control circuit to control power provided to an array of LEDs according to the comparison result.

Controlling the power provided to the LEDs comprises adjusting brightness, such as brightening or dimming, and different LEDs may be adjusted differently, so that for example some LEDs may be brightened and some dimmed.

The output signal is applied to a control circuit to control power provided to the at least one LED array according to the comparison result. A circuit board supporting the at least one LED array; the at least one LED array being divided into one or more sets of LEDs; and the power control circuitry being formed of one or more current controllers, each of the one or multiple current controllers providing current control for a corresponding set of LEDs in the LED array. The power control circuitry is configured to change state upon a positive comparison result and output the control signal upon occurrence of the change of state. The pre-set conditions are selected from amplitude, frequency and pulse width of the input power. Upon the occurrence of the comparison result, the power control circuitry is configured to send a dim signal to the at least one LED array. The control signal is configured to instruct LEDs in the at least one LED array to flash. The control signal comprises a check code. The output signal is applied to a control circuit to control power provided to an array of LEDs according to the comparison result. The pre-set conditions are selected from amplitude, frequency and pulse width of the input power. The power control circuitry changing state upon a positive comparison result and outputting a control signal upon occurrence of the change of state. Controlling current provided to the array of LEDs comprises controlling brightness of the LEDs. Controlling current provided to the array of LEDs comprises dimming the LEDs. The control signal instructs LEDs in the at least one LED array to flash. The control signal comprises a check code.

One or more controllers, the controllers can control the LED lighting system synchronously. At least one controller in the group controllers, the group of controllers can control at least one LED lighting system. The group of controllers can be connected in series or parallel. The controller can be remotely controlled by other controlling systems through networks. The networks can be wired or wireless. The controller can be installed in the LED system. The controller in the lighting system can be mounted at same PCB of the LED lighting system or mounted at another PCB separately. The controller in the lighting system can be communicated with the LED lighting system by the methods of wired or wireless. The LED lighting system with or without the controller can be made in different shapes. One or more controllers, the controllers being configured to control the LED lighting system synchronously. A group of controllers, the group of controllers being configured to control at least one LED lighting system. The group of controllers are connected in series or parallel. The controller is configured to be remotely controlled by one or more other controlling systems through one or more networks. The one or more networks are wired or wireless. The controller is configured to be installed in the LED system. The controller in the lighting system is configured to be mounted to the same PCB of the LED lighting system or mounted to another PCB separately. The controller in the lighting system is configured to be communicated with by wired or wireless methods. The LED lighting system made in different shapes.

BRIEF DESCRIPTION OF THE DRAWINGS

There will now be described embodiments of an LED lighting system, with reference to the drawings, by way of illustration only, in which like numerals denote elements of the same type but may be different examples of the same type depending on the figure, and in which:

FIG. 11 is a top view of 'bi-pin'-two pin design, one end cross cut, to view interior configuration;

FIG. 12 is a top view of 'bi-pin'-two pin design, with lens;

FIG. 15 is a 3-D view of the LED Lighting tube, without end fittings;

FIG. 16 is a 3-D side view of the LED Lighting tube, without end fittings;

FIG. 38 is a cross cut view of an LED lighting system with LED arrays facing different directions;

FIG. 39 is a view of multiple sections of an LED lighting system with LED arrays facing different directions;

FIGS. 46-49 are a series of sections of an LED lighting system showing how various configurations of LED arrays may be carried by a support structure;

DETAILED DESCRIPTION

Figure 1:
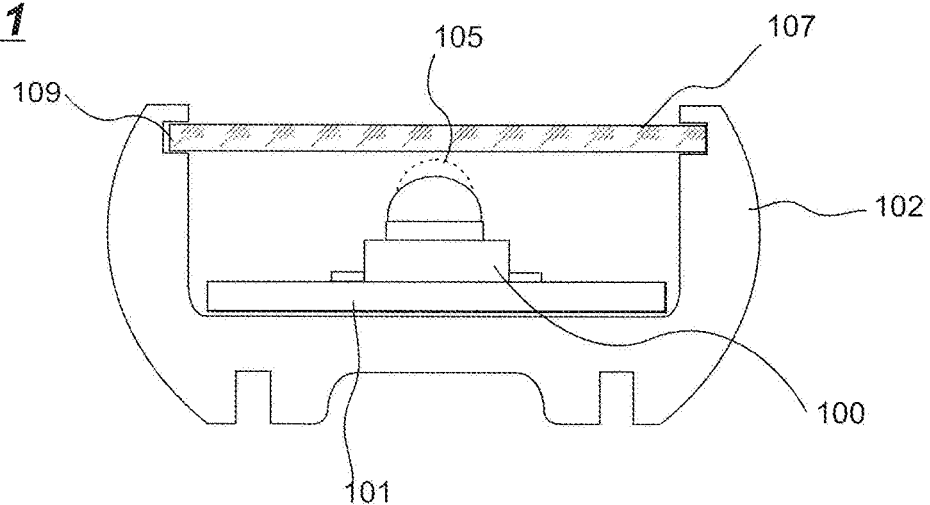
FIG. 1 is a cross cut view from inside of single pin type LED lighting system.
Figure 2:
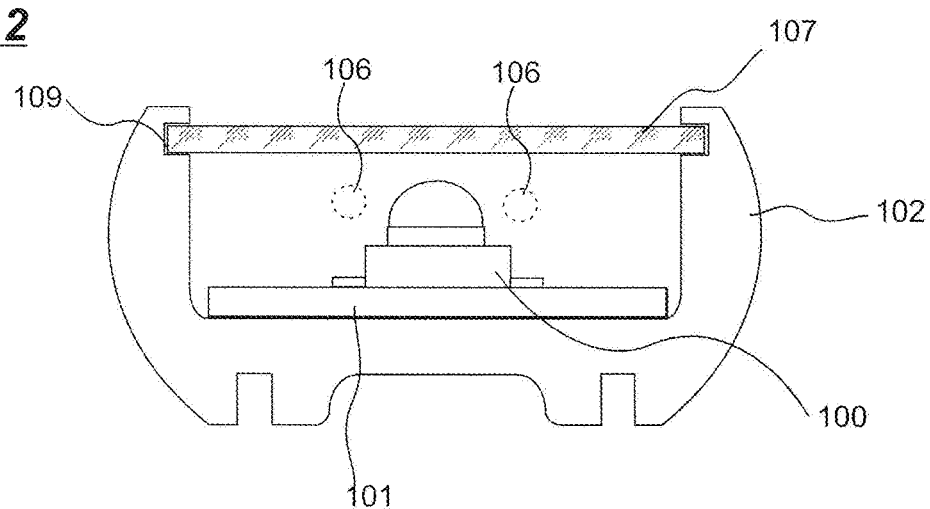
FIG. 2 is a cross cut view from inside of 'bi-pin'-two pin type LED lighting system.
Figure 3:
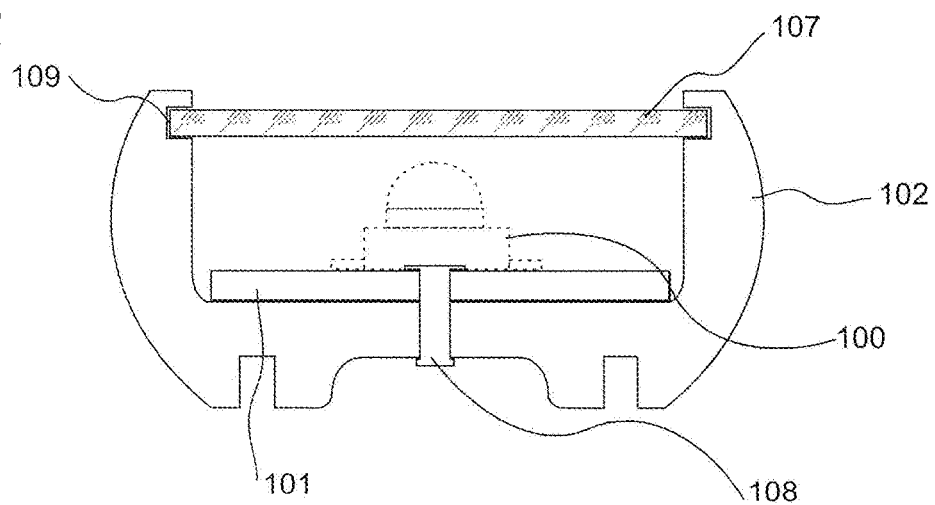
FIG. 3 is a cross cut view from inside single or 'bi-pin'— two pin type of LED lighting system showing permanent, for example, rivet or screw, mounting.
Figure 4:
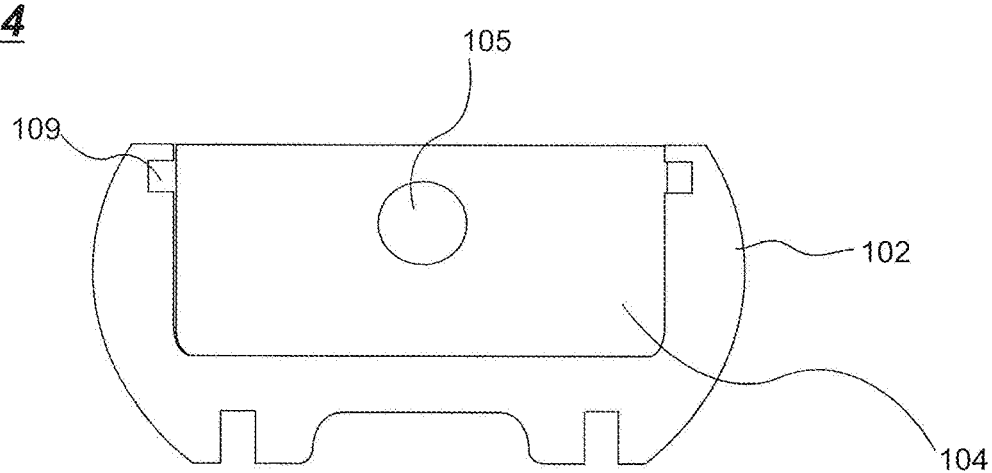
FIG. 4 is an end view of single pin type of LED lighting system.
Figure 5:
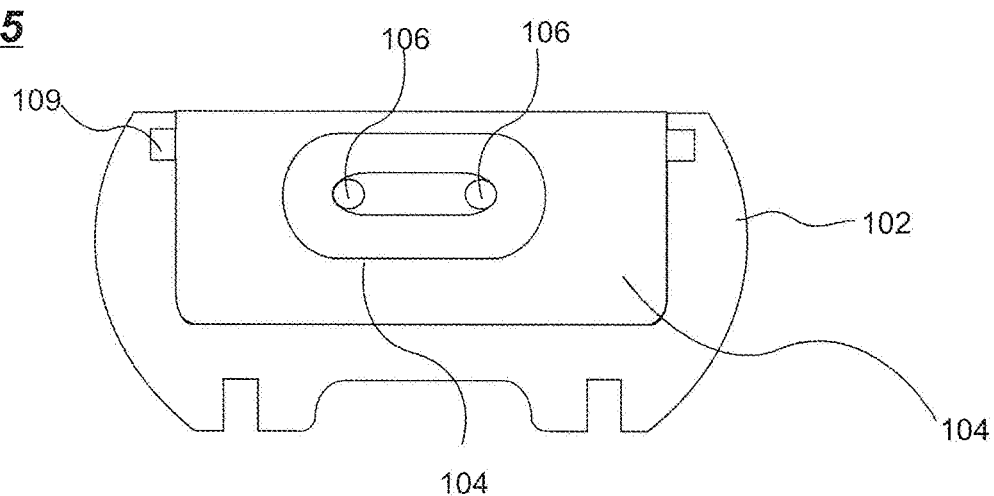
FIG. 5 is an end view of recessed double contact base, two pin type LED lighting system.
Figure 6:
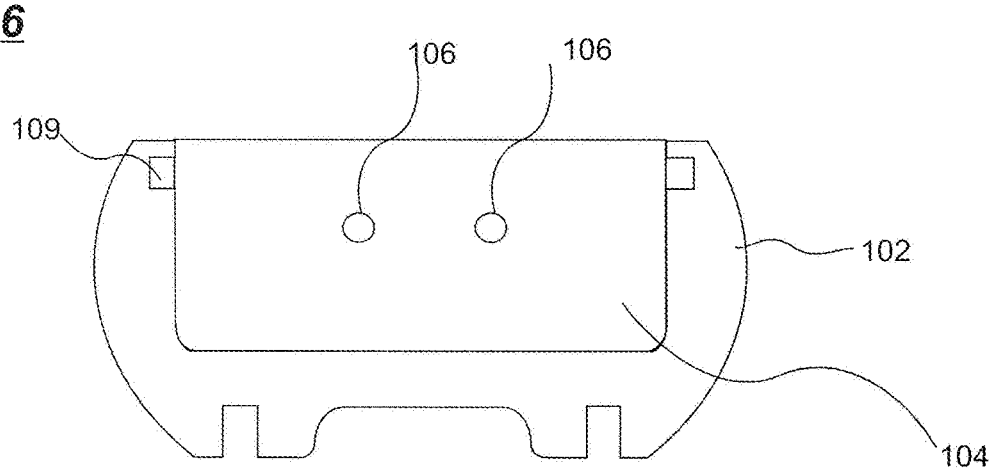
FIG. 6 is an end view of 'bi-pin', two pin type LED Lighting Tube.
Figure 7:
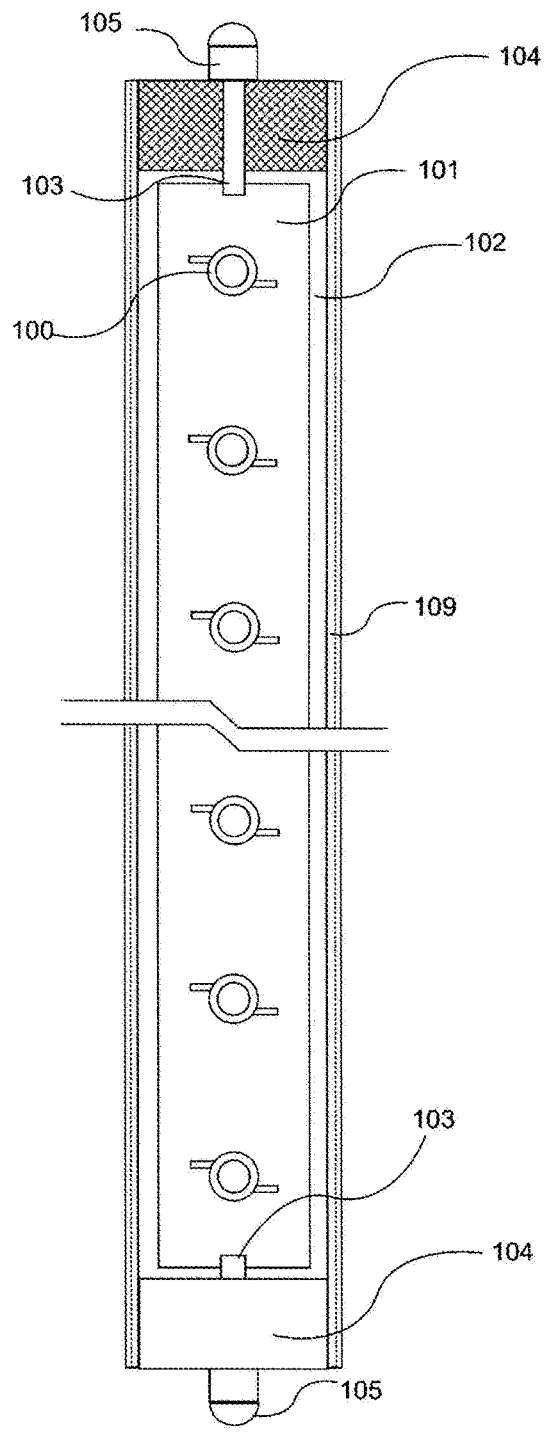
FIG. 7 is a top view of single pin design, one end cross cut, to view interior configuration.
Figure 8:
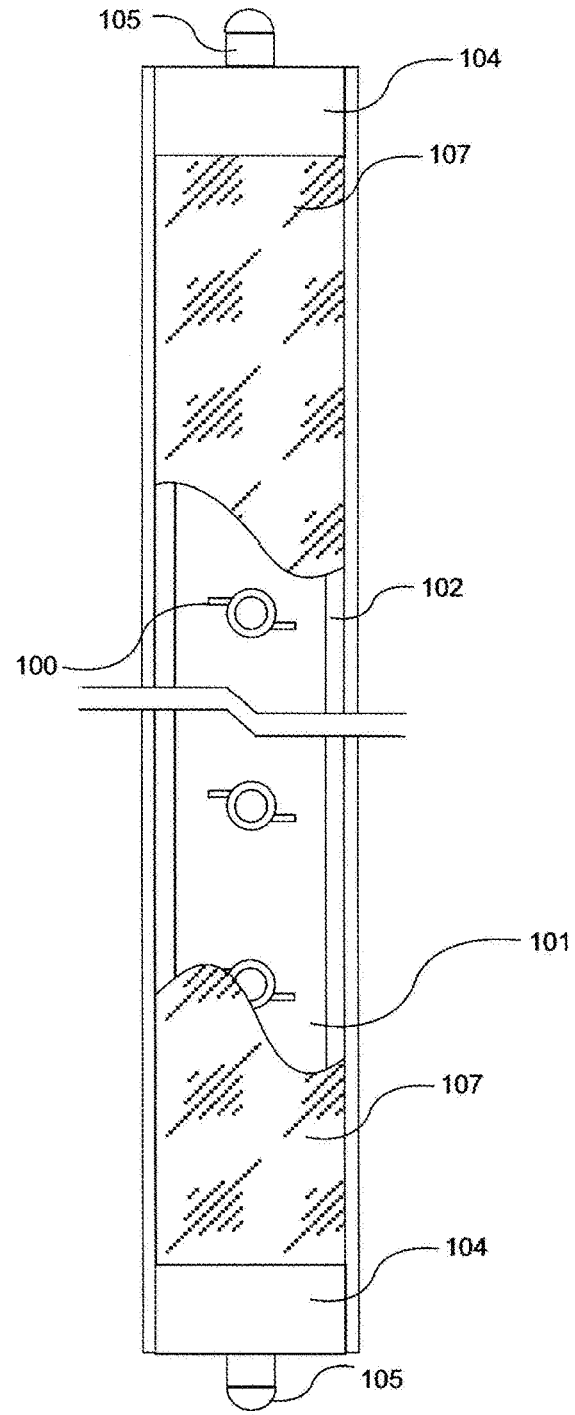
FIG. 8 is a top view of single pin design, with lens.
Figure 9:
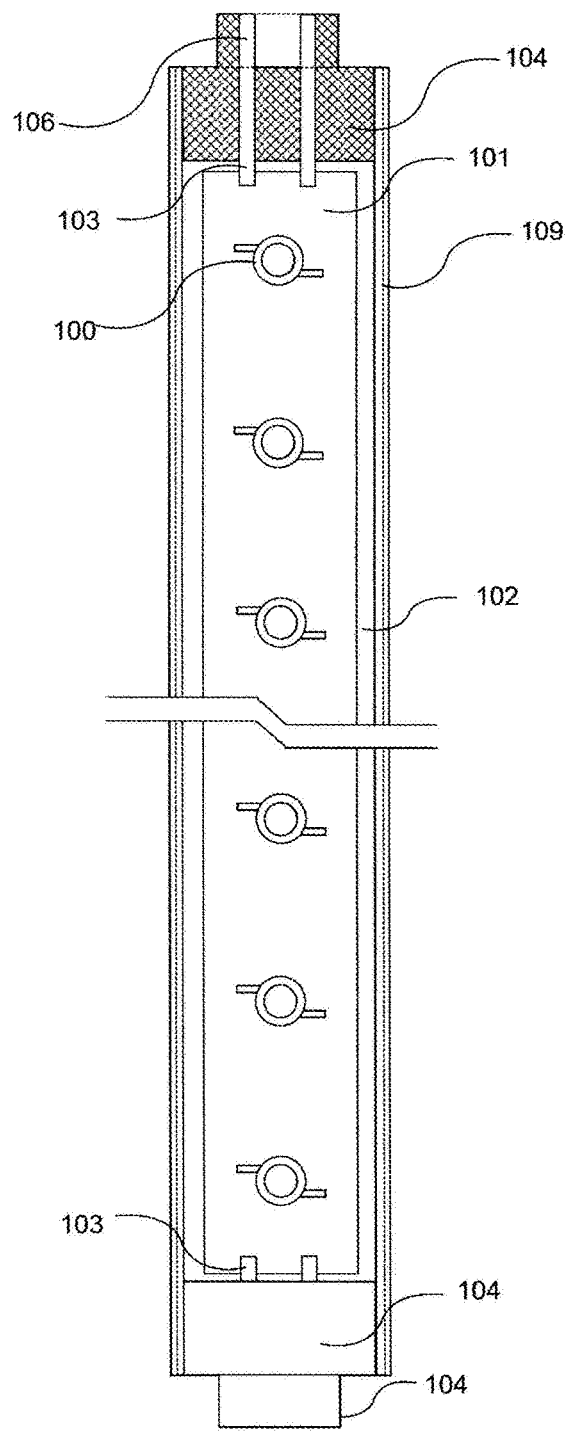
FIG. 9 is a top view of recessed double contact base-two pin design, one end cross cut, to view interior configuration.
Figure 10:
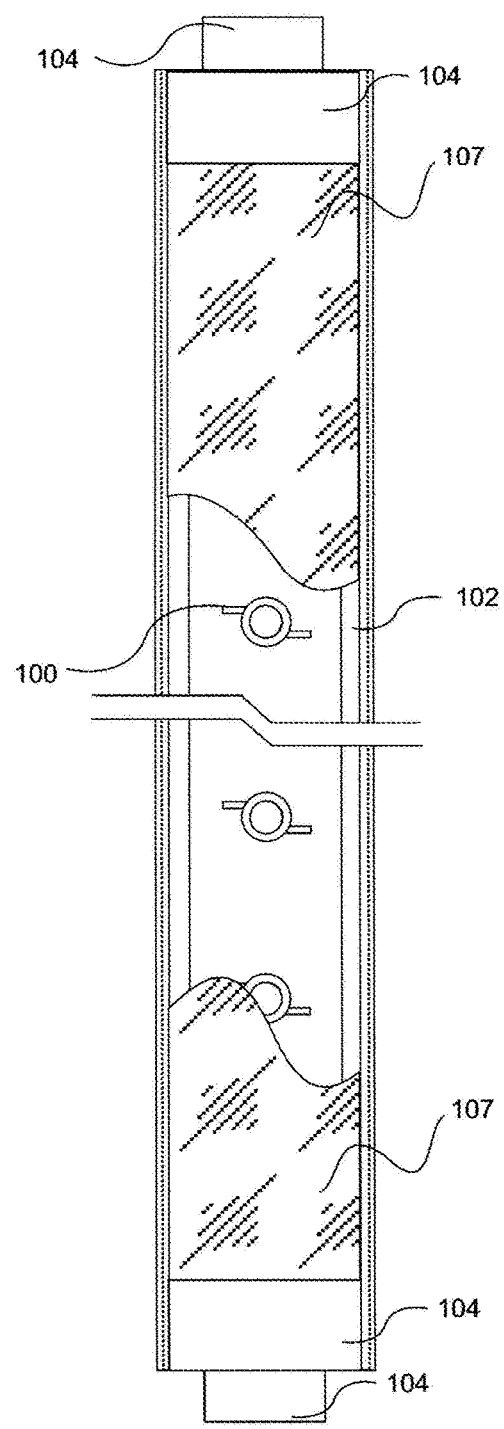
FIG. 10 is a top view of recessed double contact base-two pin design, with lens.

In this patent document, "comprising' means 'including". In addition, a reference to an element by the indefinite article "a" does not exclude the possibility that more than one of the element is present. Each one of the individual features described here may be used in one or more embodiments and is not, by virtue only of being described here, to be construed as essential to all embodiments as defined by the claims.

In FIGS. 1-3, 7-12, there is shown an exemplary LED lighting system 10 that includes a plurality of LEDs 100, each LED 100 being supplied power from a circuit board 101 supported by support structure 102. Support structure 102 in one embodiment forms a channel and is made of a heat conductive and rigid material, such as aluminum, ceramic or any thermally conductive formable material. In one embodiment, the support structure 102 is both heat conductive and rigid and is made of a unitary piece of material. The support structure 102 is rigid and extends from end to end of the LED lighting system 10. The heat sink capability may be continuous from end to end or may be semi-continuous. In the case of being semi-continuous, the material providing the heat sink function may have breaks, in which case additional connector material is required to provide the channel with sufficient rigidity so that the lighting system 10 does not collapse or sag under its own weight. The circuitry 20 or 30 provide current control for the LED lighting system 10 and are attached to the support structure 102 permanently such as by fasteners 108 (FIG. 3), which may be rivets or screws, so they do not allow for vibration to loosen the connection between the circuit board 101 and the support structure 102 over time. The support structure 102 does not require adhesive, or thermally conductive substance to connect to the circuit board 101. The support structure 102 provides a rigid backbone structure to the LED lighting system 10, and is sufficiently rigid to prevent the LED lighting system 10 to resist or prevent breakage during normal use, or bending, unless the product design requires it. The support structure 102 may be provided with a cover 107 secured in a groove 109 that runs along the inside edge of the support structure walls. The cover 107 is transparent or translucent and may be formed as a lens.

At one or both ends of the support structure 102 there are provided electrical connectors 103, 105, and 106 for connection of the lighting system 10 to a power source. When LED lighting system 10 is configured as a bulb, rather than as tube, it will typically have connectors only at one end. In the embodiment of FIGS. 1, 4, 7 and 8, a single connector 105 of Pin Type 1 is formed in end caps of the support structure 102. In the embodiment of FIGS. 2, 5, 6, and 9-12 double connectors 106 of Pin Type 2, either in the bi-pin format (FIGS. 6, 11 and 12) or the recessed double contact type (FIGS. 5, 9 and 10) are formed in end caps 104 of the support structure 102. These connectors 105, 106 are of conventional design. The end caps 104 may be any suitable material such as plastic, Lexan™, polycarbonate, acrylic, ABS, metal such as aluminum, copper, brass, stainless steel, metal alloy, combination of metal and plastic, or fiberglass. The end caps 104 may be manufactured in different shapes and sizes, all able to connect to the circuit boards 101 within the support structure 102. The end caps 104 encase the channel, are secured against movement and do not break with vibration. The end caps 104 also secure and prevent movement of the lens 107, 118-127. As with the other components of the lighting system 10, the end caps 104 should be made to withstand high ambient temperatures (up to 125° C.+) and low ambient temperatures (as low as −40° C.). In the case of use of the LED lighting system 10 as a fluorescent light fixture replacement, the connectors 105, 106 are conventional pins for attached to fluorescent light fixture receptacles. In other embodiments, such as when the LED lighting system 10 is used in a single socket fixture, the connectors 106 may be provided at one end only of the support structure 102.

An LED array formed of LEDs 100 extends along the support structure within the channel formed by the support structure 102. To provide sufficient power to provide light, particularly in an industrial or commercial environment, each LED 100 in the LED array should have a power rating sufficient to provide the desired degree of light, including in the case of vehicles used for transportation a sufficient degree of light to meet regulatory requirements. For example, such requirements may be met by LEDs having a power rating of greater than 0.1 watt, depending on the efficiency of the LED in converting power to light energy. The LEDs may also be organic LEDs or any other suitable LED now known or later developed.

The circuit boards 101 provide in one embodiment onboard current control circuitry for the LED array. The circuit boards 101 are carried by the support structure 102 and are in electrical communication with the electrical connectors 103, 105, 106. The LEDs 100 are preferably organized in groups of LEDs, either in series, or parallel. The LEDs may be surface mounted (SMT) or through hole mounted (TH). The color of the LEDs can be any available color such as white, blue, green, red, yellow, amber, purple, pink, or orange.

Figure 13:
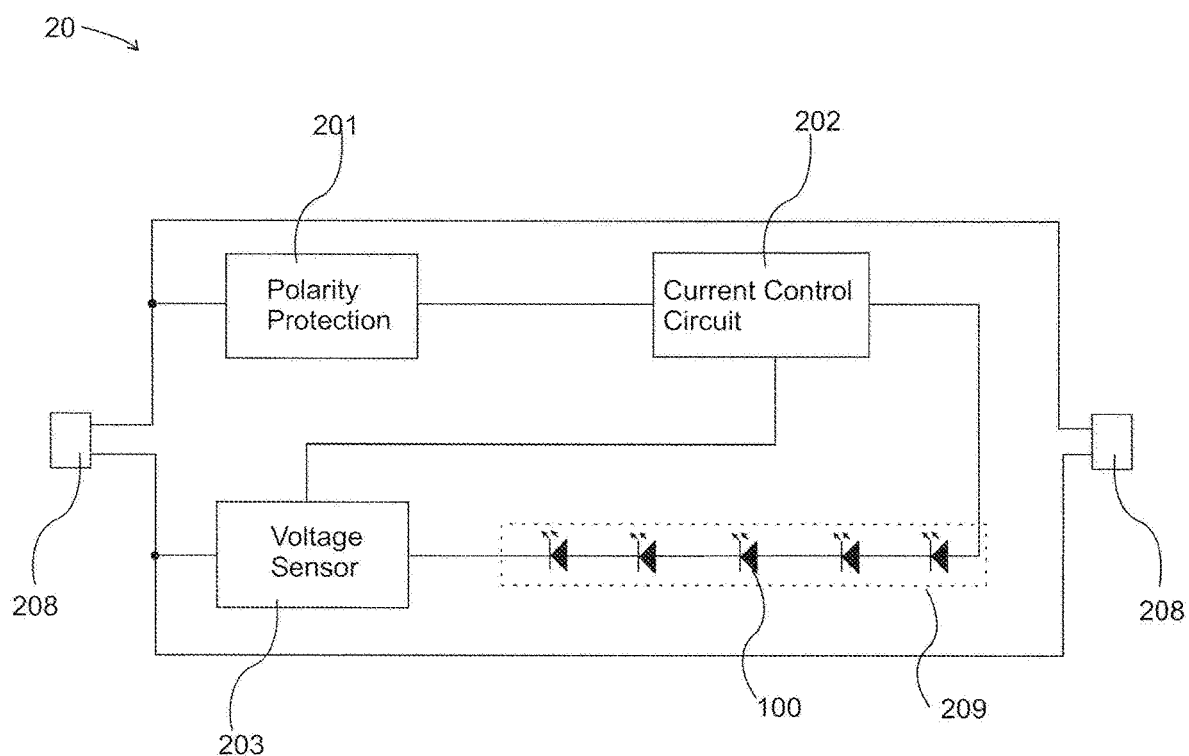
FIG. 13 is a block diagram of single series of electronics (1.5V-72V) for onboard current control.
Figure 14:
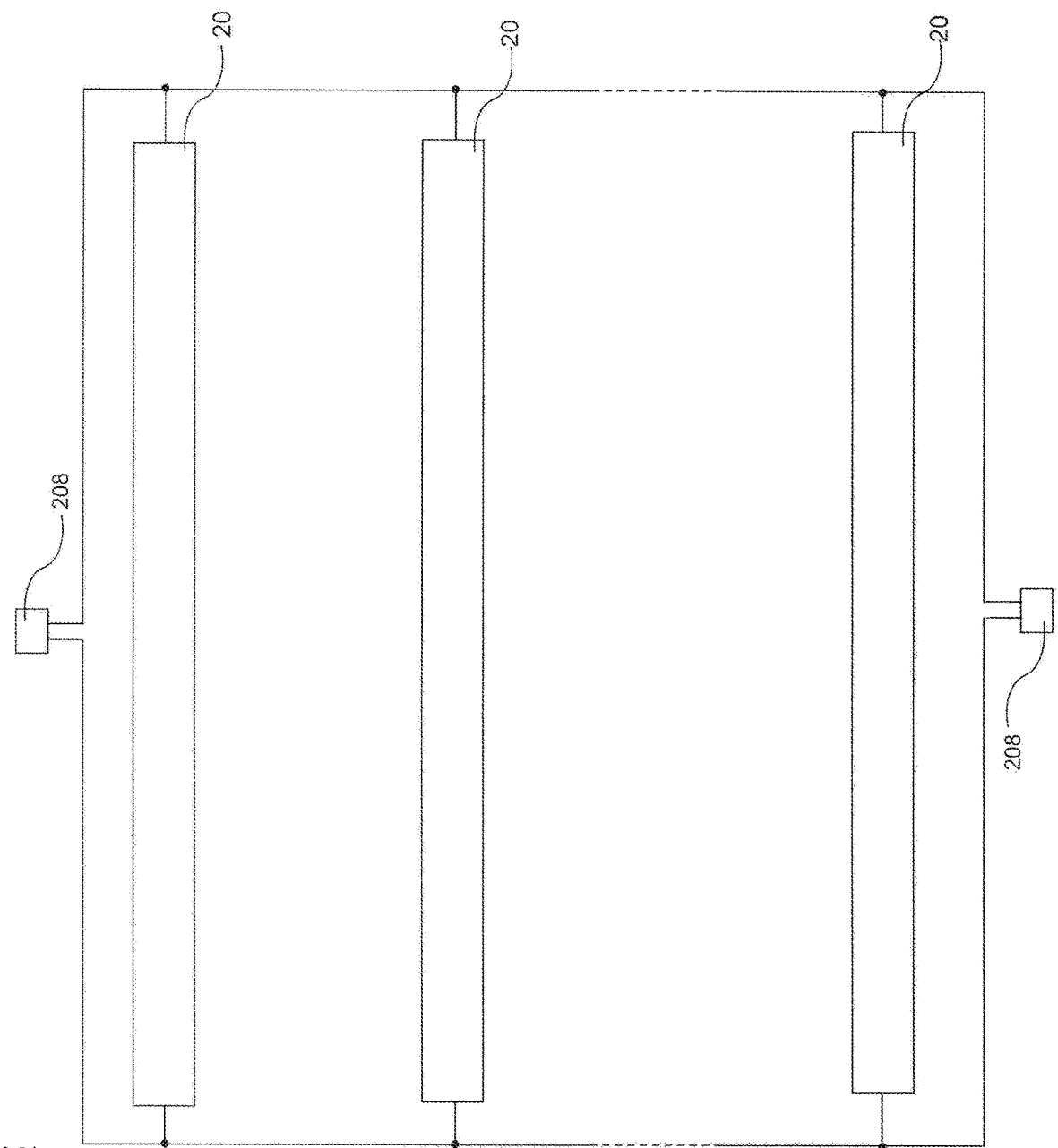
FIG. 14 is a block diagram of multi series of electronic configuration (1.5V-72V) for onboard current control.

FIGS. 13 and 14 show circuit diagrams with an example circuit 20 for onboard current control. The circuits of FIGS. 13, 14, 35, 36 may all be placed on the circuit board or boards 101. FIG. 13 illustrates a single circuit 20 connected to a conventional power source 208, while FIG. 14 shows multiple circuits 20 in parallel connected to a conventional power source 208. The circuit boards 101 for the circuits 20 may be made of fiberglass based printed circuit board (PCB) or metal based (for example Aluminum) PCB or any other suitable PCB material now known or later developed. The circuit boards 101 may be TH type or SMT type. Preferably, the surface of the circuit boards 101 have a white solder mask and exposed areas of tinned plane so as to efficiently reflect the majority of LED light. The circuit boards 101 may be flexible to accommodate mounting channels and lighting fixtures in different shapes and curves. As shown in FIGS. 13 and 14, the LED array is divided into sets 209 of LEDs, with for example five LEDs per set. As shown in FIG. 14, the onboard current control circuitry is formed of multiple circuits 20. Each circuit 20 provides current control for a corresponding set 209 of LEDs in the LED array.

The onboard current control circuitry 20 is configured to provide constant current to the LEDs 100 of the LED array 209. A polarity protection circuit 201 of conventional design safeguards against the user installing the product in the wrong polarity. Current control is provided by current control circuit 202, also of conventional design. As an example, the current control circuit 202 may be use pulse width modulation (PWM) to control the current supplied to the LEDs. The circuit 202 supplies constant, controlled, current to unit for the entire LED set 209 with information from voltage sensor 203. The voltage sensor 203 receives current information from LEDs 209 and feeds back information to the current control circuitry 202. For example, in the use of PWM, the voltage sensor 203 converts the current of LED array 209 to voltage signal and supplies the voltage signal to the current control circuit 202. The current control circuit 202 senses how much the detected voltage varies from the desired level, and by varying the pulse width or frequency, changes the current supplied to the LEDs towards the desired level. The power supply 208 may be AC or DC, although in the example shown it is DC. Current control provides constant brightness and prevents overheating. A typical pulse frequency for the current control may be 200 kHz to 4 MHz. This low voltage application shown here provides voltage for applications below about 72 volts.

The organization of the circuit boards 101 is shown in FIGS. 15 and 16. FIG. 15 shows a single set of five LEDs 100 with circuit components 201, 202 and 203. FIG. 16 shows an exploded side view of an LED lighting system 10, with support structure 102, cover 107 and with LEDs 100, which LEDs may be for example secured or joined to a circuit board 101 by any suitable means as for example soldering or heat sink compound 117.

Figure 17:
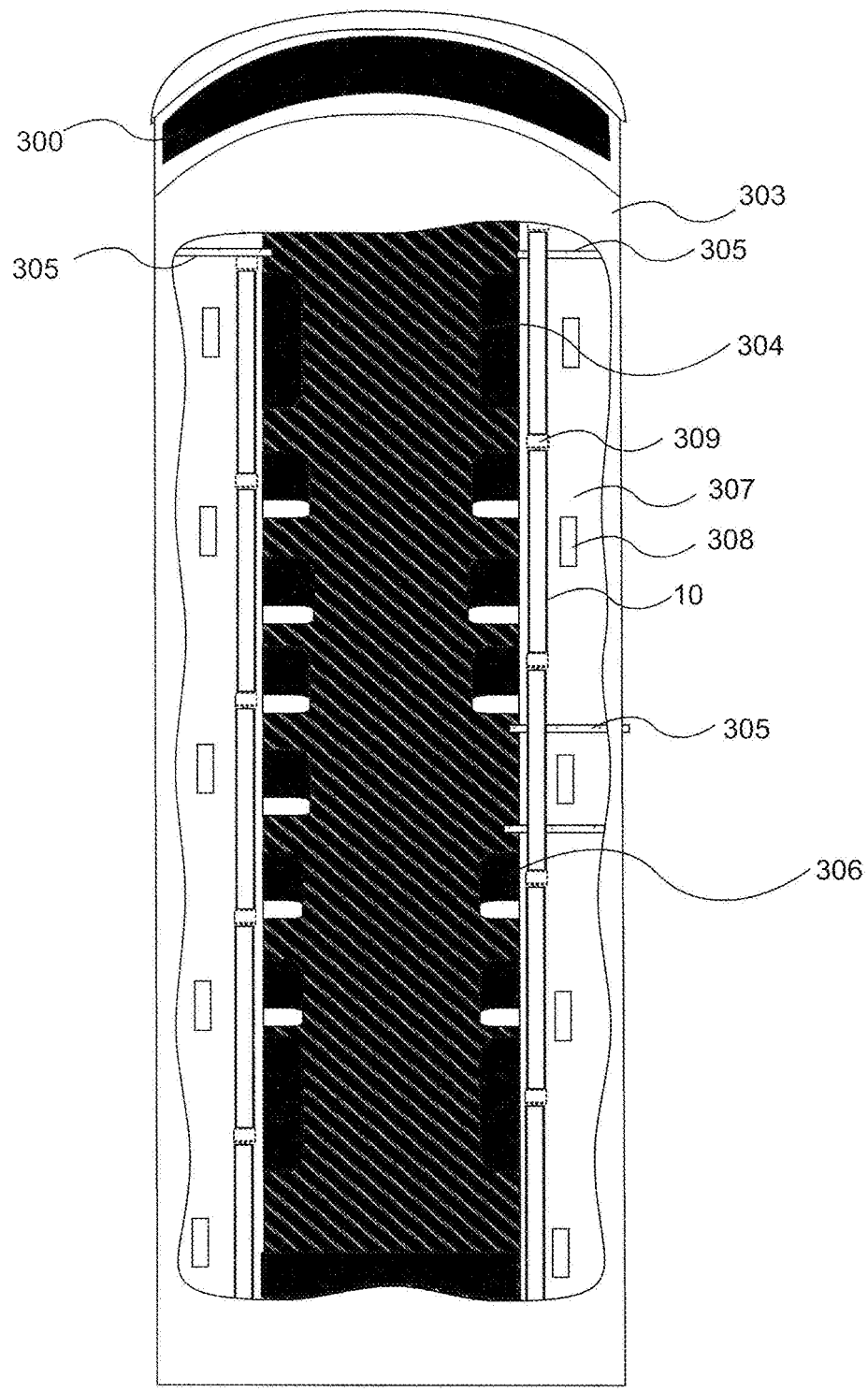
FIG. 17 shows an LED lighting system in a mass-transit application, bus shown here for reference purposes, new or retrofit application.
Figure 18:
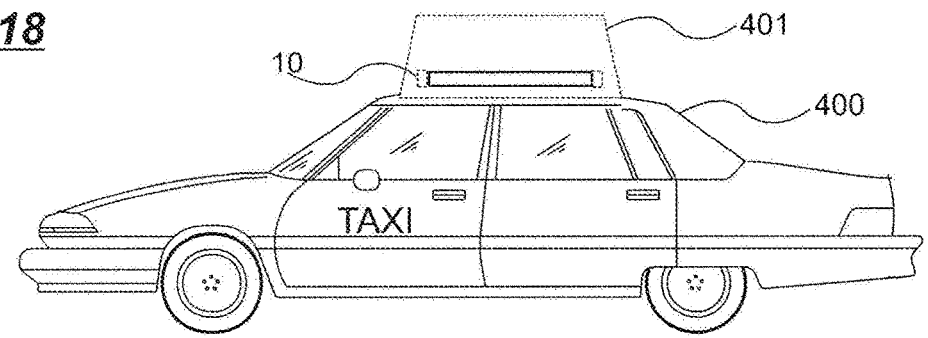
FIG. 18 shows an LED lighting system in a vehicle application, taxi side view, for taxi advertisement sign.
Figure 19:
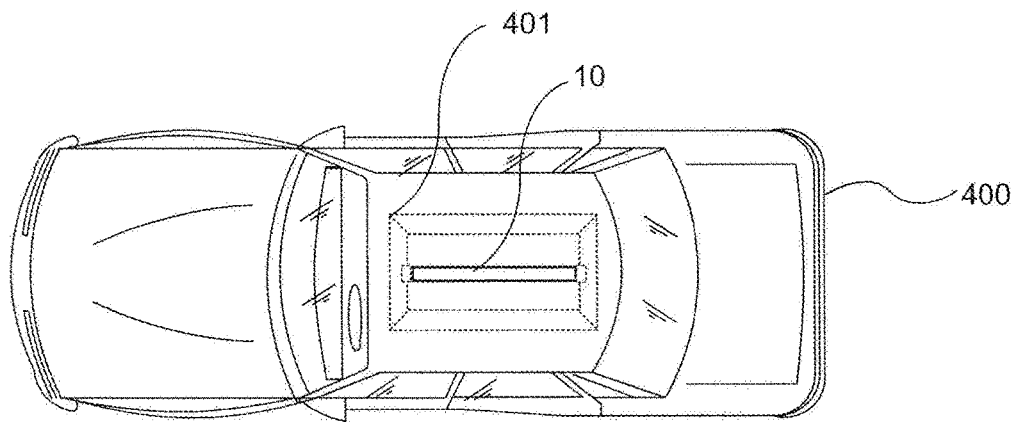
FIG. 19 shows an LED lighting system in a vehicle application, taxi top view, for taxi advertisement sign.
Figure 20:
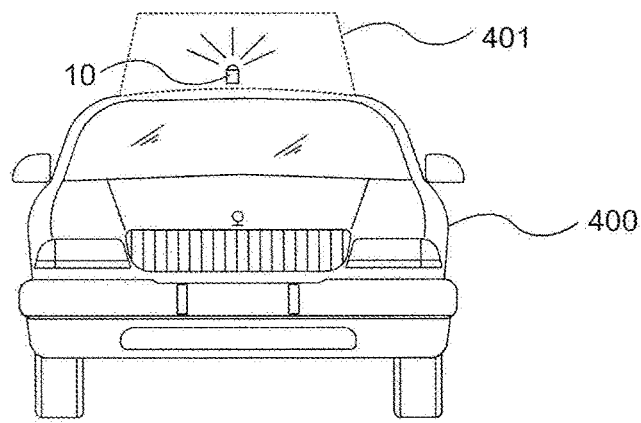
FIG. 20 shows an LED lighting system in a vehicle application, taxi front view, for taxi advertisement sign.
Figure 21:
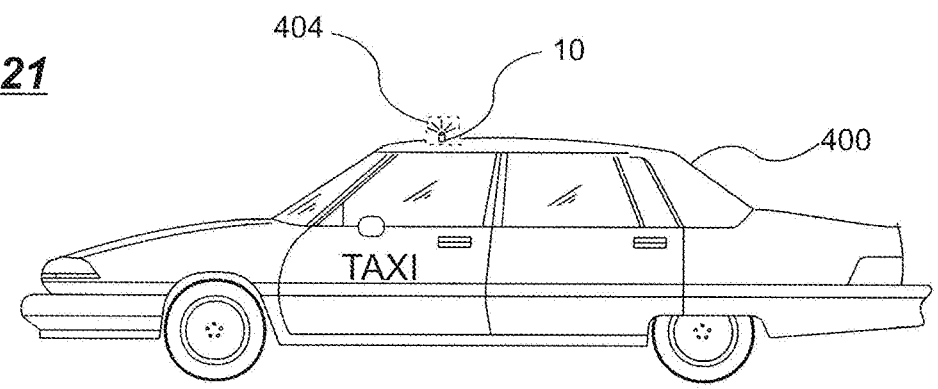
FIG. 21 shows an LED lighting system in a vehicle application, taxi side view, for taxi 'on-duty' sign.
Figure 22:
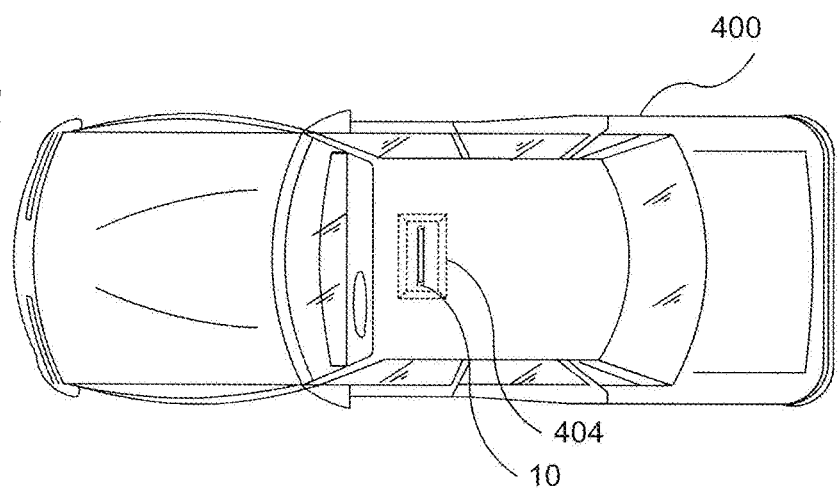
FIG. 22 shows an LED lighting system in a vehicle application, taxi top view, for taxi 'on-duty' sign.
Figure 23:
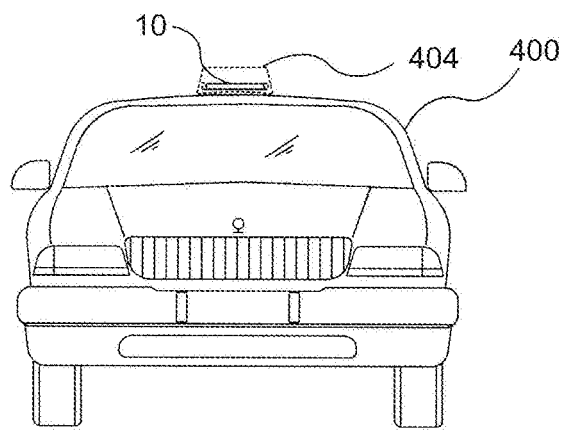
FIG. 23 shows an LED lighting system in a vehicle application, taxi front view, for taxi 'on-duty' sign.
Figure 24:
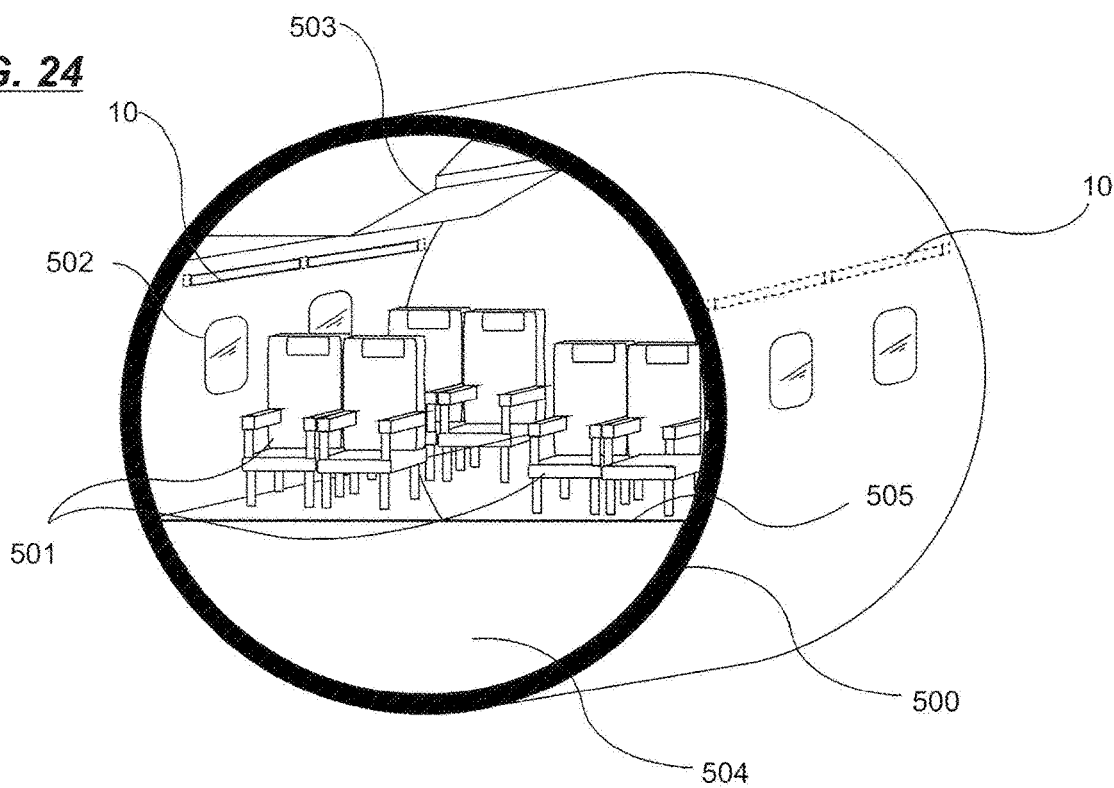
FIG. 24 shows an LED lighting system in an airplane application, cross cut view of fuselage.
Figure 25:
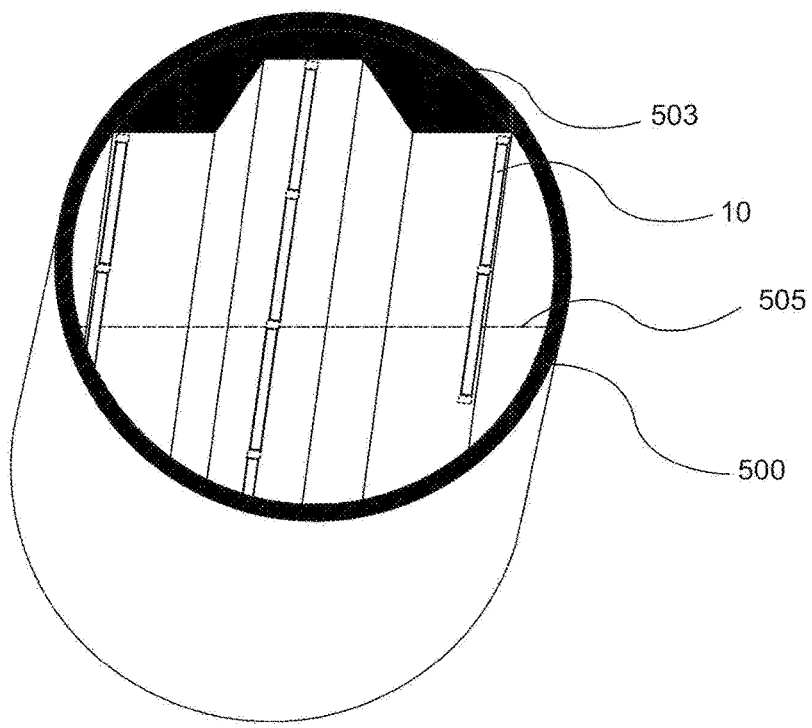
FIG. 25 shows an LED lighting system in an airplane application, bottom view of fuselage.
Figure 26:
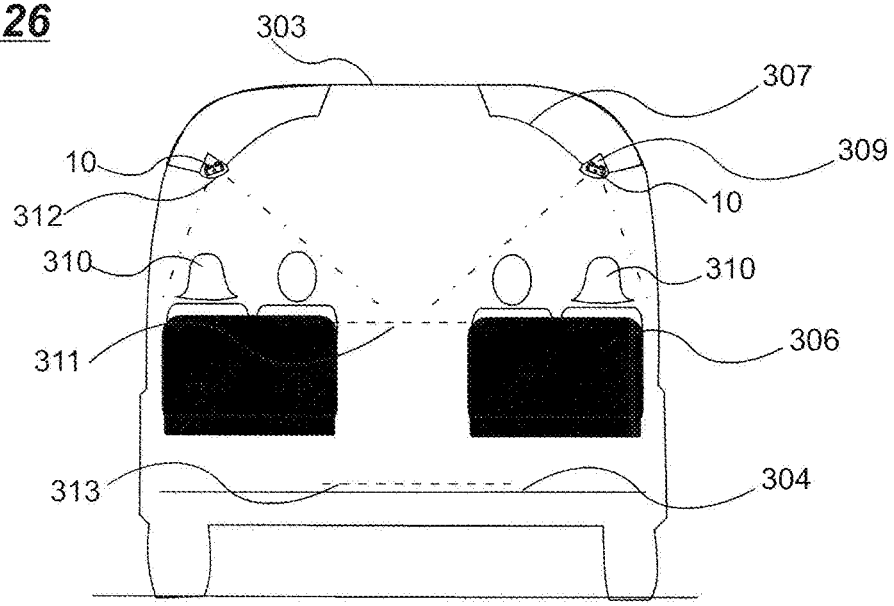
FIG. 26 shows an LED lighting system in a mass-transit application, cross cut view of bus.
Figure 27:
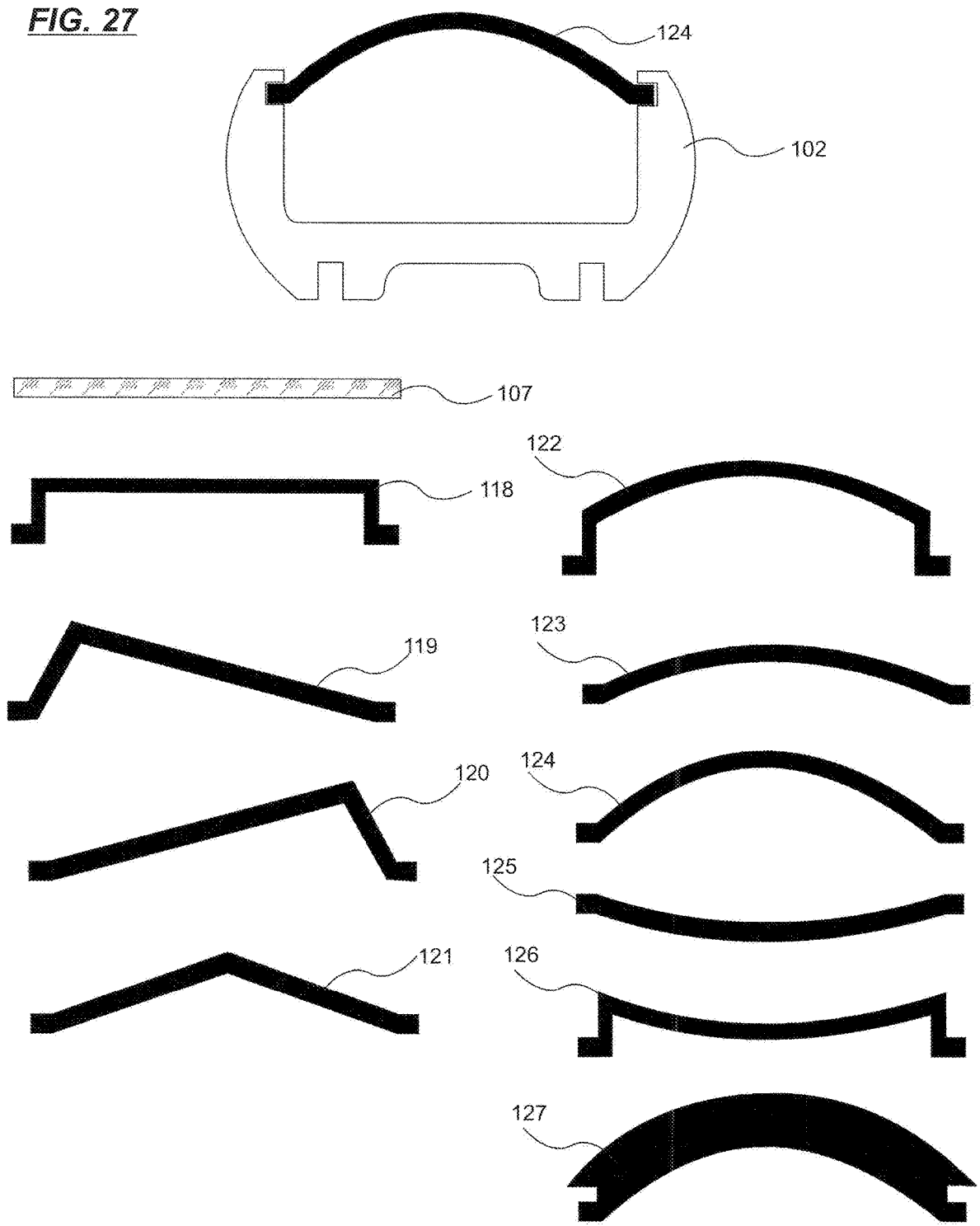
FIG. 27 shows some examples of lenses for the LED lighting system.

FIG. 17 is an example of an LED lighting system or tube 10 in a mass transit application. A transit vehicle has a body or hull 303 with a windshield 300. The break away shows floor 304, with seating 306 and partitions 305. Lighting tubes 10 may be installed in pre-existing fluorescent light sockets or receptacles 309, with bypassing or removal of the fluorescent light ballasts 308. FIG. 26 is another view of the mass transit application, showing also passengers 310 and a reading plane 311 and floor plane 313, which acts as a test zone for establishing whether the LEDs are providing sufficient illumination. FIGS. 18, 19 and 20 illustrate an application in which the LED lighting system 10 is used as part of an advertising sign 401 for a taxi 400. FIGS. 21, 22 and 23 illustrate an application in which the LED lighting system 10 is used as part of an on duty sign 404 for a taxi 400. FIGS. 24 and 25 illustrate installation of the LED lighting system 10 in new or pre-existing fluorescent light fixtures of an aircraft with a fuselage 500, seating 501, windows 502, upper luggage compartment 503, cargo area 504 and floor 505.

Figure 28:
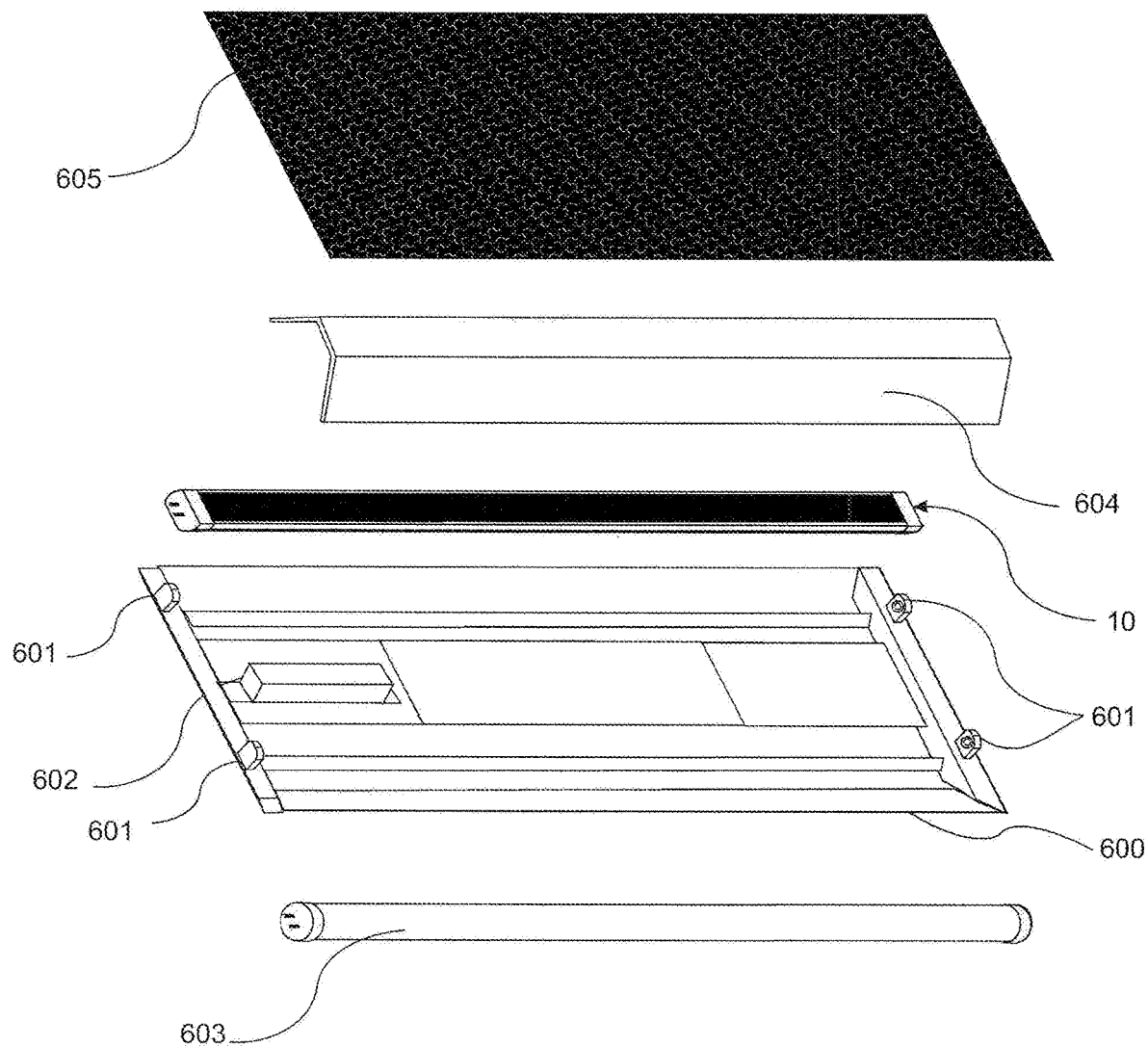
FIG. 28 shows an LED lighting system in a fluorescent lamp, replacement, retrofit, or new installation.
Figure 37:
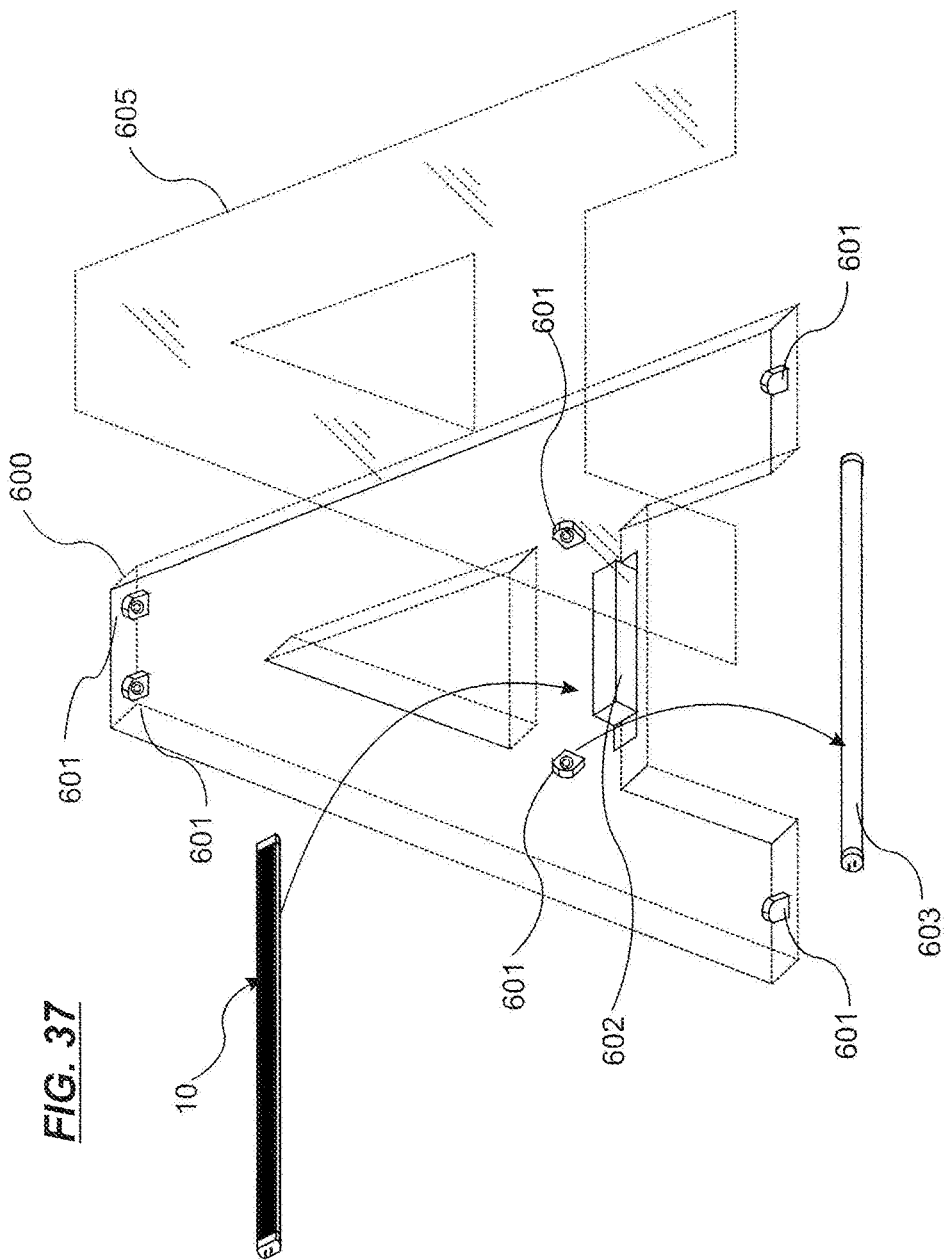
FIG. 37 is a signage application, with a view of replacement of fluorescent lamps in signage.

In FIGS. 27A-27K, various shapes of cover lens 107 are shown including moderate convex 124, straight 107, straight raised 118, asymmetrically peaked 119 and 120, symmetrically peaked 121, raised dome 122, low dome 123, convex 124, depressed low dome 125 raised convex 126, and low dome with channel enclosing 127. FIG. 28 shows a fluorescent lamp fixture 600 with power receptacles or sockets 601, conventional ballast 602 for lamp 603, replacement LED lighting tube 10, ballast cover 604 and diffuser panel 605. While the lens 107 is not required for the final assembly it can be added to act as a guard against vandalism, as a dust/dirt guard, as a light enhancing device, as a light directing/focusing device, as a moisture/waterproofing device (sealing unit completely with the addition of sealant) or as a light diffuser. In FIG. 28, only the lighting tube 10 is new. FIG. 37 shows replacement of a fluorescent lamp 603 in a display sign application with an LED lighting tube 10 that fits between power receptacles 601. The ballast 602 may be removed or bypassed.

Figure 29:
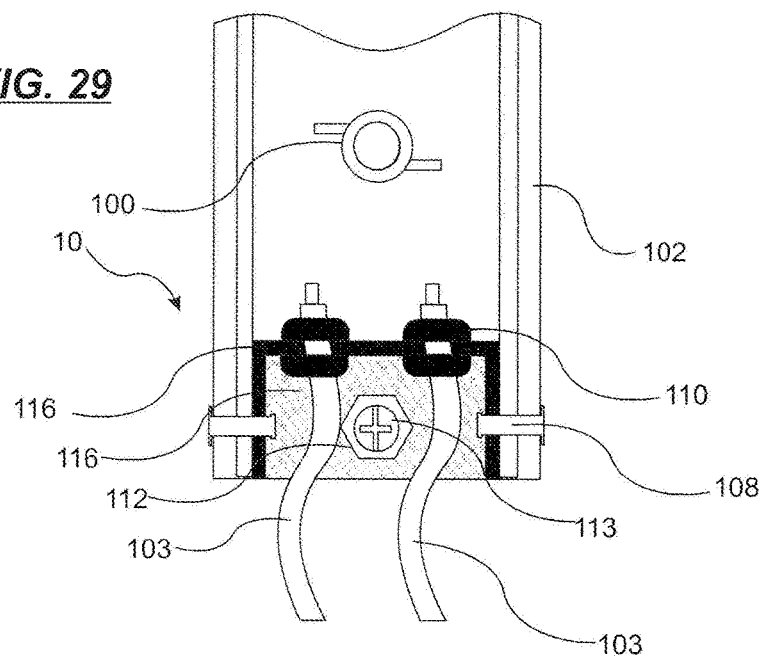
FIG. 29 is a top view of vehicle application LED lighting system, powered end.
Figure 30:
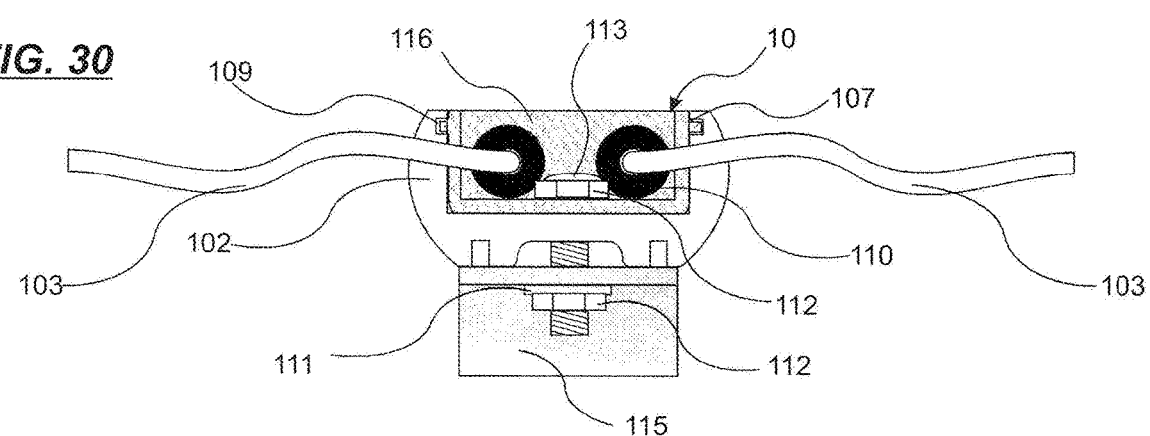
FIG. 30 is an end view of vehicle application LED lighting system, powered end.
Figure 31:
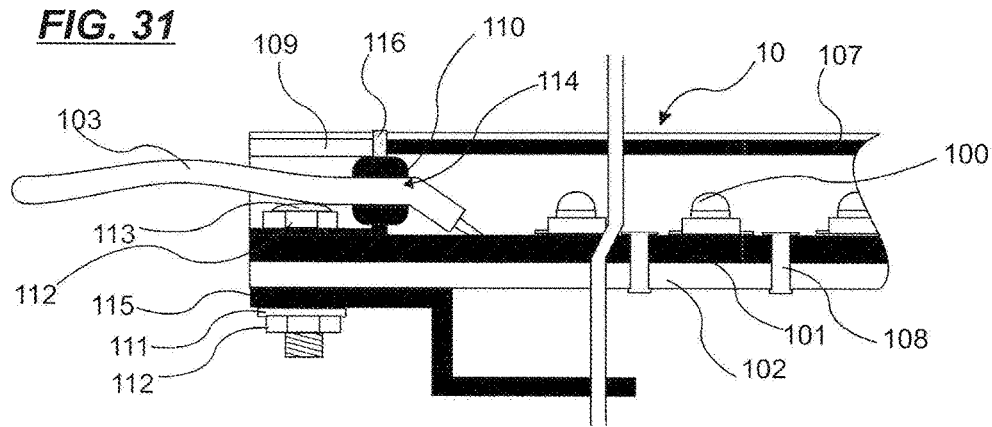
FIG. 31 is a cross cut view of vehicle application LED lighting system, powered end.
Figure 32:
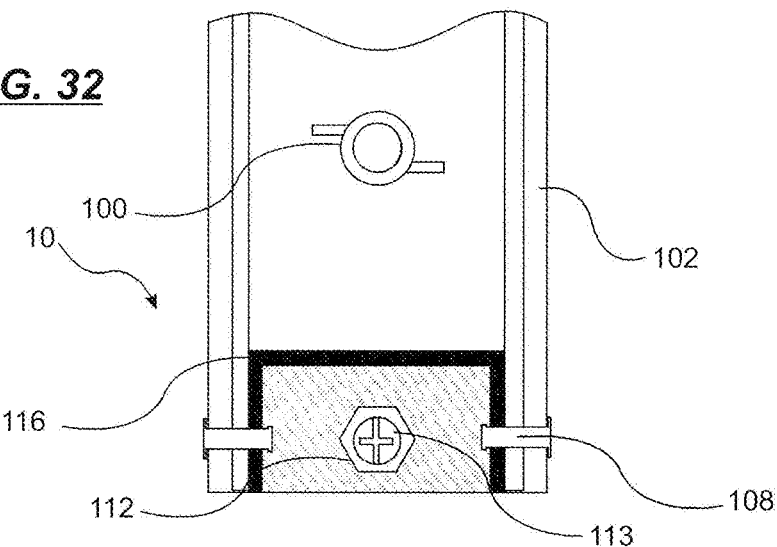
FIG. 32 is a Top view of vehicle application LED lighting system.
Figure 33:
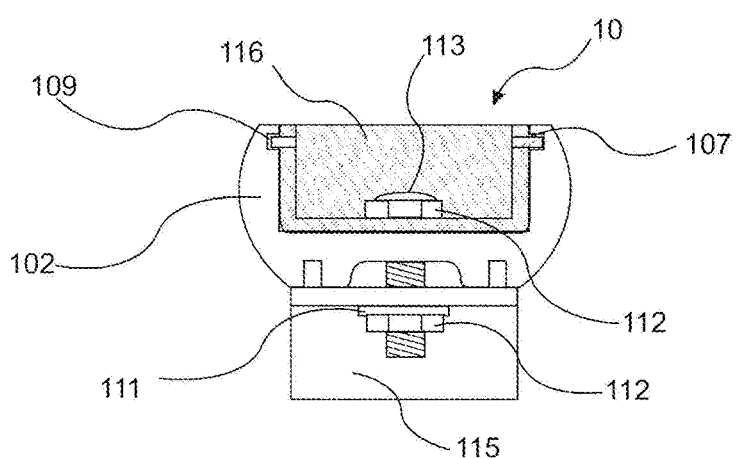
FIG. 33 is an End view of vehicle application LED lighting system.
Figure 34:
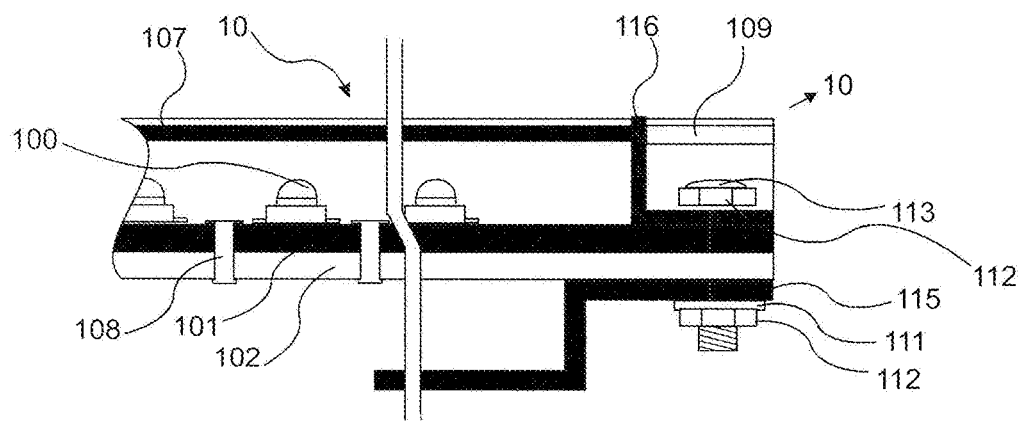
FIG. 34 is a cross cut view of vehicle application of LED lighting system.

In FIGS. 29-31, powered end of an LED lighting tube for a vehicle application includes LED 100 (one of several in the array), support structure 102, connecting wires 103 that connect to the circuit board 101 and rivets 108 for securing the circuit board 101 on the support structure 102. The connecting wires 103 pass through the holes 114 in O-rings 110 that are secured to the upstanding flange of an inner mounting bracket 116. The mounting bracket 116 is secured to the support structure 102 by a bolt 113 secured with nuts 112 and washer 111. Bolt 113 and nuts 112 also secure outer mounting bracket 115 to the support structure 102. Rivets 108 also secure the side walls of the mounting bracket 116 to the channel walls of the support structure 102. Mounting bracket 115 is used to connect the LED lighting tube of this embodiment to a structural portion of a vehicle. FIGS. 32-34 show the non-powered end of the LED lighting system for a vehicle, which is the same as the powered end except that there are no power connections.

Figure 35:
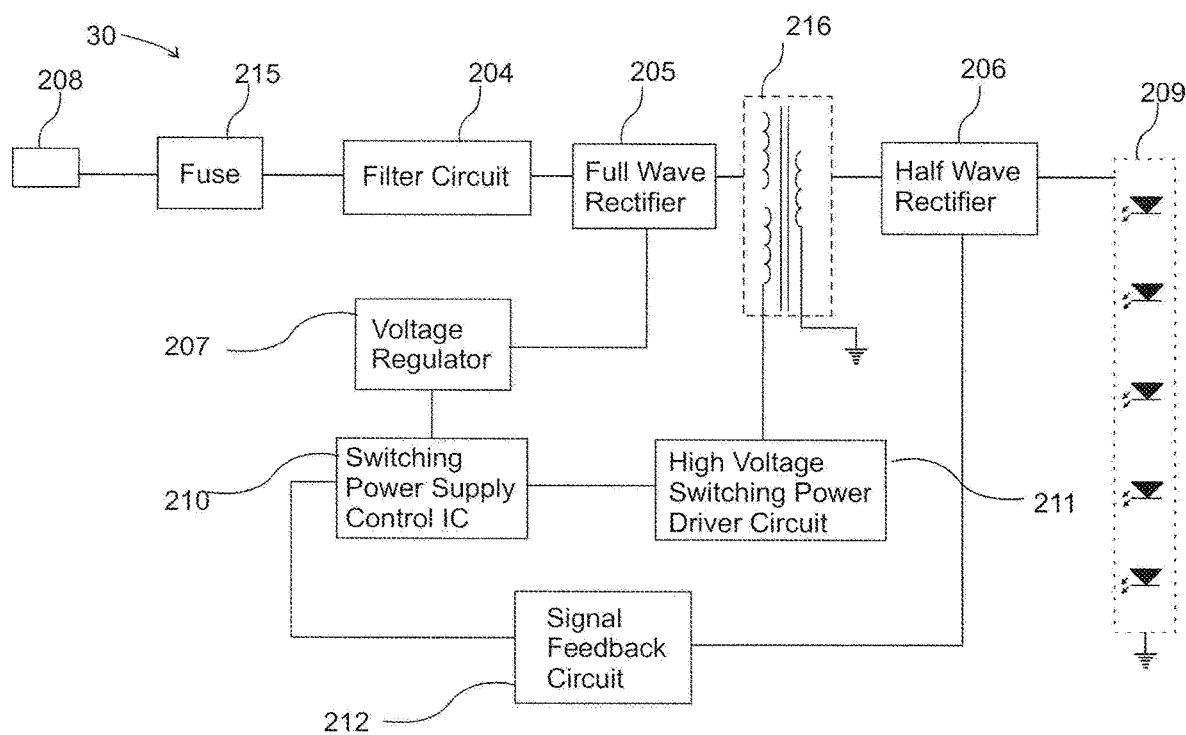
FIG. 35 is a block diagram of current control electronics for a high voltage application, single series (73V-240V)
Figure 36:
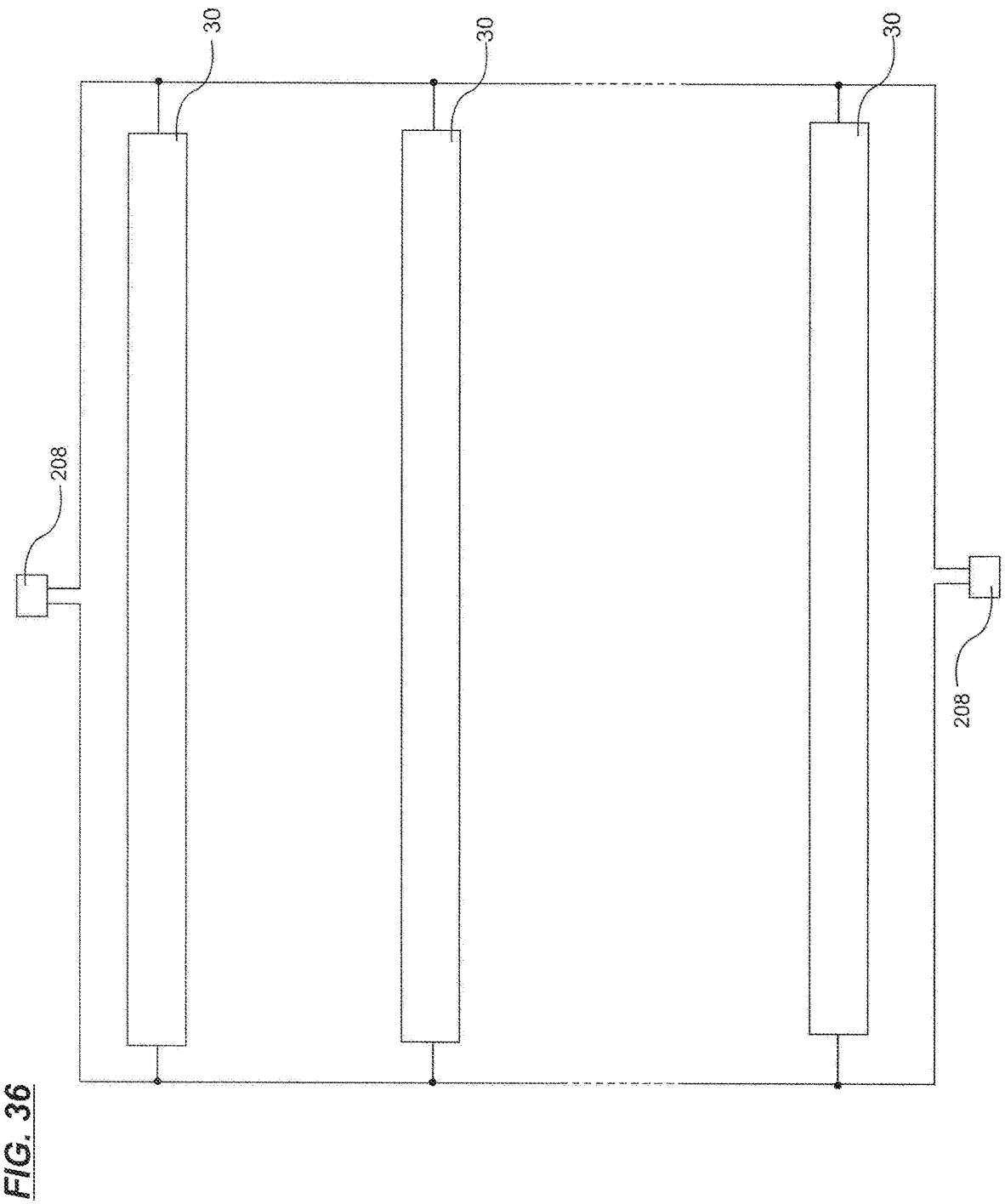
FIG. 36 is a block diagram of current control electronics for high voltage application, multiple series (73V-240V)

FIG. 35 shows electrical circuitry 30 of an current circuit, and FIG. 36 shows several such boards connected in parallel between respective power buses. FIGS. 35 and 36 show circuitry for a high voltage power source, above 72 volts, for example 120 volts to 240 volts, either AC or DC. The example shown here is for AC power supply. Fuse 215 protects the circuitry of the board from power surges. The fuse can be permanent or be a resettable fuse. Bi-directional filter circuit 204 filters out noise. Full wave rectifier 205 transforms AC current from the power bus (left side of figure) to DC current. The DC current from the full wave rectifier 205 is supplied to voltage regulator 207 to step the voltage down to a low level, for example 5 volts, to power switching power supply control IC 210. The switching power supply control IC 210 provides a modulated signal at about 250 kHz or more that determines the switching frequency or pulse width of a high voltage switching power driver circuit 211. The switching signal from driver 211 drives a primary coil of transformer 216, and causes DC voltage supplied by the full wave rectifier 205 to switch at the switching frequency or pulse width determined by the control IC 210. Transformer 216 couples this switching voltage through half-wave rectifier 206 which also filters the high frequency signal from the transformer 216 to the LED array 209 on the right side of FIG. 35. The half-wave rectifier 206 provides the switching frequency or pulse width of the current from the secondary of the transformer 216 and supplies a isolated feedback signal through a signal feedback circuit 212 to control IC 210. Depending on whether the sensed signal is above or below the desired current level, the control IC 210 varies the pulse width or pulse frequency of the signal driven by the driver circuit 211 to ensure a constant average current supplied to the LEDs. The transformer 216 both isolates input from the output, which drives the LEDs, and provides a voltage step down from high voltage above 72 volts, to low voltage required by the LED array 209. The control IC 210 may also be configured to vary the average current supplied to the LEDs, by suitable controlling the pulse width or frequency of the drive signal to the circuit 211, and thus provide a dimmable controller that can be used to control the brightness of the lighting devices. The switching power supply circuit 30 may be mounted on each circuit board 101, or shared by each of several circuit boards 101 and located at one end of the lighting device 10.

The switching power supply circuit 30 is integrated with the LEDs 100 on each section of printed circuit board 101, so that any defect of each power supply circuits or LEDs 100 would not affect the lighting device 10 as a whole. The other circuit boards 101 of the lighting device are still active. The LED lighting device 10 can be installed in polarity or no polarity, and may have any required length. The LED lighting device 10 may use voltages from 1.5V-240V in both DC and AC, and may fit retroactively into existing fluorescent lighting fixtures after removing or bypassing the ballast. This LED lighting device 10 can be a replacement or retrofit for all existing fluorescent lighting tubes larger than the size of T5.

FIG. 38 and FIG. 39 show two different views of an embodiment of an LED lighting system in which the LEDs 100 lie on flat PCB heat sinks 134. The LED arrays are attached to the flat PCB heat sinks with each of the LED arrays facing in a different direction. Each LED array contains a series of LEDs, each with a conical beam, that together create an illumination field. The orientation of the illumination fields of the LED arrays shown in FIGS. 38 and 39 are angularly offset from each other by 90 degrees. In other embodiments, this angle may change, and/or individual LEDs may have conical beams that are angularly offset from each other. Additional LED arrays may also be provided, with each LED array having a differently oriented illumination field. In one embodiment, the illumination fields of three or more LED arrays may together make up a 360 degree pattern. In the embodiment of FIGS. 38 and 39, an 180 degree lens 133 with guides is attached to the support structure 136 in channel 109, and may slide into place along the channel 109. In FIG. 39, two PCB heat sink slots 135 are formed in the support structure 136. The heat sinks 134 fit in the slots 135. Heat from the heat sinks 134 is in part conducted to the support structure 136 to assist in heat dissipation. A suitable heat conductive material such as aluminum may be used for the heat sinks 134 and support structure 136.

Figure 40:
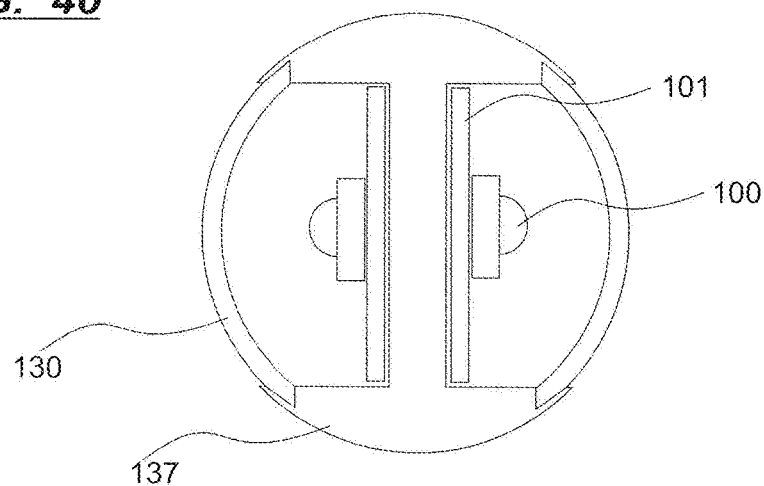
FIG. 40 is a section through a embodiment of an LED lighting system with 360 degree coverage.
Figure 41:
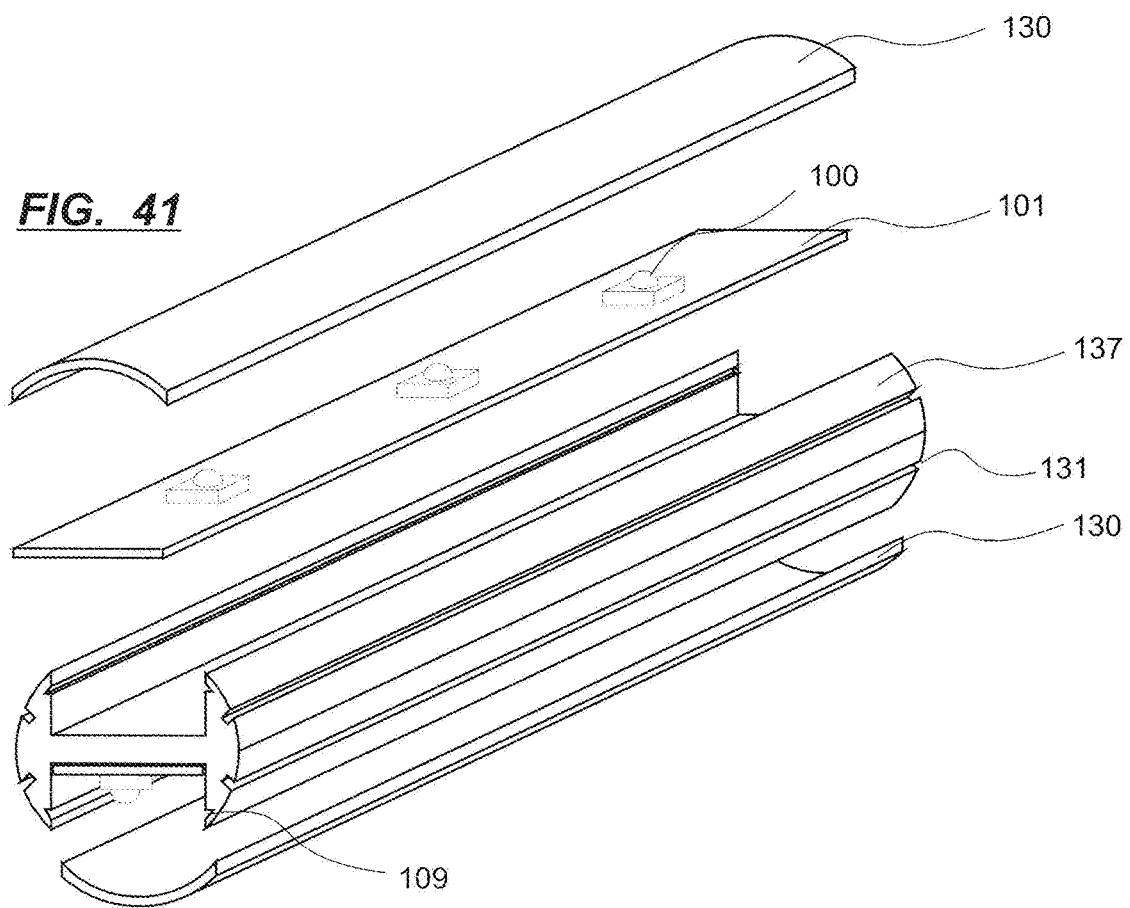
FIG. 41 is an exploded view of the embodiment of FIG. 40.
Figure 51:
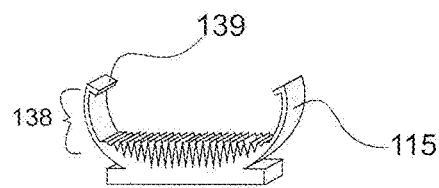
FIG. 51 is a perspective view of a mounting bracket that may be used with the embodiments of for example FIGS. 46-49.
Figure 52:
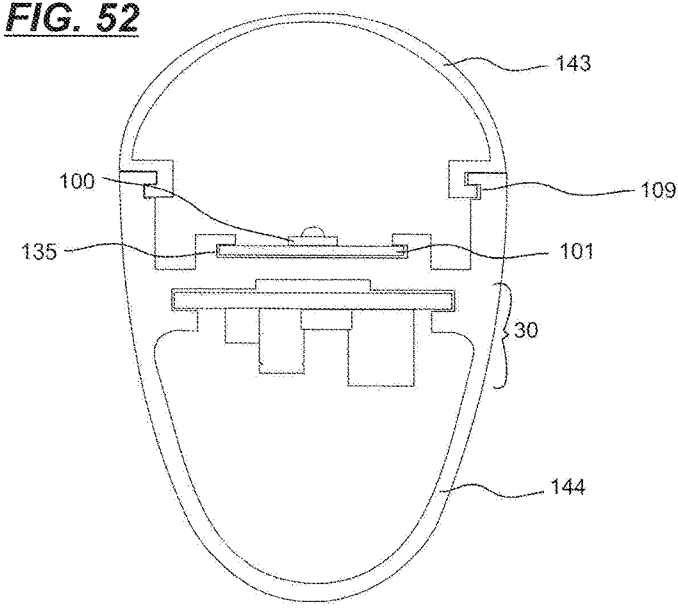
FIG. 52 is a section through an embodiment of an LED lighting system with a domed support structure.
Figure 53:
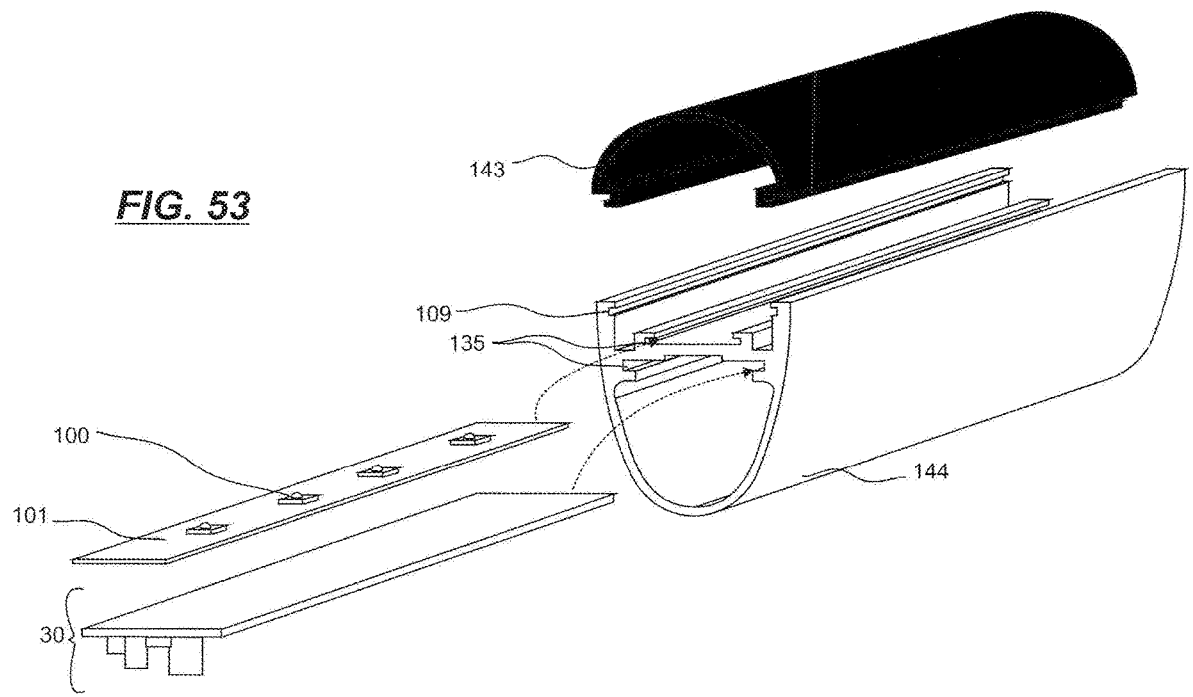
FIG. 53 is an exploded view of the embodiment of FIG. 52.
Figure 54:
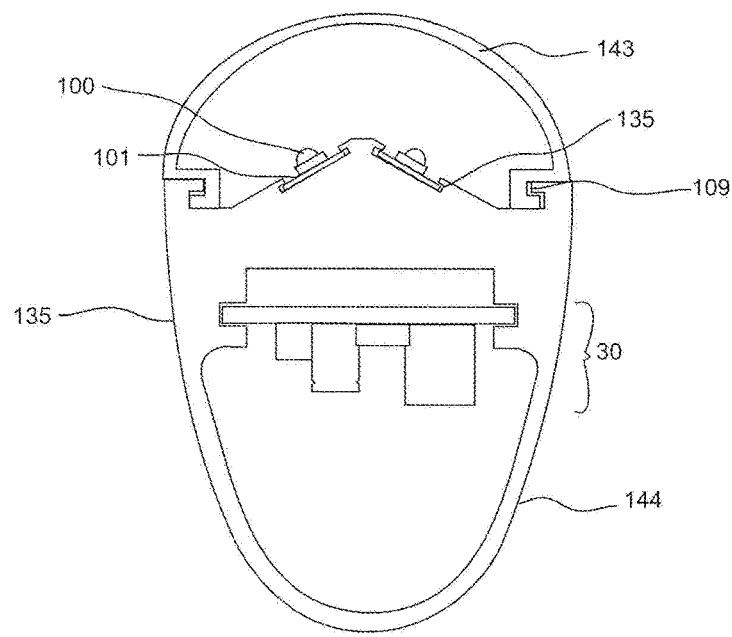
FIG. 54 is a section through a further embodiment of an LED lighting system with a domed support structure.
Figure 55:
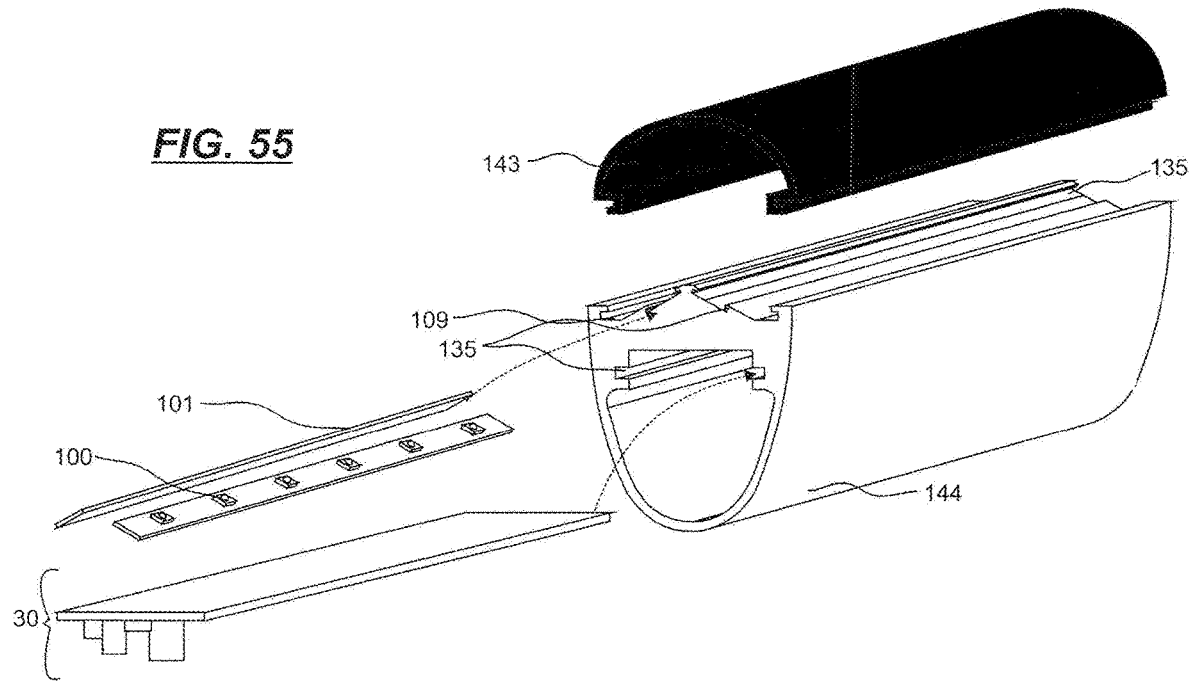
FIG. 55 is an exploded view of the embodiment of FIG. 54.

FIGS. 40 and 41 show a further embodiment of an LED lighting system with 360 degree coverage in which the support structure 137 defines two channels and the LEDs 100 of two LED arrays on circuit boards 101 have illumination fields at 180 degrees to each other. A double sided lens 130 is received in channel 109 in the support structure 137. Grooves 131 on the outside of the support structure are provided for receiving a mounting clip such as mounting clip 115 shown in FIG. 51. Mounting clip 115 has arms 138 with hooks 139 that insert into the grooves 131. The clip 115 may be secured by any suitable means to the structure 137 such as a part of the surface to which it is mounted.

Figure 42:
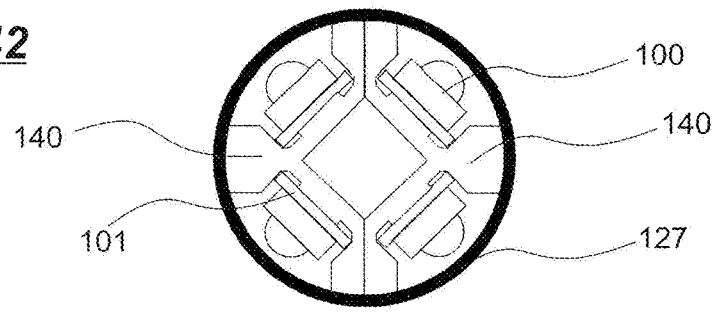
FIG. 42 is a section through a further embodiment of an LED lighting system with 360 degree coverage.
Figure 45:
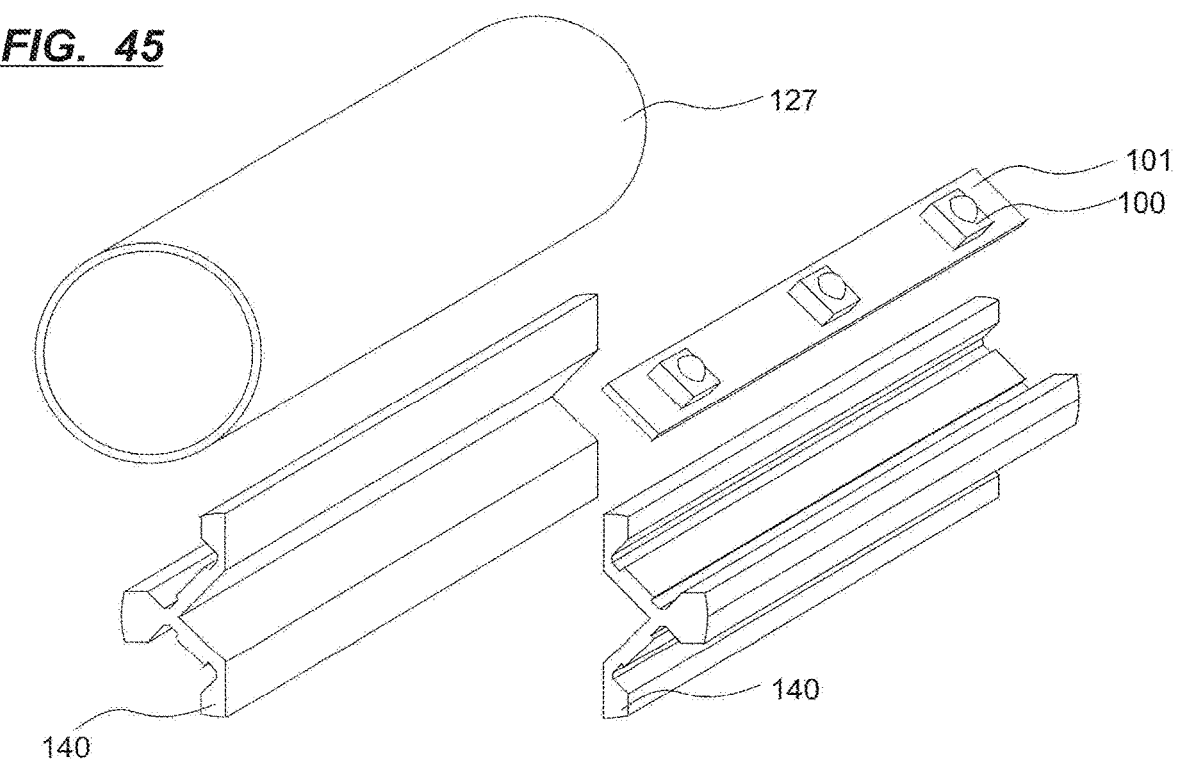
FIG. 45 is an exploded view of the embodiment of FIG. 42.
Figure 50:
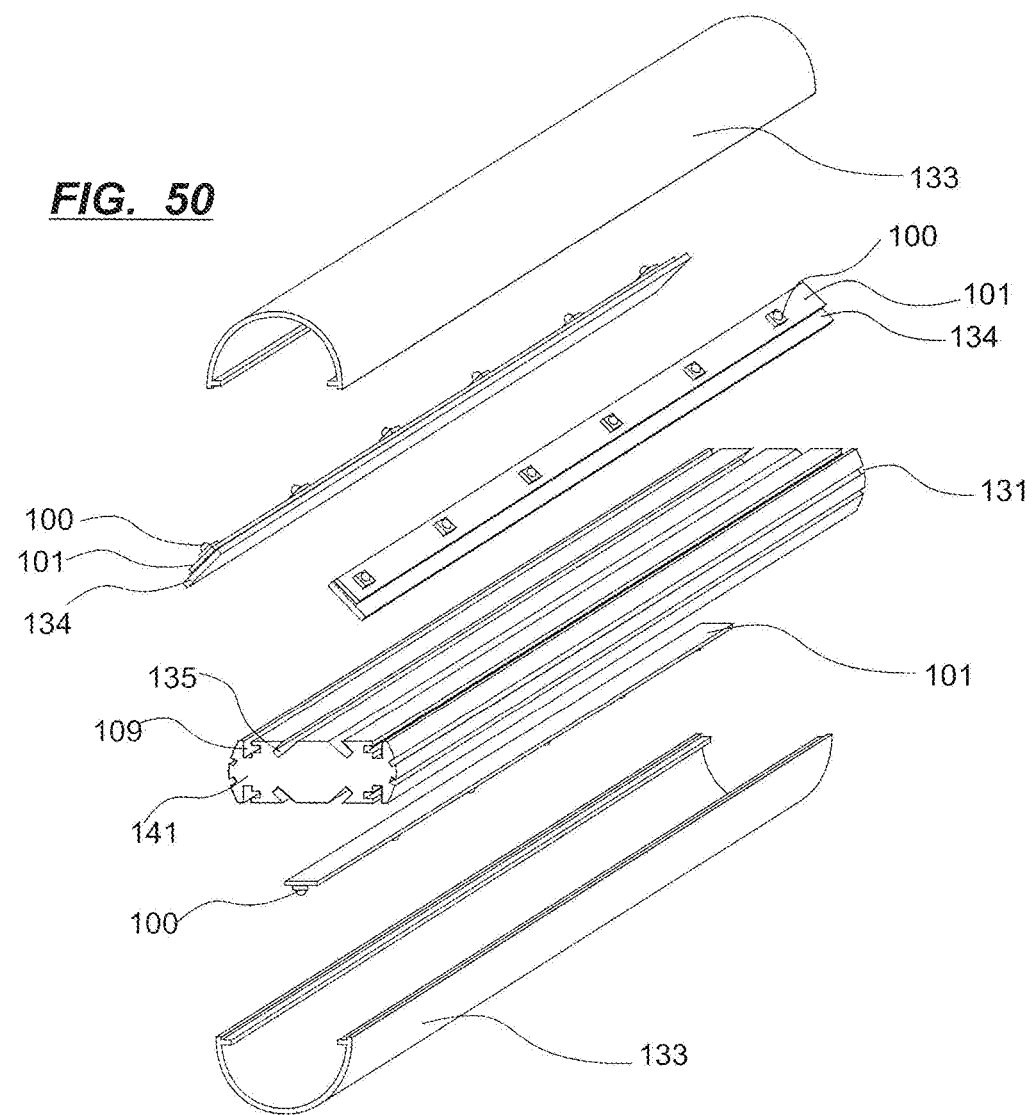
FIG. 50 is an exploded view of the embodiment of FIG. 48.
Figure 66:
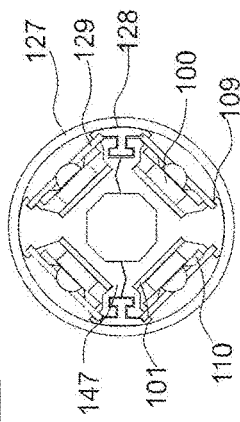
FIG. 66 is a section through a further embodiment of an LED lighting system with 360 degree coverage.

FIGS. 42 and 45 show a further embodiment of an LED lighting system with 360 degree coverage similar to the design of FIG. 66, but the lens covers 129 are omitted, and the locking elements 128 are also omitted, the cylindrical lens 127 being used to secure the elements together.

Figure 43:
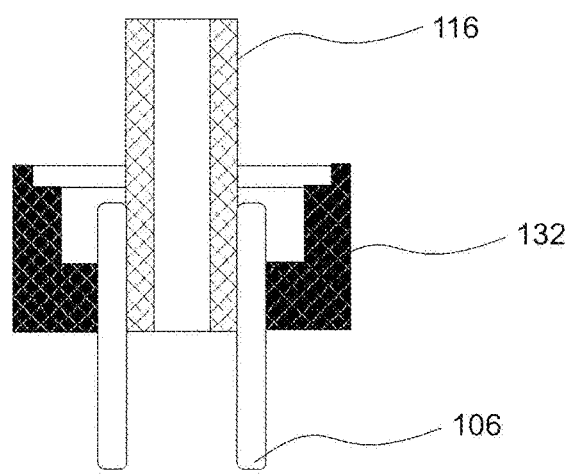
FIG. 43 is a section of an end socket for use with an LED lighting system.
Figure 44:
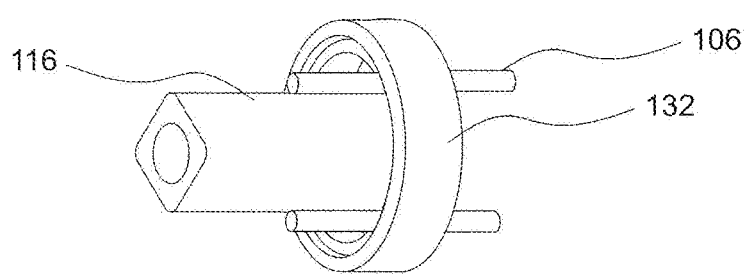
FIG. 44 is a perspective view of the embodiment of FIG. 43.

FIGS. 43 and 44 shows an end socket for use with an LED lighting system 10 which uses two pins 106 secured within an inner mounting channel 116 inside an end cap channel 132. This end socket may be used with the designs of hollow support structures (or at least partially hollow) such as those of FIGS. 42, 45, 66 and 67 with the channel 116 protruding into the hollow support structure 140 or 147.

FIGS. 46-50 show how various configurations of LED arrays may be carried by a support structure 141. In these figures, the support structure 141 is the same in each case, and may be provided with one or two semi-cylindrical lenses 133 received in slots 109 running along the length of the support structure 141. Mounting clip grooves 131 are provided on the outer sides of the support structure 141. There may be one (FIG. 46), two (FIG. 47), three (FIG. 48) or four (FIG. 49) circuit boards 101 carrying LEDs 100 in linear arrays that may be directly secured to the support structure 141 or placed on flat PCB heat sinks 134 that are received in angled slots 135 running along the length of the support structure 141. In this way, the orientation and number of the LED arrays can be selected according to the application.

Figure 59:
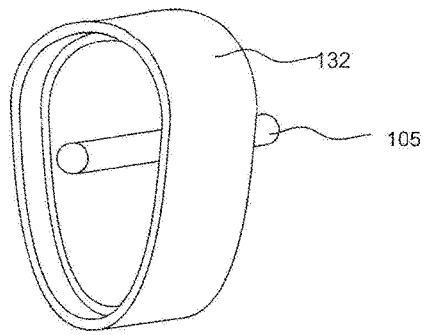
FIGS. 59-65 show a variety of end sockets for use with LED lighting systems.
Figure 60:
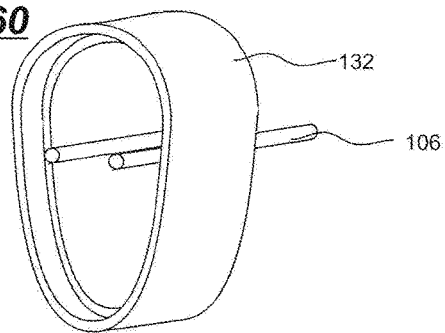
Figure 61:
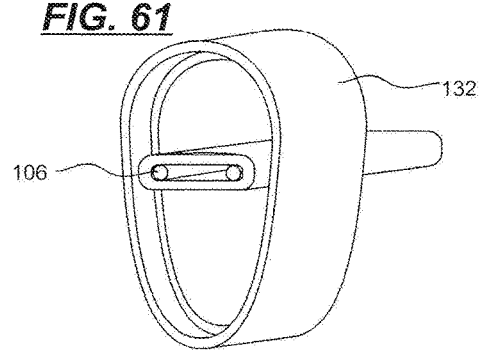
Figure 62:
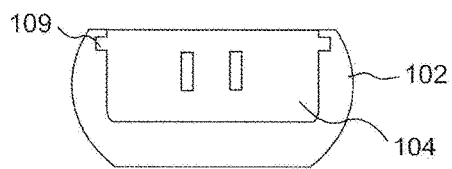
Figure 63:
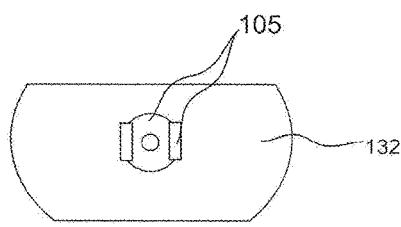
Figure 64:
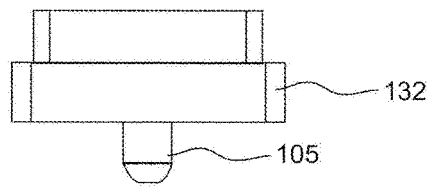
Figure 65:
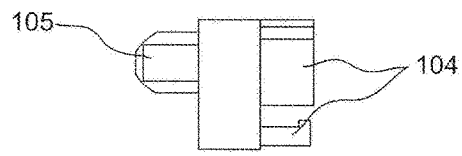

FIGS. 52-55 show a variety of LED lighting systems with a domed support structure 142 and 144. A 180 degree lens 143 has guides that are received in grooves 109 in the support structure 142 and 144. An LED array formed of LEDs 100 on circuit boards 101 in one 180 degree embodiment (FIG. 52) is received in slots 135 on the front side of the support structure, and on the opposite rear side a power supply 30 may be secured by any suitable means within the domed portion of the support structure 142 and 144. In another embodiment (FIG. 54), the LEDs of respective circuit boards 101 have illumination fields that are oriented at different angles, though both illumination fields are perpendicular to the direction of elongation of the support structure. The direction of the illumination field is the direction perpendicular to the light emitting surface of the LEDs 100. The embodiments of FIGS. 52-55 may be connected to fixtures by end cap channels 132 as for example shown in FIGS. 59-61.

Figure 56:
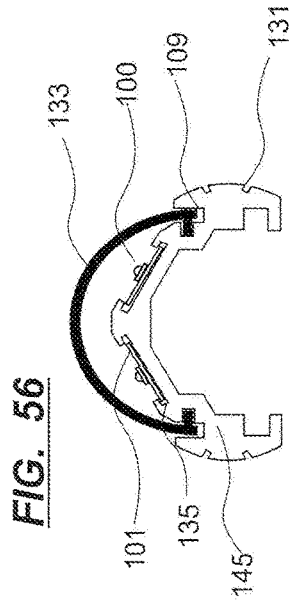
FIG. 56 is a section through a further embodiment of an LED lighting system with differently angled LED arrays.
Figure 57:
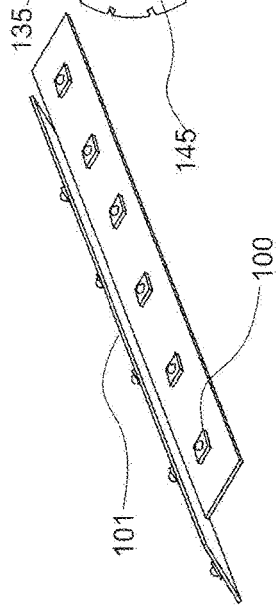
FIG. 57 is an exploded view of FIG. 56.
Figure 58:
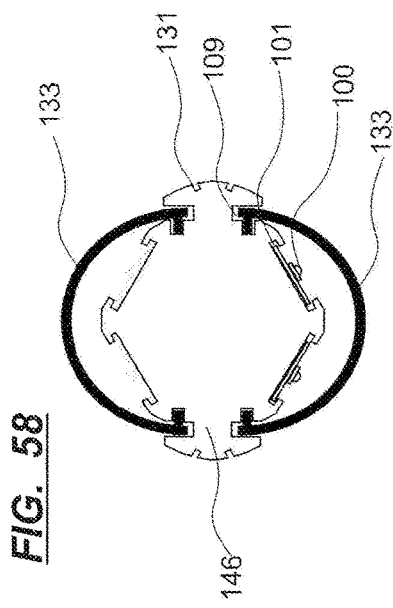
FIG. 58 is a section through a further embodiment of an LED lighting system with differently angled LED arrays.

FIGS. 56 and 57 show further embodiments of an LED lighting system with differently angled LED arrays. In this embodiment, the support structure 145 may be mounted by clips with lips that are received in grooves 131. The embodiment of FIG. 58 is an example of an LED lighting system with 360 degree illumination field generated by four LED arrays at angles to each other, with semi-cylindrical lenses 133, and also that may be mounted on a mounting clip.

FIGS. 62-65 show a variety of end sockets for use with LED lighting systems, showing support structure 102, end cap 104, pin connector Type 1 105, and end cap channel 132.

Figure 67:
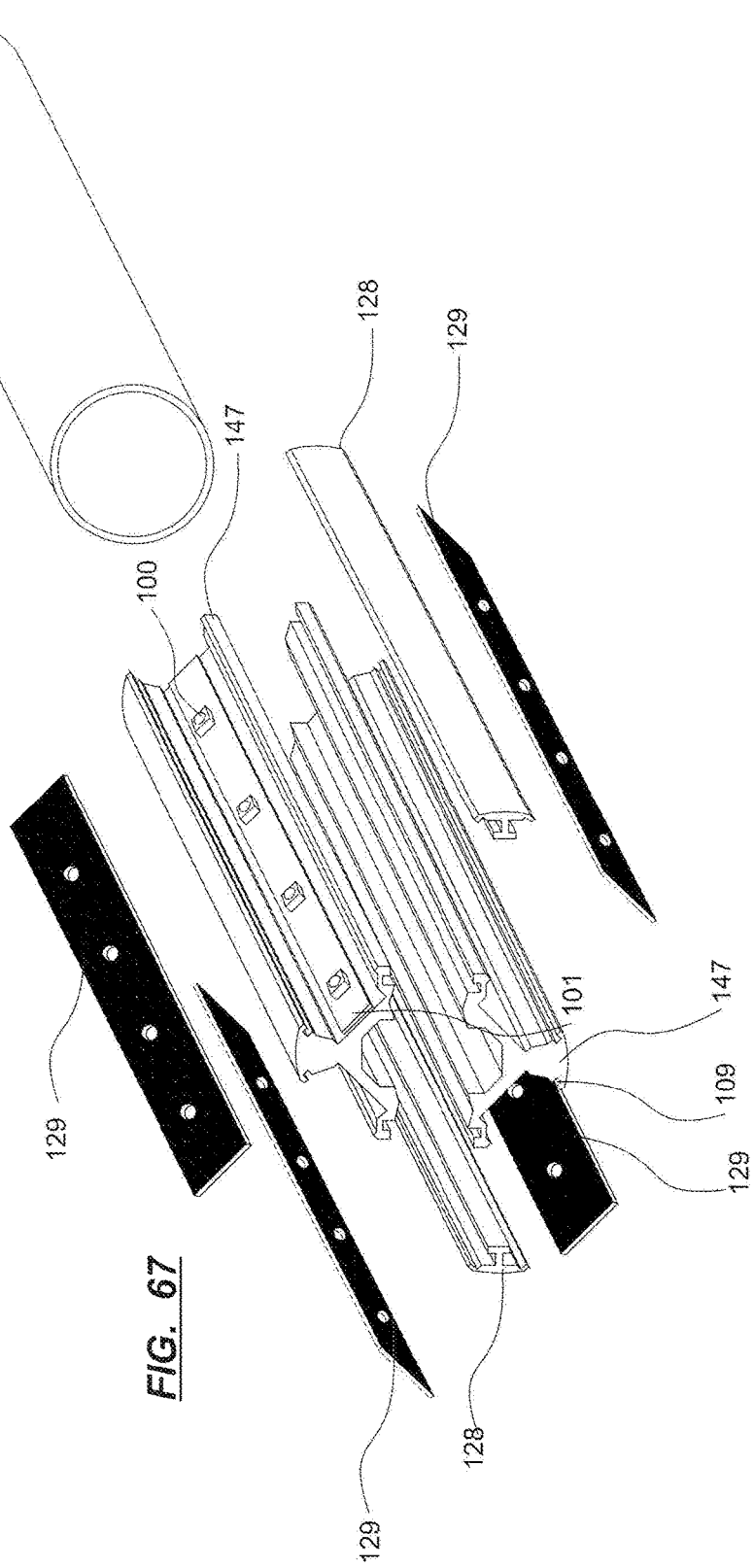
FIG. 67 is an exploded view of the embodiment of FIG. 66.

FIGS. 66 and 67 show an embodiment of an LED lighting system with 360 degree coverage. In this embodiment, there are four LED arrays each secured to one piece of a two piece hollow support structure 147. In this example, the support structure 147 forms four channels at the base of which circuit boards 101 holding the LEDs 100 are fixed by any suitable means. The four channels are defined by four arms of the support structure 147. Lens covers 129 are received in slots running the length of the arms and are provided with openings for the LEDs. The LEDs protrude into the openings. A cylindrical lens 127 surrounds the support structure 147. The two pieces of the support structure 147 are held together by locking elements 128.

Figure 68:
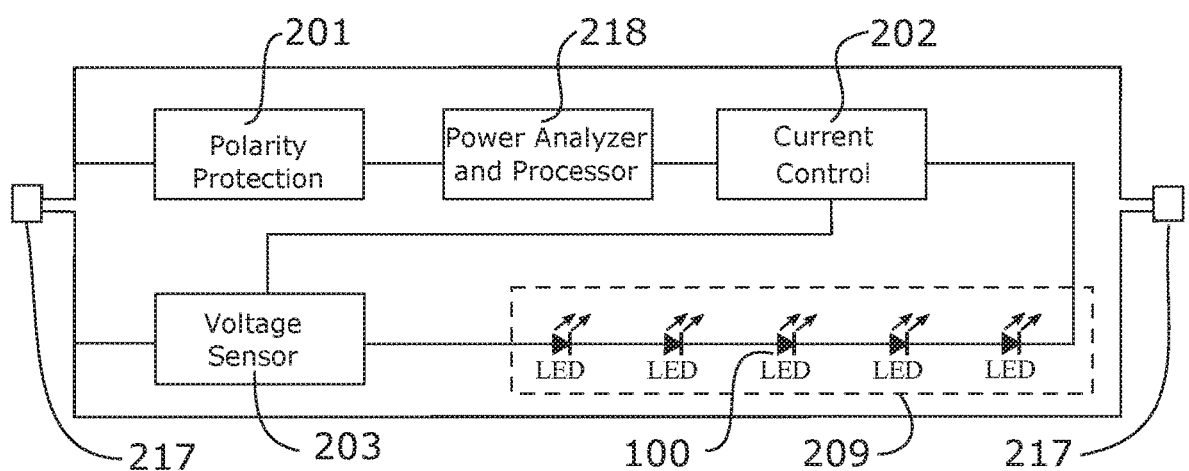
FIG. 68 is a block diagram of the main structure of an LED lighting system, which has a 2-wire power source and power analyzing and processing circuitry.

FIG. 68 illustrates the main structure of a LED lighting system connected to a 2-wire power source 217.

A polarity protection circuit 201 of conventional design safeguards against the user installing the product in the wrong polarity.

The power source 217 may be AC or DC. The characteristics of the power source 217, such as voltage amplitude, power frequency and pulse width, can be adjusted.

The power analyzer and processor 218 connects to the power source 217 and analyze the characteristics of power source 217 such as the voltage amplitude, power frequency and pulse width. Then the power analyzer and processor 218 compares one or all of these characteristics to the preset control criteria, which could be realized by hardware or software or both. According to the comparison results, the power analyzer and processor 218 controls the current control circuit 202 to adjust the function of LED arrays 209.

This method is different from the common ways used for the LED lighting control. Traditionally to control the LED lights a control signal has to be provided to the lights either through a separated control pin or wire, or wireless technology, or technologies like signal carrier, or the technology in a master-slave mode. When the LED lights work in master-slave mode the LED arrays are controlled by the power source directly. For example the power source's voltage is applied to the LEDs directly, so the LEDs are lit up when the voltage goes up and dim down when the voltage goes down. In our invention the power source is not applied to the LEDs directly. The power source's characteristics, such as voltage amplitude, will be compared to the preset value. The light is controlled according to the comparison results. It is possible the light is lit up when the input voltage goes down, which is totally different from the traditional way. In this way the LED lights can be more conveniently controlled by controlling the characteristics of the power source.

As shown in FIG. 68, the LED array is divided into sets 209 of LEDs, for example five LEDs per set. The current control circuitry 202 is configured to provide constant current to the LEDs 100 of the LED array 209. As an example, the current control circuit 202 may use pulse width modulation (PWM) to control the current supplied to the LEDs. The circuit 202 supplies constant, controlled, current to unit for the entire LED set 209 with information from voltage sensor 203. The voltage sensor 203 receives current information from LEDs 209 and feeds back information to the current control circuitry 202. For example, in the use of PWM, the voltage sensor 203 converts the current of LED array 209 to voltage signal and supplies the voltage signal to the current control circuit 202. The current control circuit 202 senses how much the detected voltage varies from the desire varying the pulse width or frequency, changes the current supplied to the LEDs towards the desired level.

Figure 69:
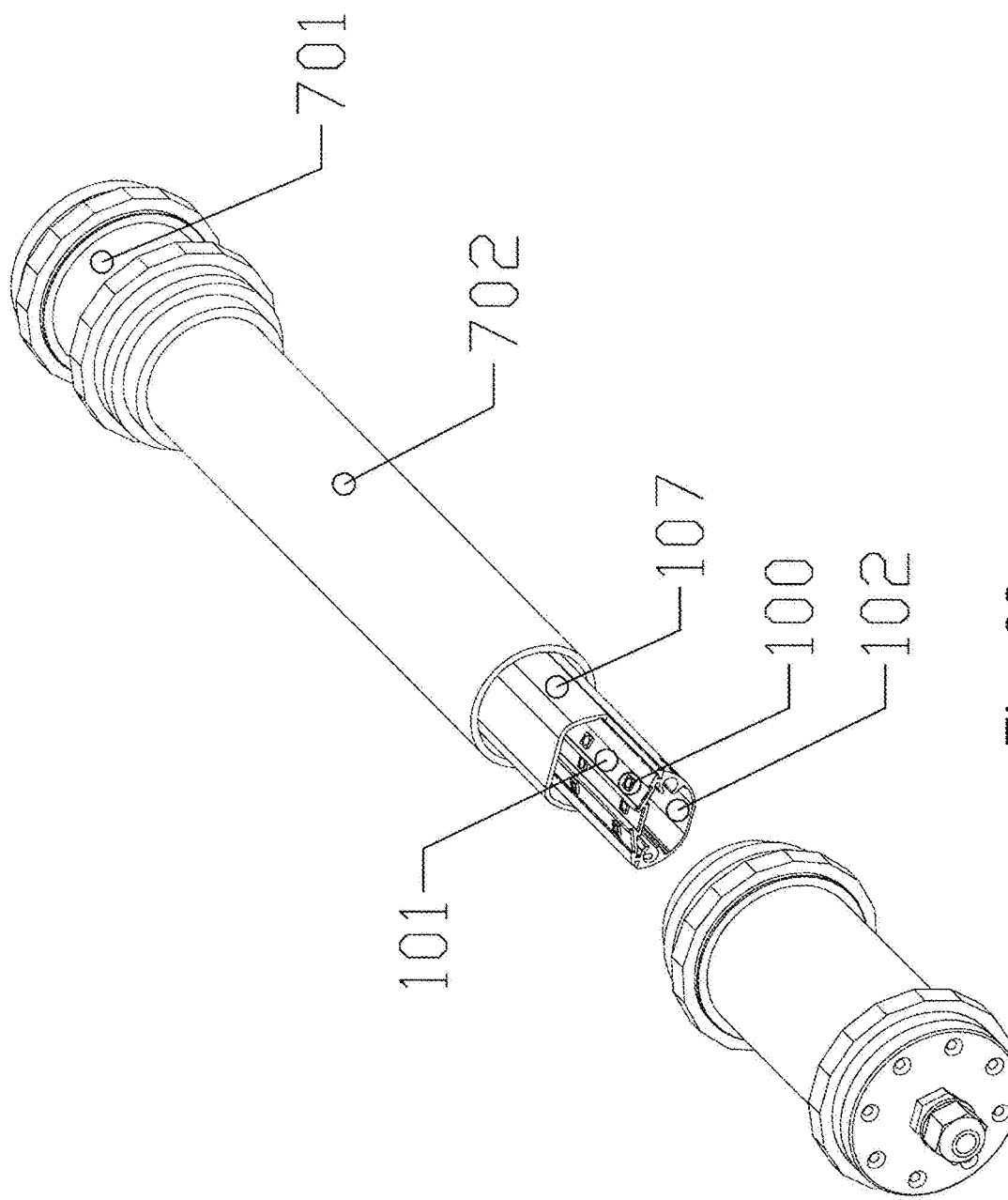
FIG. 69 is a 3-D view of a LED lighting system with two handles and 3 rows of LEDs.
Figure 70:
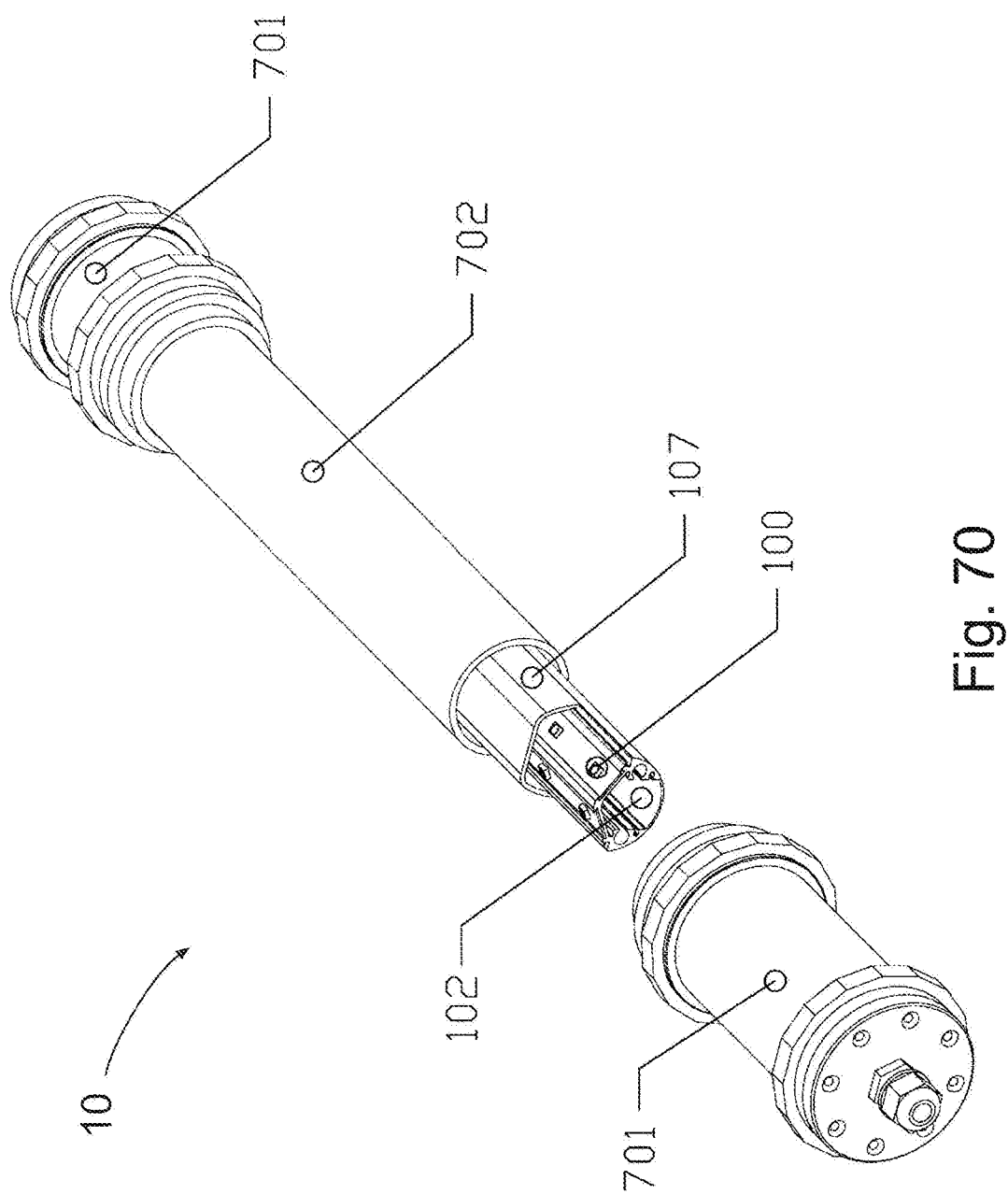
FIG. 70 is a 3-D view of a LED lighting system with two handles and 2 rows of LEDs.

FIG. 69 shows an embodiment of an LED lighting system 10 with two handles 701. Handles 701 are made of metal and/or plastic materials to help the heat dissipation and reduce the shock and vibration. The circuit boards 101 are installed on the housing 102. The Housing 102 is made of heat conductive and rigid material. Cover lens 107 is mounted on the housing 102. It can be transparent or translucent. External lens 702 is a tube made of various materials such as Polycarbonate. Mostly the external lens 702 is clear. It is used to provide water proof and/or anti-explosion features. In this embodiment three rows of LEDs 100 are installed at different angles to provide wider viewing angle. Each row of the LEDs 100 might have different colors, which can be turned on at the same time or individually to provide desired features. In another embodiment, shown in FIG. 70, the shape of the housing 102 can be changed to hold one or two rows of LEDs 100 to provide different angles and functions.

Figure 71:
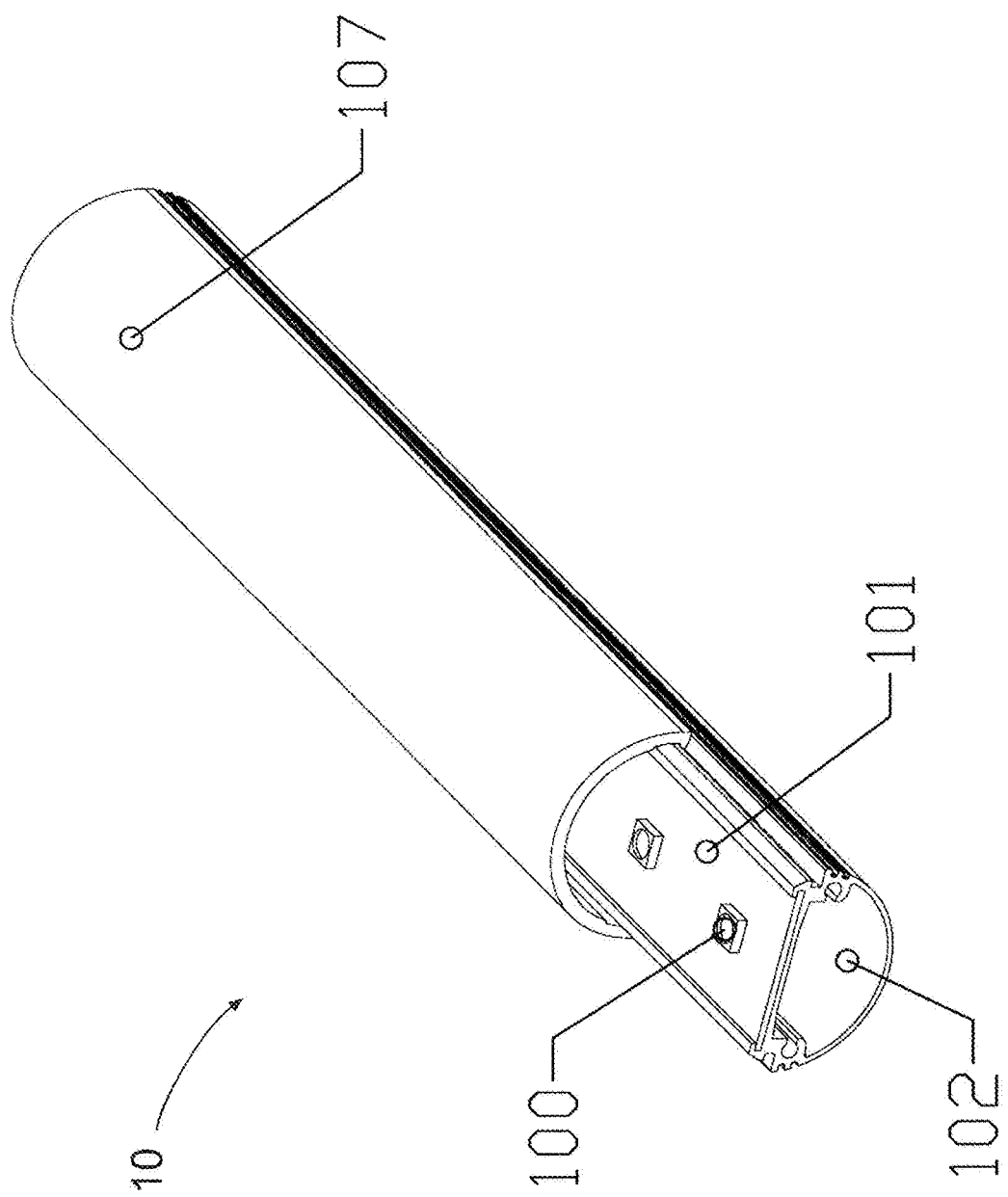
FIG. 71 is a 3-D view of a tube LED lighting system, without end fitting.

FIG. 71 shows a tube embodiment of an LED lighting system 10. The housing 102 is made of heat conductive material. The cross section of the housing 102 is a closed half circle. The circuit boards 101 with LEDs 100 are installed on the housing 102. The housing 102 helps to dissipate the heat from the circuit board 101. The cover lens 107 is in a shape of half circle to be mounted on the housing 102. The whole assembly forms a tube like traditional fluorescent light.

Figure 72:
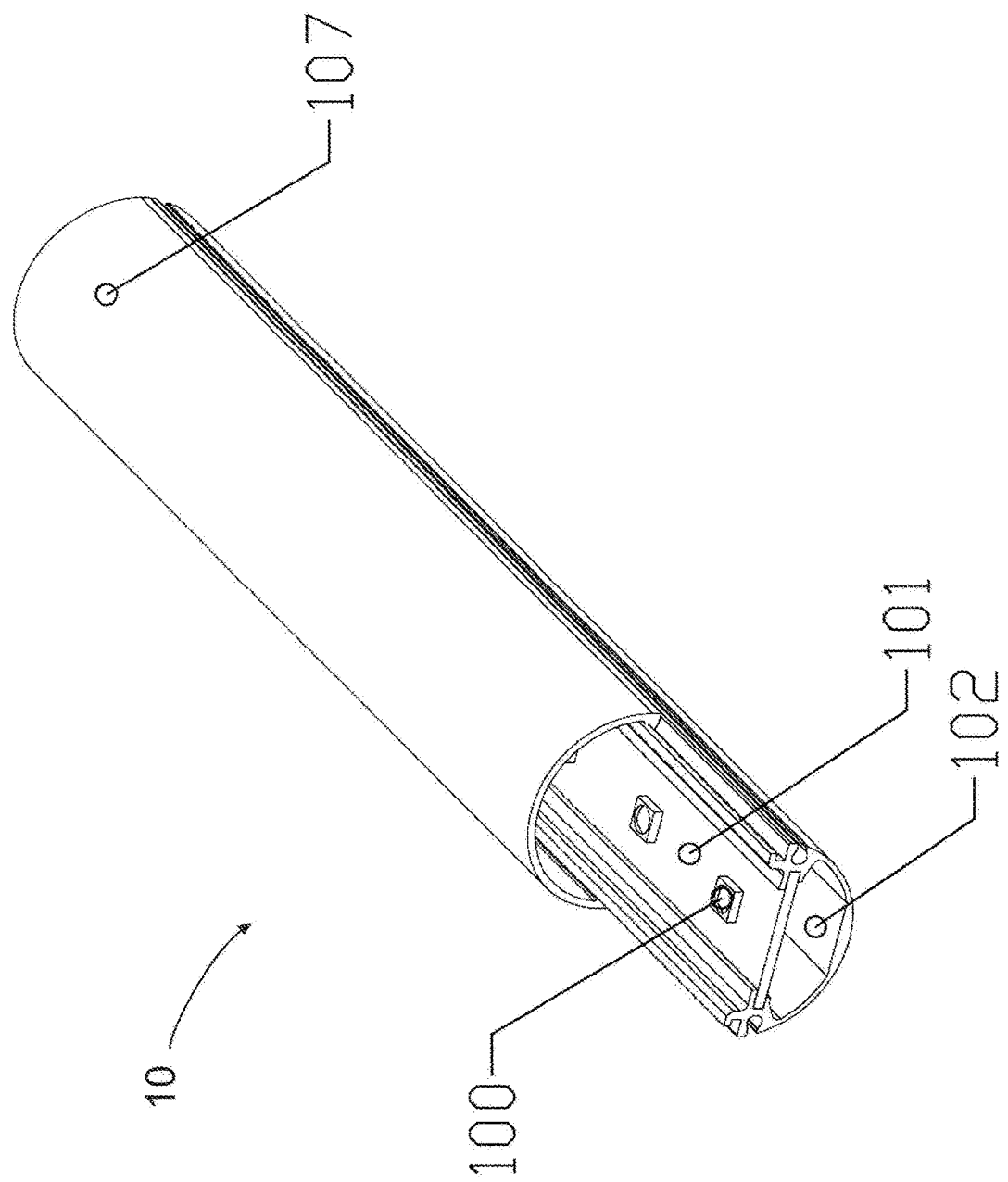
FIG. 72 is a 3-D view of another embodiment of a tube LED lighting system, without end fitting.

FIG. 72 shows another tube embodiment of the LED lighting system 10. The housing 102 in this embodiment has a tube shape with an unclosed half circle section, so a double-sided circuit board 101 can be installed on the housing 102. The cover lens 107 has same features as in FIG. 71.

Figure 73:
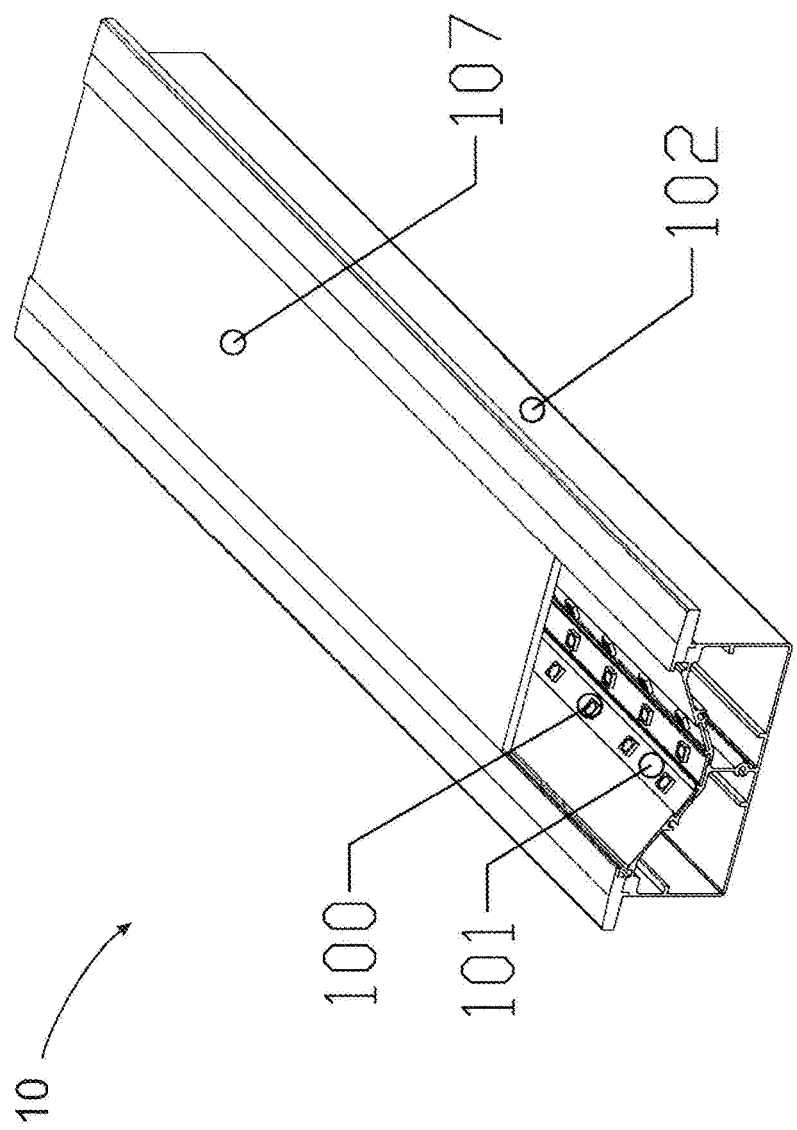
FIG. 73 is a 3-D view of a rectangle LED lighting system, without end fitting.

FIG. 73 shows a rectangle embodiment of LED lighting system 10. The housing 102 is made of heat conductive and rigid materials. The circuit boards 101 with LEDs 100 are installed on the housing 102. Three rows of LEDs 100 are installed at different angles to provide wider viewing angle. The cover lens 107 is flat and installed on the housing 102. The whole assembly forms a rectangle. This lighting system can be applied in the recessed lighting applications.

Figure 74:
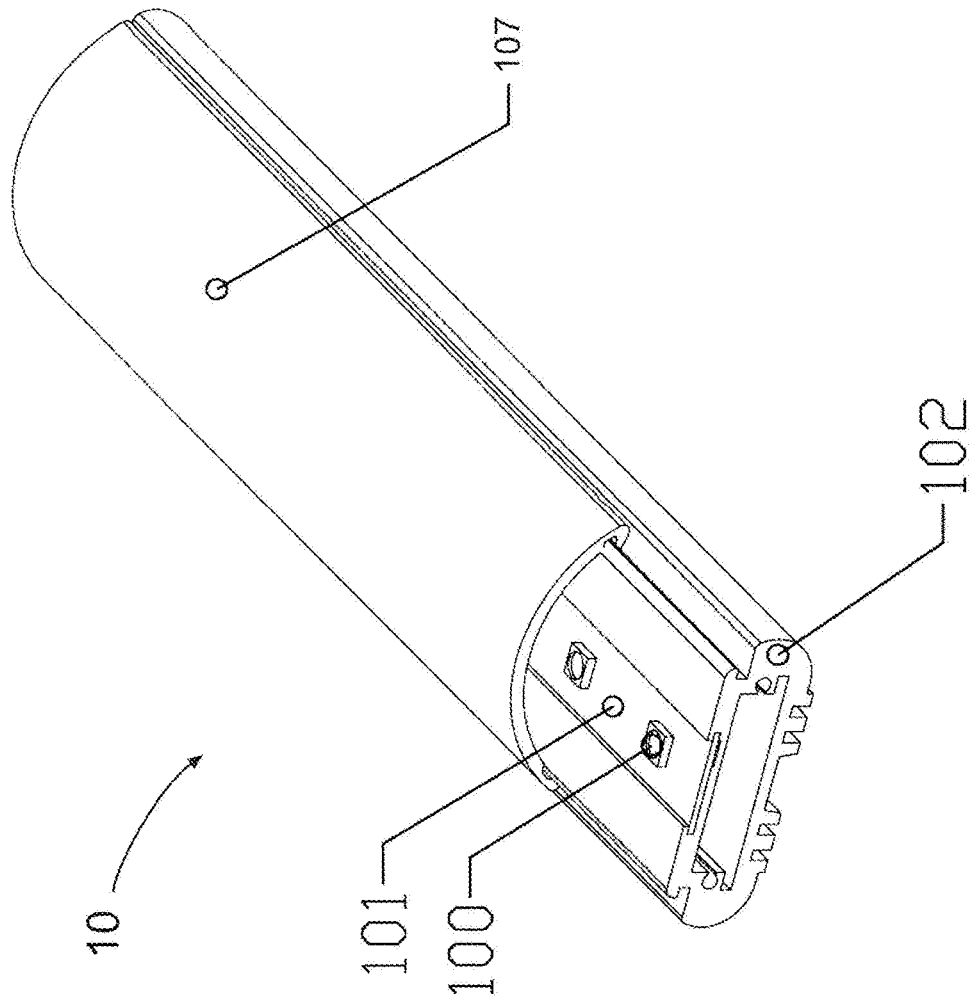
FIG. 74 is a 3-D view of a low-profile LED lighting system, without end fitting.

FIG. 74 shows an embodiment of an LED lighting system 10, with housing 102, cover lens 107 and with LEDs 100 secured to a circuit board 101. This system has low profile to fit into desired applications.

Figure 75:
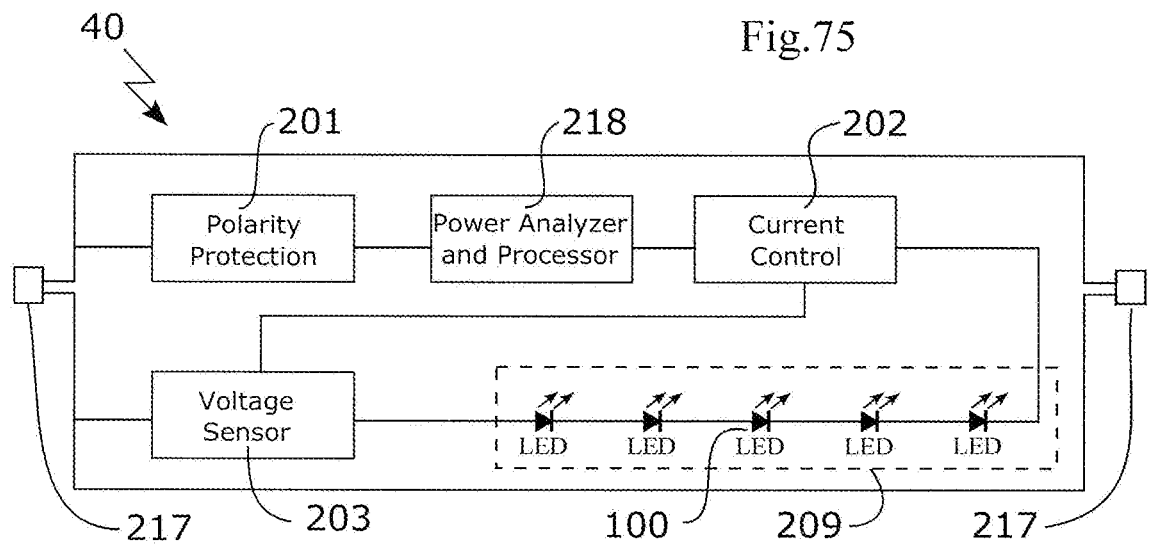
FIG. 75 is a block diagram of the main structure of an LED lighting system, which has a 2-wire power source and power analyzing and processing circuitry.

FIG. 75 illustrates the main structure of a LED lighting system connected to a 2-wire power source 217. A polarity protection circuit 201 of conventional design safeguards against the user installing the product in the wrong polarity. The power source 217 may be AC or DC, and may be a variable or adjustable power source. The characteristics of the power source 217, such as voltage amplitude, power frequency and pulse width, can be adjusted (varied), such as by operation of a switch (not shown) operating on the power source 217. The power analyzer and processor 218, current control 202, polarity protection 201 (if present) and voltage sensor 203 together comprise power control circuitry for the LEDs 100. A single power control circuitry may control one or more arrays 209, through one or more current controls 202 or there may be provided multiple power control circuits and multiple LED arrays, each power control circuit being supplied for a corresponding LED array.

A power analyzer and processor 218 connects to the power source 217 and analyzes the characteristics of power source 217 such as the voltage amplitude, power frequency and pulse width. Then the power analyzer and processor 218 compares one or all of these characteristics to preset control criteria, which may be realized by hardware or software or both. According to the comparison results, the power analyzer and processor 218 controls the current control circuit 202 to adjust the function of LED arrays 209.

Figure 75A:
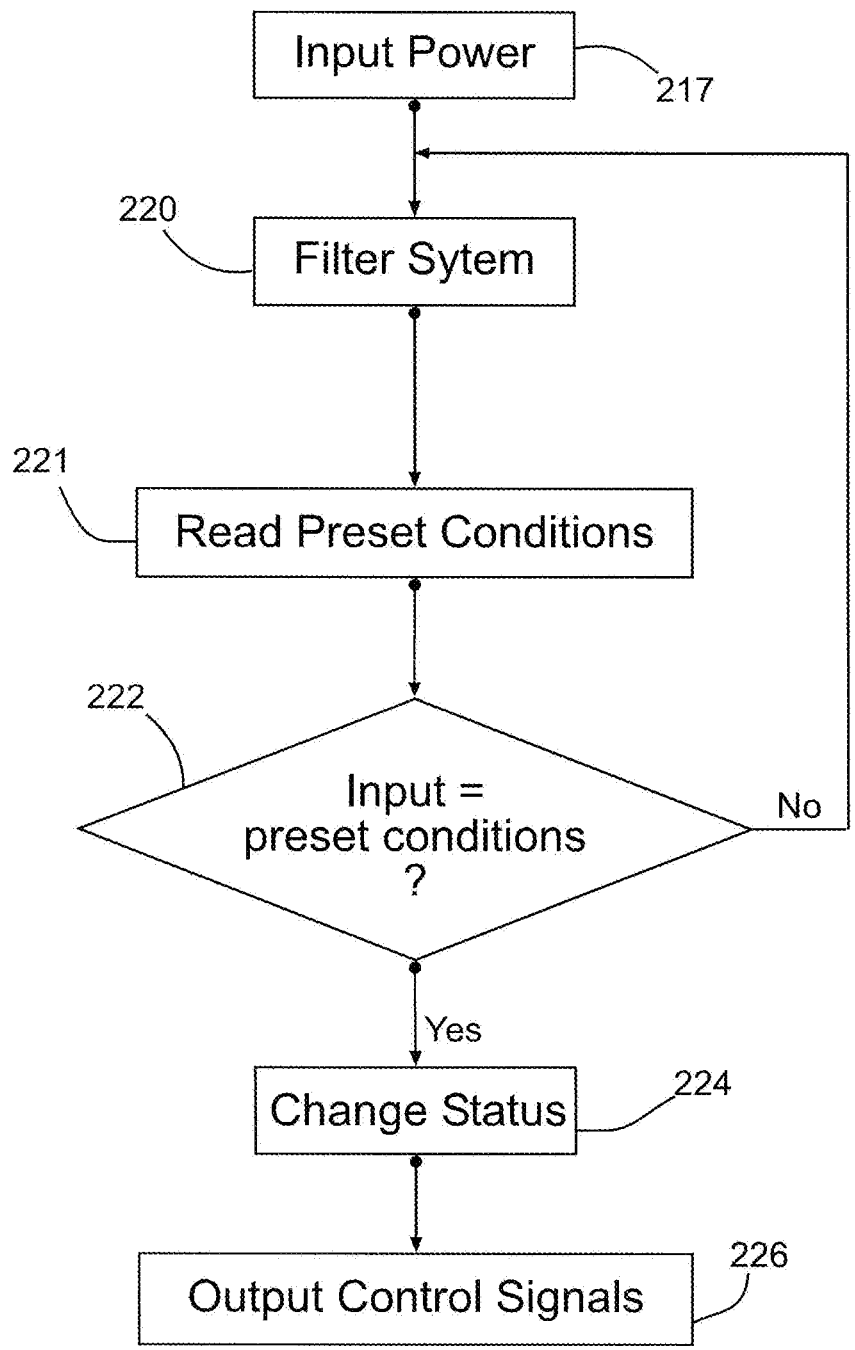
FIG. 75A is a process control diagram illustrating the operation of power analyzing and processing circuitry.
Figure 77:
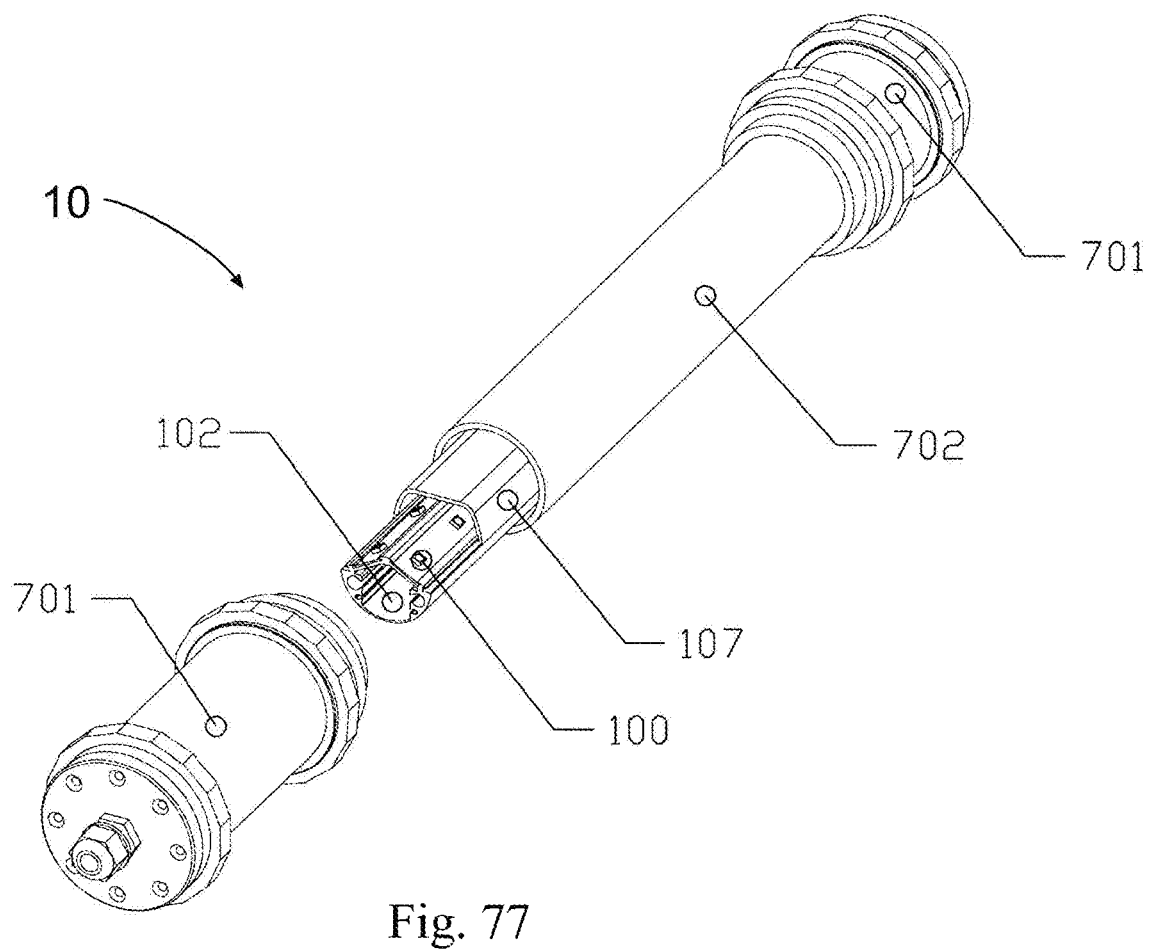
FIG. 77 is a 3-D view of a LED lighting system with two handles and 2 rows of LEDs.

Referring to FIG. 75A, an example of the functions carried out by the processor 218 or power control circuitry is shown. The processor 218 may be a semiconductor circuit configured by software or firmware or may be hardwired. It is preferred that the processor 218 be programmable for maximum flexibility. Input power 217 is supplied to a filter 220. The filter 220 smooths the incoming power. The incoming power may be AC or DC and may have irregularities imposed on the signal that may be removed by a low pass filter. The processor 218 is provided with one or more pre-set conditions that are stored in memory, not necessarily in memory integrated with the processor 218 but on some accessible storage. The conditions may be for example in the case of an incoming sine wave, a loss of signal or zero signal for a defined period, such as 200 milliseconds. In another example, a change in DC voltage level may be a pre-set condition. In another example, a change in frequency may be a pre-set condition. In another example, a change in pulse width may be a pre-set condition. Any detectable power change may be used as a pre-set condition. After filtering in step 220, the processor 218 reads the pre-set conditions at 221 and compares the pre-set conditions at step 222 with the filtered input. If the filtered input satisfies the conditions (for example a zero signal for 200 ms), then the processor 218 changes state such as from a passive state to an active state in step 224 and outputs a control signal at step 226 to the current control circuit 202. The control signal may instruct the current control circuit 202 for example to increase power supplied to the LEDs 100 (brighten) or decrease the power (dim) the LEDs, or carry out other functions such as turn off or on some but not others of the LEDs or cause a change of color of the LEDs by turning on or off different colored LEDs. The processor 218 preferably may take as input a signal of any frequency, for example 50 Hz, 60 Hz or 100 Hz to provide greatest flexibility in application. Various methods of controlling current may be used and the current control may take various forms, such as disclosed in international publication number WO200709092 published Aug. 16, 2007. The LED lighting system may be constructed in various ways, such as shown in FIGS. 76-81, other embodiments of this document, or in some embodiments as constructed in international publication number WO200709092, the disclosure of which is hereby incorporated by reference where permitted by law.

This method is different from the common ways used for the LED lighting control. Traditionally to control the LED lights a control signal has to be provided to the lights either through a separated control pin or wire, or wireless technology, or technologies like signal carrier, or the technology in a master-slave mode. When the LED lights work in master-slave mode the LED arrays are controlled by the power source directly. For example the power source's voltage is applied to the LEDs directly, so the LEDs are lit up when the voltage goes up and dim down when the voltage goes down. In the disclosed embodiment, the power source is not applied to the LEDs directly. The power source's characteristics, such as voltage amplitude, will be compared to the preset value. The light is controlled according to the comparison results. It is possible the light is lit up when the input voltage goes down, which is totally different from the traditional way. In this way the LED lights can be more conveniently controlled by controlling the characteristics of the power source.

As shown in FIG. 75, the LED array is divided into multiple sets 209 of LEDs (only one is shown), for example five LEDs 100 per set. The current control circuitry 202 is configured to provide constant current to the LEDs 100 of the LED array 209. As an example, the current control circuit 202 may use pulse width modulation (PWM) to control the current supplied to the LEDs. The circuit 202 supplies constant, controlled, current to unit for the entire LED set 209 with information from voltage sensor 203. The voltage sensor 203 receives current information from LEDs 209 and feeds back information to the current control circuitry 202. For example, in the use of PWM, the voltage sensor 203 converts the current of LED array 209 to voltage signal and supplies the voltage signal to the current control circuit 202. The current control circuit 202 senses how much the detected voltage varies from the desire varying the pulse width or frequency, changes the current supplied to the LEDs towards the desired level.

Figure 76:
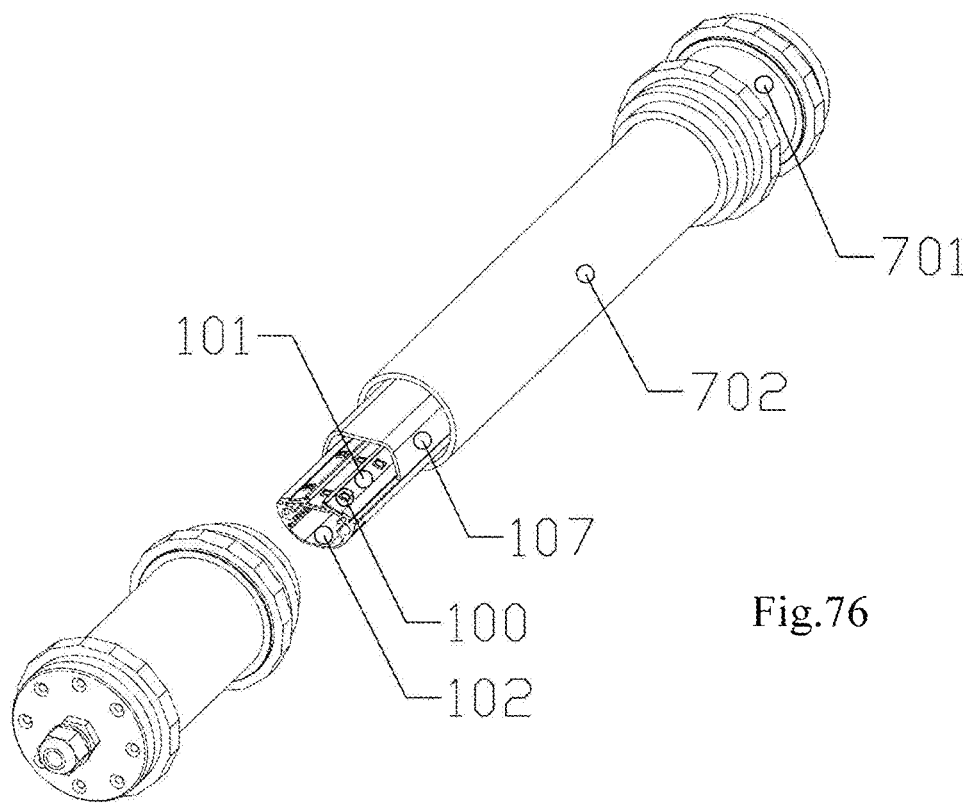
FIG. 76 is a 3-D view of a LED lighting system with two handles and 3 rows of LEDs.

FIG. 76 shows an embodiment of an LED lighting system 10 with two handles 701 spanning between respective ends of a housing 102. Handles 701 are made of metal and/or plastic materials to help heat dissipation and reduce shock and vibration. Circuit boards 101 carrying the LEDs 100 are installed on the housing 102 for example being received in longitudinal slots that face inward and run along the length of the housing 102. The power control circuit 218 may be incorporated on the circuit boards 101 or on separate circuit boards (not shown) installed in the housing. The housing 102 is preferably made of heat conductive and rigid material and spans between the two handles 701. The housing (support structure) or at least the relevant parts that are in contact with the LEDs is sufficiently heat conductive to provide heat dissipation for the LEDs. Cover lens 107 is mounted on the housing 102, for example having inward directed edges that are received in outward facing slots running along the housing 102. The cover lens 107 may be transparent or translucent. External lens 702 is a tube made of various materials such as Polycarbonate and may be held in place by the handles 701. Mostly the external lens 702 is clear. It is used to provide water proof and/or anti-explosion features. In this embodiment three rows of LEDs 100 are installed at different angles to provide wider viewing angle. Each row of the LEDs 100 might have different colors, which can be turned on at the same time or individually to provide desired features. In another embodiment, shown in FIG. 77, the shape of the housing 102 can be changed to hold one or two rows of LEDs 100 to provide different angles and functions.

Figure 78:
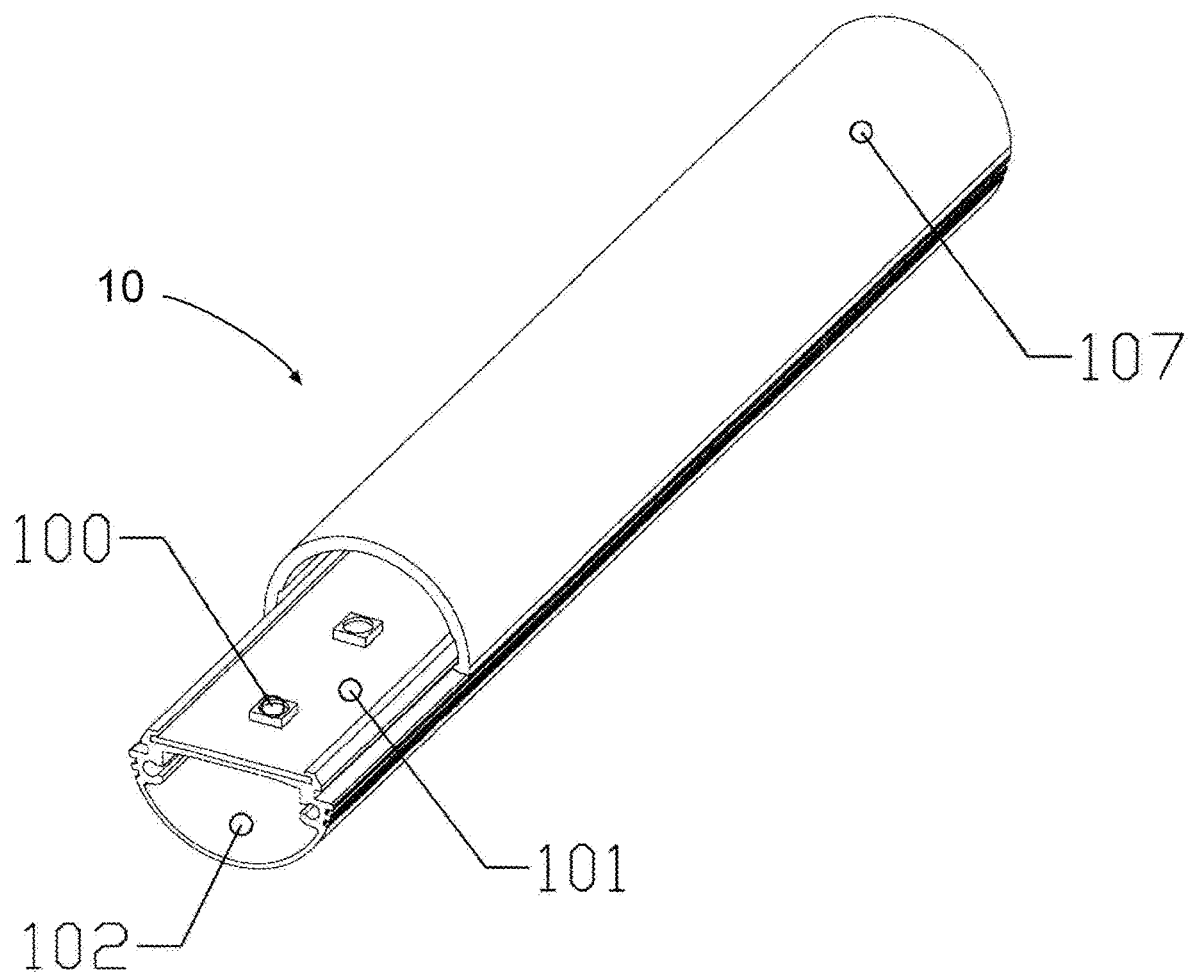
FIG. 78 is a 3-D view of a tube LED lighting system, without end fitting.

FIG. 78 shows a tube embodiment of an LED lighting system 10. The housing 102 is made of heat conductive material. The cross section of the housing 102 is a closed half circle. The circuit boards 101 with LEDs 100 are installed on the housing 102. The housing 102 helps to dissipate the heat from the circuit board 101. The cover lens 107 is in a shape of half circle to be mounted on the housing 102 with inward facing edges received in outward facing slots of the housing 102. The whole assembly forms a tube like a traditional fluorescent light.

Figure 79:
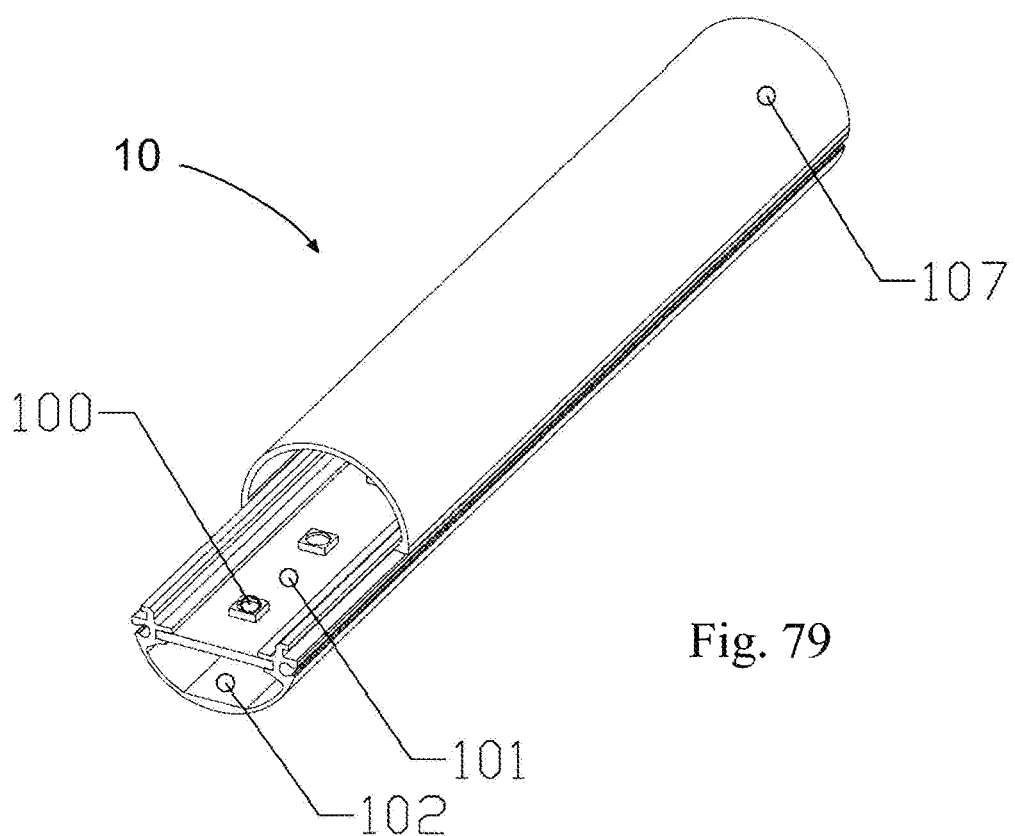
FIG. 79 is a 3-D view of another embodiment of a tube LED lighting system, without end fitting.

FIG. 79 shows another tube embodiment of the LED lighting system 10. The housing 102 in this embodiment has a tube shape with an unclosed half circle section, so a double-sided circuit board 101 can be installed on the housing 102 with edges of the circuit board 101 being received in inward facing slots of the housing 102. The cover lens 107 has same features as in FIG. 77.

FIG. 79 shows a rectangle embodiment of LED lighting system 10. The housing 102 is made of heat conductive and rigid materials. The circuit boards 101 with LEDs 100 are installed on the housing 102. Three rows of LEDs 100 are installed at different angles to provide wider viewing angle. The cover lens 107 is flat and installed on the housing 102. The whole assembly forms a rectangle. This lighting system can be applied in the recessed lighting applications.

Figure 80:
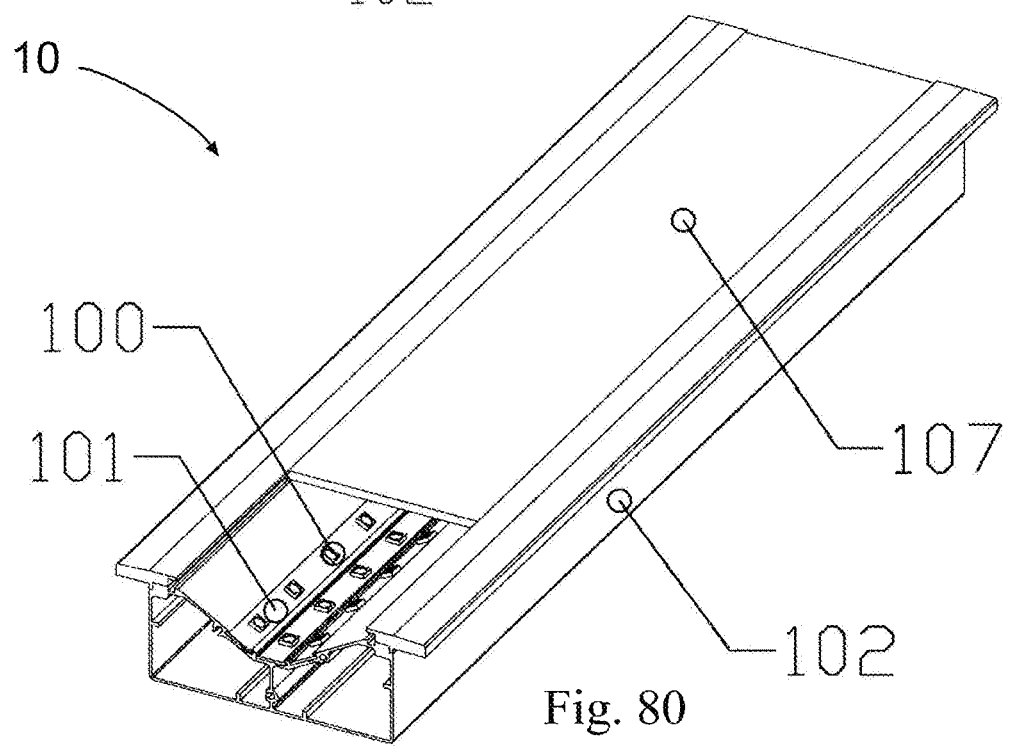
FIG. 80 is a 3-D view of a low profile LED lighting system, without end fitting.
Figure 81:
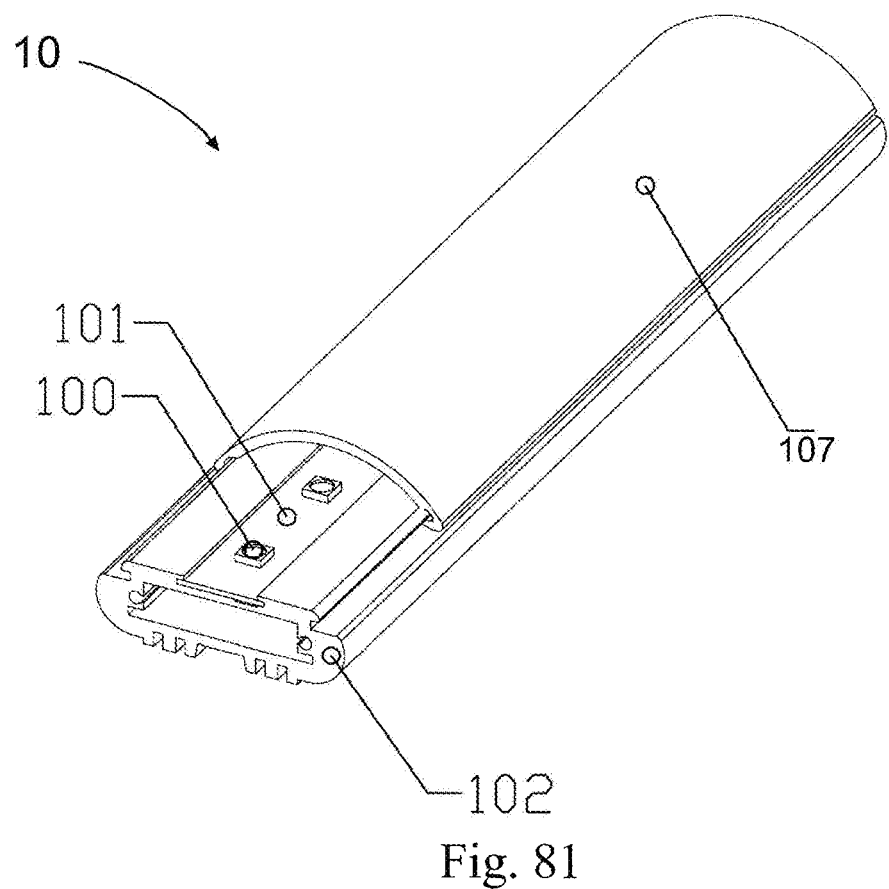
FIG. 81 is a 3-D view of a low-profile LED lighting system, with dome cover and without end fitting.

FIG. 80 shows an embodiment of an LED lighting system 10, with housing 102, cover lens 107 and with LEDs 100 secured to a circuit board 101. This system has low profile to fit into desired applications. In FIG. 80, the housing 102 has a base portion that is rectangular in section with a flat base and outer walls that are perpendicular to the flat base. A part of the housing connecting the outer walls above the flat base is recessed downward to receive the circuit boards 101 within the volume formed by the flat base and outer walls. The cover 107 in this example may be flat. In general, the configuration exemplified by FIG. 80 is that in cross-section, the walls of the housing form a polygon, that is not convex and may be open on a side, and the circuit boards are located on a recessed or concave portion of the housing. In this way, a low profile of housing may be obtained. In FIG. 81, domed cover 107 is provided, and the housing 102 holds a circuit board 101 with LEDs 100. The housings 102 in both FIGS. 80 and 81 each have a width and depth perpendicular to the long axis of the respective housings 102, and the width (intermediate axis) in each case is more than twice the depth (short axis), for example 3 or 4 times the depth. The LEDs in the system 10 as a group have a mean facing direction, defined by considering each LEDs own facing direction as a vector, summing the vectors and dividing by the number of LEDs. The mean facing direction of the LEDs may be perpendicular to the intermediate and long axes of the housing 102.

In various embodiments, the power control circuitry is formed on the circuit boards 101 that are carried by the various housings 102 (support structures) and are in electrical communication with the electrical connectors of the power sources 217. The circuit boards 102 support at least one array of LEDs 100. The at least one LED array may be divided into sets of LEDs. The power control circuitry may be formed of one or multiple current controllers, each of the one or multiple current controllers providing current control for a corresponding set of LEDs in the LED array. In some embodiments, sets of LEDs may be of the same or different colors, and the current control circuitry may provide same or different current control for a corresponding set of LEDs in the LED array according to the comparison result. The housings 102 may form channels. Each LED in the LED array may have in some embodiments a power rating of greater than 0.1 or 0.01 watt. The power control circuitry in some embodiments is provided by current control circuitry, for example onboard circuitry, carried by the support structure, in some embodiments within the channel, and may provide current control for individual sets of LEDs. The current control allows careful control of the forward current passing through the LED array so that it controls the brightness and heat production by the LEDs. Devices with a range of illumination field are disclosed, along with devices with LEDs having differently angled illumination fields. The housings 102 may have a front side on which the at least one LED array is carried and a rear side on which the power control circuitry is carried.

The pre-set conditions may be supplied to the power control circuitry by loading software or replacement or installation of hardware or both. The pre-set conditions may also be obtained by communication with external controllers, devices or equipment. The output control signal sent by the power control circuitry to the current control 202 may be used to cause the LEDs 100 to flash at selectable speeds. The output control signal may also comprise a code sent to an external controller (not shown) or monitoring system (not shown) for checking on the function of the power control circuitry, the input power 217 or response of the LEDs to control signals. That is, if the LEDs 100 or current control 202 are non-responsive to a control signal, then an error code may be sent by the power control circuitry to an external system to notify the external system of a problem. An output control signal sent to an external controller may also specify the comparison result and the nature of the instruction received from the input power, and this information may be used by external systems for control of other lighting systems in conjunction with the specific set of LEDs 100 being controlled by the power control circuitry.

Figure 82:
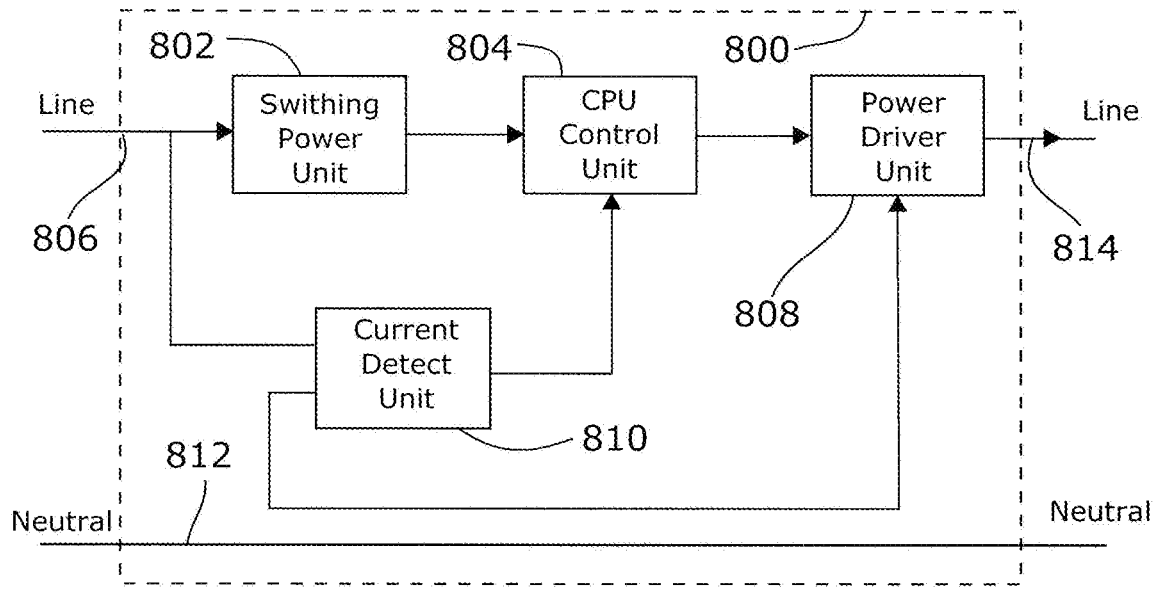
FIG. 82 is a block diagram of a controller for an LED lighting system.

Referring to FIG. 82, a block diagram of a controller 800 is shown. The switching power unit 802 may be used to convert the line input 806 to the working voltage of the CPU control unit 804. The current detect unit 810 may be used to detect the current change in the system, and provide the detected current value to the CPU control unit 804. The CPU control unit 804 analyses the current value and provides a control signal to the power driver unit 808. The line input 806 connects to the power driver unit 808 through the current detect unit 810. The power driver unit 808 will adjust the output characteristics, such as voltage amplitude, frequency or pulse width, according to the signal from CPU control unit 804 and output on line 814 to the LED lighting system. The line input 806 and line output 814 have voltages relative to neutral line 812. The switching power unit 802, CPU control unit 804 and power driver unit 808 all are connected to the neutral line 812 but these connections are not shown for simplicity.

With the controller design in FIG. 82, a controller 800 can know what other controllers 800 have done in the system when there are multiple controllers in the system. When one controller changes the working status of the system, the current in the system will change. When other controllers detect the current change, they will know what other controllers have done and know the current system working status and can control the lighting system synchronously without conflicts.

Figure 83:
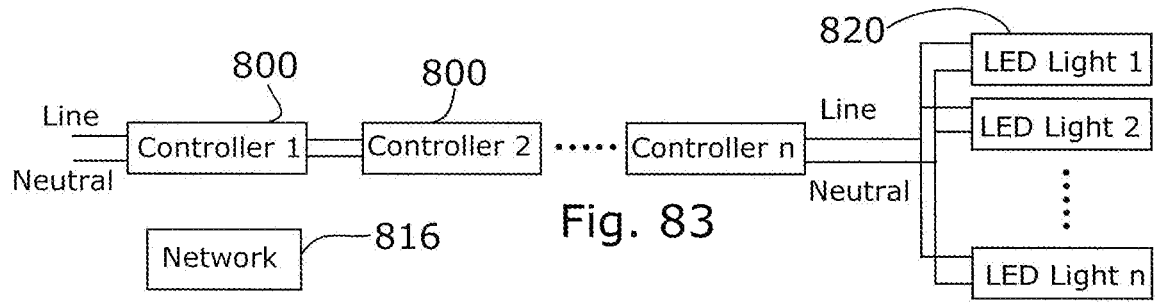
FIG. 83 is a block diagram showing how the controllers of FIG. 82 connect to the LED lighting system in series mode.
Figure 84:
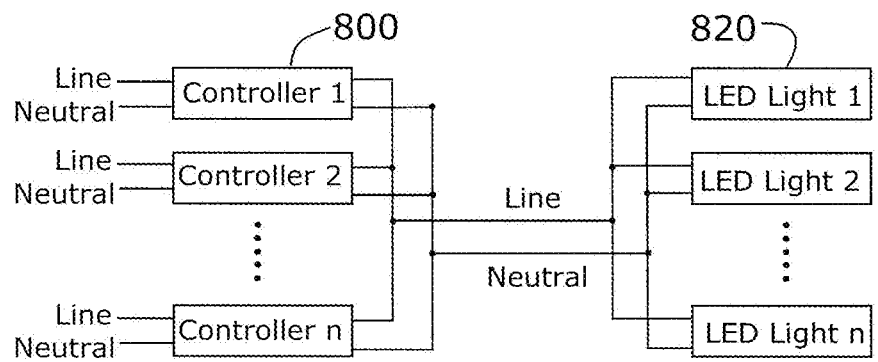
FIG. 84 is a block diagram showing how the controllers of FIG. 82 connect to the LED lighting system in parallel mode.

FIG. 84 show a connection method that the controllers 800 connect with in parallel, while FIG. 83 shows a connection method where the controllers connect in serial. The controllers 800 in FIGS. 82-84 can also be connected to the intranet or internet network 816 (FIG. 83) and receive the control information from the network and adjust the output to the LED lighting system 820 accordingly.

FIG. 82 shows a controller 800 that detects the current change in the system. There are other ways to implement the desired functions, such as detecting the voltage change, frequency change or pulse width change.

The current level in the system reflects different working statuses. The table 1 below shows a sample of different current levels at different status. When one controller controls the LED lighting system to change from one status to another status, the current in the system will change. After other controllers detect the current change, the controllers will know the lighting system working status. When people try to control the light with a different controller, this controller knows the current working status and will know what the next status should be. This technology will help those controllers with a single button to control multiple statuses by pressing the button repeatedly.

For example, controller 1 controls the system to be 'ON' with 100% current level. When someone presses controller 2 once, the light changes to 'DIM 1' with 50% current level. Without the technology above, controller 1 would not know the status change. If someone wanted to change the status to 'DIM 2' using controller 1, it would change to 'DIM 1' after pressing the button once because it would still think the system is at 'ON' status. This would cause the whole system to be messed up.

This technology can be applied to different application, such as a building, a shelter, vehicles and ships. It is helpful in the applications that need multiple controllers to control the same group of lights without adding more control wires. For example, a shelter has six entrances. The controllers can be installed at every entrance. Six controllers will control the lights in the shelter synchronously.

TABLE 1

| STATUS | CURRENT LEVEL |
|---|---|
| ON | 100% |
| DIM 1 | 50% |
| DIM 2 | 25% |
| OFF | 0% |

Immaterial modifications may be made to the embodiments described here without departing from what is claimed.

What is claimed is:

1. A light emitting diode (LED) lighting system comprising:
    a support structure forming a channel spanning between a first end and a second end, the channel having side walls, the support structure being shaped for installation in a fluorescent or single socket light fixture receptacle;
    at least one LED array extending along the support structure within the channel;
    a first end cap at the first end and a second end cap at the second end, the first end cap and the second end cap being at least partly inserted into the channel, at least one of the first end cap and the second end cap supporting an electrical connector for connection to a power source;
    power control circuitry for the at least one LED array, the power control circuitry being in electrical communication with the electrical connector, the power control circuitry being carried inside the support structure; and
    the power control circuitry including at least a current controller and a feedback circuit, the current controller being connected to receive a feedback signal from the feedback circuit and the current controller being configured to supply a constant average current to the LEDs of the at least one LED array.

2. The LED lighting system of claim 1 in which the at least one LED array is divided into sets of LEDs; and
    the power control circuitry is formed of multiple current controllers, each current controller of the multiple current controllers providing current control for a corresponding set of LEDs in the at least one LED array.

3. The LED system of claim 1 in which the first and second end caps are formed of plastic.

4. The LED lighting system of claim 1 in which the at least one LED array and the power control circuitry are both circuit board mounted.

5. The LED lighting system of claim 4 in which the at least one LED array is supported by a circuit board, the power control circuitry being provided on the circuit board.

6. The LED lighting system of claim 4 in which the at least one LED array is supported by a circuit board, the power control circuitry being provided on a separate circuit board.

7. The LED lighting system of claim 1 further comprising plastic handles connected to the support structure and arranged to help dissipate heat.

8. The LED lighting system of claim 1 in which the power control circuitry is configured to supply pulsed current.

9. The LED lighting system of claim 8 in which the power control circuitry is configured to maintain constant average current by pulse width modulation of the current.

10. The LED lighting system of claim 8 in which the power control circuitry is configured to maintain constant average current by pulse frequency modulation of the current.

11. The LED lighting system of claim 1 in which the support structure is made of a unitary piece of material that is both heat conductive and rigid.

12. The LED lighting system of claim 1 further comprising a transparent or translucent cover secured to the side walls of the support structure over the channel.

13. The LED lighting system of claim 12 in which the first and second end caps prevent movement of the transparent or translucent cover in relation to the support structure.

* * * * *